(12) United States Patent
Giuliano

(10) Patent No.: US 11,764,670 B2
(45) Date of Patent: *Sep. 19, 2023

(54) DC-DC CONVERTER WITH MODULAR STAGES

(71) Applicant: pSemi Corporation, San Diego, CA (US)

(72) Inventor: David Giuliano, Bedford, NH (US)

(73) Assignee: pSemi Corporation, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/454,870

(22) Filed: Nov. 15, 2021

(65) Prior Publication Data

US 2022/0209657 A1    Jun. 30, 2022

Related U.S. Application Data

(63) Continuation of application No. 16/534,196, filed on Aug. 7, 2019, now Pat. No. 11,211,861, which is a
(Continued)

(51) Int. Cl.
*H02M 3/158*     (2006.01)
*H02M 3/07*      (2006.01)
(Continued)

(52) U.S. Cl.
CPC .............. *H02M 3/07* (2013.01); *H02M 3/158* (2013.01); *H02M 7/25* (2013.01); *H02M 1/007* (2021.05); *H02M 3/077* (2021.05); *H02M 3/1582* (2013.01)

(58) Field of Classification Search
CPC .......... H02M 3/07; H02M 3/158; H02M 7/25; H02M 1/007; H02M 3/077; H02M 3/1582
See application file for complete search history.

(56) References Cited

U.S. PATENT DOCUMENTS

| 3,370,215 A | 2/1968 | Light |
| 3,745,437 A | 7/1973 | Brown |

(Continued)

FOREIGN PATENT DOCUMENTS

| CN | 1132959 | 10/1996 |
| CN | 101563845 | 10/2009 |

(Continued)

OTHER PUBLICATIONS

U.S. Appl. No. 17/187,664: Preliminary Amendment and Response to Notice to File Missing Parts filed Jul. 12, 2021, 17 pages (30096-002008), Doc 8098.
(Continued)

*Primary Examiner* — Gary L Laxton
(74) *Attorney, Agent, or Firm* — Finnegan, Henderson, Farabow, Garrett & Dunner, LLP

(57) ABSTRACT

An apparatus for processing electric power includes a power-converter having a path for power flow between first and second power-converter terminals. During operation the first and second power-converter terminals are maintained at respective first and second voltages. Two regulating-circuits and a switching network are disposed on the path. The first regulating-circuit includes a magnetic-storage element and a first-regulating-circuit terminal. The second regulating-circuit includes a second-regulating-circuit terminal. The first-regulating-circuit terminal is connected to the first switching-network-terminal and the second-regulating-circuit terminal is connected to the second switching-network-terminal. The switching network is transitions between a first switch-configuration and a second switch-configuration. In the first switch-configuration, charge accumulates in the first charge-storage-element at a first rate. Conversely, in the second switch-configuration, charge is depleted from the
(Continued)

first charge-storage-element at a second rate. These rates are constrained by the magnetic-storage element.

20 Claims, 22 Drawing Sheets

Related U.S. Application Data continuation of application No. 15/813,546, filed on Nov. 15, 2017, now Pat. No. 10,404,162, which is a continuation of application No. 15/068,985, filed on Mar. 14, 2016, now Pat. No. 9,882,471, which is a continuation-in-part of application No. 14/513,747, filed on Oct. 14, 2014, now Pat. No. 9,362,826, which is a continuation of application No. 13/771,904, filed on Feb. 20, 2013, now Pat. No. 8,860,396, which is a continuation of application No. PCT/US2012/036455, filed on May 4, 2012.

(60) Provisional application No. 62/132,701, filed on Mar. 13, 2015, provisional application No. 61/577,271, filed on Dec. 19, 2011, provisional application No. 61/548,360, filed on Oct. 18, 2011, provisional application No. 61/482,838, filed on May 5, 2011.

(51) Int. Cl.
*H02M 7/25* (2006.01)
*H02M 1/00* (2006.01)

(56) References Cited

U.S. PATENT DOCUMENTS

| | | | |
|---|---|---|---|
| 3,818,360 A | 6/1974 | Boutmy | |
| 4,903,181 A | 2/1990 | Seidel | |
| 5,057,986 A | 10/1991 | Henze | |
| 5,119,283 A | 6/1992 | Steigerwald | |
| 5,159,539 A | 10/1992 | Koyama | |
| 5,198,970 A | 3/1993 | Kawabata | |
| 5,268,832 A | 12/1993 | Kandatsu | |
| 5,331,303 A | 7/1994 | Shiota | |
| 5,402,329 A | 3/1995 | Wittenbreder, Jr. | |
| 5,504,418 A * | 4/1996 | Ashley | G05F 1/67 |
| | | | 323/906 |
| 5,548,206 A | 8/1996 | Soo | |
| 5,661,348 A | 8/1997 | Brown | |
| 5,793,626 A | 8/1998 | Jiang | |
| 5,801,987 A | 9/1998 | Dinh | |
| 5,812,017 A | 9/1998 | Golla | |
| 5,831,846 A | 11/1998 | Jiang | |
| 5,892,395 A | 4/1999 | Stengel | |
| 5,956,243 A | 9/1999 | Mao | |
| 5,959,565 A | 9/1999 | Taniuchi | |
| 5,959,585 A | 9/1999 | Militz | |
| 5,982,645 A | 11/1999 | Levran | |
| 6,133,788 A | 10/2000 | Dent | |
| 6,140,807 A | 10/2000 | Vannatta | |
| 6,154,380 A | 11/2000 | Assow | |
| 6,157,253 A | 12/2000 | Sigmon | |
| 6,178,102 B1 | 1/2001 | Stanley | |
| 6,198,645 B1 | 3/2001 | Kotowski | |
| 6,255,906 B1 | 7/2001 | Eidson | |
| 6,275,018 B1 | 8/2001 | Telefus | |
| 6,327,462 B1 | 12/2001 | Loke | |
| 6,339,538 B1 | 1/2002 | Handleman | |
| 6,377,117 B2 | 4/2002 | Oskowsky | |
| 6,396,341 B1 | 5/2002 | Pehlke | |
| 6,429,632 B1 | 8/2002 | Forbes | |
| 6,507,503 B2 | 1/2003 | Norrga | |
| 6,515,612 B1 | 2/2003 | Abel | |
| 6,563,235 B1 | 5/2003 | McIntyre | |
| 6,657,876 B2 | 12/2003 | Satoh | |
| 6,700,803 B2 | 3/2004 | Krein | |
| 6,738,277 B2 | 5/2004 | Odell | |
| 6,738,432 B2 | 5/2004 | Pehlke | |
| 6,934,167 B2 | 8/2005 | Jang | |
| 6,995,995 B2 | 2/2006 | Zeng | |
| 7,072,195 B2 | 7/2006 | Xu | |
| 7,091,778 B2 | 8/2006 | Gan | |
| 7,103,114 B1 | 9/2006 | Lapierre | |
| 7,157,956 B2 | 1/2007 | Wei | |
| 7,161,816 B2 | 1/2007 | Shteynberg | |
| 7,236,542 B2 | 6/2007 | Matero | |
| 7,259,974 B2 | 8/2007 | Donaldson | |
| 7,269,036 B2 | 9/2007 | Deng | |
| 7,330,070 B2 | 2/2008 | Vaisanen | |
| 7,362,251 B2 | 4/2008 | Jensen | |
| 7,375,992 B2 | 5/2008 | Mok | |
| 7,382,113 B2 | 6/2008 | Wai | |
| 7,382,634 B2 | 6/2008 | Buchmann | |
| 7,443,705 B2 | 10/2008 | Ito | |
| 7,535,133 B2 | 5/2009 | Perreault | |
| 7,589,605 B2 | 9/2009 | Perreault | |
| 7,633,778 B2 | 12/2009 | Mok | |
| 7,696,735 B2 | 4/2010 | Oraw | |
| 7,705,681 B2 | 4/2010 | Ilkov | |
| 7,768,800 B2 | 8/2010 | Mazumder | |
| 7,889,519 B2 | 2/2011 | Perreault | |
| 7,907,429 B2 | 3/2011 | Ramadass | |
| 7,907,430 B2 * | 3/2011 | Kularatna | G05F 1/46 |
| | | | 320/167 |
| 7,940,038 B2 | 5/2011 | Da Silva | |
| 7,956,572 B2 | 6/2011 | Zane | |
| 8,000,117 B2 | 8/2011 | Petricek | |
| 8,026,763 B2 | 9/2011 | Dawson | |
| 8,031,003 B2 | 10/2011 | Dishop | |
| 8,085,524 B2 | 12/2011 | Roozeboom | |
| 8,130,518 B2 | 3/2012 | Fishman | |
| 8,164,384 B2 | 4/2012 | Dawson | |
| 8,169,797 B2 | 5/2012 | Coccia | |
| 8,276,002 B2 | 9/2012 | Dennard | |
| 8,451,053 B2 | 5/2013 | Perreault | |
| 8,542,169 B2 | 9/2013 | Senda | |
| 8,629,666 B2 | 1/2014 | Carroll | |
| 8,643,347 B2 | 2/2014 | Perreault | |
| 8,659,353 B2 | 2/2014 | Dawson | |
| 8,670,254 B2 | 3/2014 | Perreault | |
| 8,699,248 B2 | 4/2014 | Giuliano | |
| 8,718,188 B2 | 5/2014 | Balteanu | |
| 8,729,819 B2 | 5/2014 | Zhao | |
| 8,824,978 B2 | 9/2014 | Briffa | |
| 8,829,993 B2 | 9/2014 | Briffa | |
| 8,830,709 B2 | 9/2014 | Perreault | |
| 8,830,710 B2 | 9/2014 | Perreault | |
| 8,860,396 B2 | 10/2014 | Giuliano | |
| 8,957,727 B2 | 2/2015 | Dawson | |
| 9,048,727 B2 | 6/2015 | Giuliano | |
| 9,209,758 B2 | 12/2015 | Briffa | |
| 9,362,826 B2 | 6/2016 | Giuliano | |
| 9,450,506 B2 | 9/2016 | Perreault | |
| 9,577,590 B2 | 2/2017 | Levesque | |
| 9,634,577 B2 | 4/2017 | Perreault | |
| 9,712,051 B2 | 7/2017 | Giuliano | |
| 9,755,672 B2 | 9/2017 | Perreault | |
| 9,882,471 B2 * | 1/2018 | Giuliano | H02M 3/158 |
| 10,326,358 B2 | 6/2019 | Giuliano | |
| 10,381,924 B2 | 8/2019 | Giuliano | |
| 10,389,235 B2 | 8/2019 | Giuliano | |
| 10,404,162 B2 * | 9/2019 | Giuliano | H02M 7/25 |
| 10,541,611 B2 | 1/2020 | Giuliano | |
| 10,680,515 B2 | 6/2020 | Giuliano | |
| 10,917,007 B2 | 2/2021 | Giuliano | |
| 10,938,300 B2 | 3/2021 | Giuliano | |
| 2004/0170030 A1 | 9/2004 | Duerbaum | |
| 2004/0222775 A1 | 11/2004 | Muramatsu | |
| 2005/0088865 A1 | 4/2005 | Lopez | |
| 2005/0213267 A1 | 9/2005 | Azrai | |
| 2005/0286278 A1 | 12/2005 | Perreault | |
| 2006/0213890 A1 | 9/2006 | Kooken | |
| 2006/0226130 A1 | 10/2006 | Kooken | |
| 2007/0035977 A1 | 2/2007 | Odell | |
| 2007/0051712 A1 | 3/2007 | Kooken | |

(56) References Cited

U.S. PATENT DOCUMENTS

| | | |
|---|---|---|
| 2007/0066224 A1 | 3/2007 | D'Hont |
| 2007/0066250 A1 | 3/2007 | Takahashi |
| 2007/0069818 A1 | 3/2007 | Bhatti |
| 2007/0091655 A1 | 4/2007 | Oyama |
| 2007/0123184 A1 | 5/2007 | Nesimoglu |
| 2007/0146020 A1 | 6/2007 | Williams |
| 2007/0146090 A1 | 6/2007 | Carey |
| 2007/0159257 A1 | 7/2007 | Lee |
| 2007/0171680 A1 | 7/2007 | Perreault |
| 2007/0247222 A1 | 10/2007 | Sorrells |
| 2007/0247253 A1 | 10/2007 | Carey |
| 2007/0281635 A1 | 12/2007 | McCallister |
| 2007/0290747 A1 | 12/2007 | Traylor |
| 2007/0291718 A1 | 12/2007 | Chan |
| 2008/0001660 A1 | 1/2008 | Rasmussen |
| 2008/0003960 A1 | 1/2008 | Zolfaghari |
| 2008/0003962 A1 | 1/2008 | Ngai |
| 2008/0007333 A1 | 1/2008 | Lee |
| 2008/0012637 A1 | 1/2008 | Aridas |
| 2008/0013236 A1 | 1/2008 | Weng |
| 2008/0019459 A1 | 1/2008 | Chen |
| 2008/0031023 A1 | 2/2008 | Kitagawa |
| 2008/0055946 A1 | 3/2008 | Lesso |
| 2008/0062724 A1 | 3/2008 | Feng |
| 2008/0084717 A1 * | 4/2008 | Wu .................... H02M 3/1584 363/44 |
| 2008/0136500 A1 | 6/2008 | Frulio |
| 2008/0136991 A1 | 6/2008 | Senda |
| 2008/0158915 A1 | 7/2008 | Williams |
| 2008/0239772 A1 | 10/2008 | Oraw |
| 2009/0033293 A1 | 2/2009 | Xing |
| 2009/0059630 A1 | 3/2009 | Williams |
| 2009/0072800 A1 | 3/2009 | Ramadass |
| 2009/0147554 A1 | 6/2009 | Adest |
| 2009/0196082 A1 | 8/2009 | Mazumder |
| 2009/0273955 A1 | 11/2009 | Tseng |
| 2009/0278520 A1 | 11/2009 | Perreault |
| 2009/0302686 A1 | 12/2009 | Fishman |
| 2009/0303753 A1 | 12/2009 | Fu |
| 2009/0322304 A1 | 12/2009 | Oraw |
| 2009/0323380 A1 | 12/2009 | Harrison |
| 2010/0073084 A1 | 3/2010 | Hur |
| 2010/0085786 A1 | 4/2010 | Chiu |
| 2010/0117612 A1 | 5/2010 | Klootwijk |
| 2010/0142239 A1 | 6/2010 | Hopper |
| 2010/0201441 A1 | 8/2010 | Gustavsson |
| 2010/0244189 A1 | 9/2010 | Klootwijk |
| 2010/0244585 A1 | 9/2010 | Tan |
| 2010/0291888 A1 | 11/2010 | Hadjichristos |
| 2010/0308751 A1 | 12/2010 | Nerone |
| 2011/0001542 A1 | 1/2011 | Ranta |
| 2011/0089483 A1 | 4/2011 | Reynes |
| 2011/0148518 A1 | 6/2011 | Lejon |
| 2011/0175591 A1 | 7/2011 | Cuk |
| 2011/0181128 A1 | 7/2011 | Perreault |
| 2012/0043818 A1 | 2/2012 | Stratakos |
| 2012/0064953 A1 | 3/2012 | Dagher |
| 2012/0153907 A1 | 6/2012 | Carobolante |
| 2012/0170334 A1 | 7/2012 | Menegoli |
| 2012/0176195 A1 | 7/2012 | Dawson |
| 2012/0252382 A1 | 10/2012 | Bashir |
| 2013/0005286 A1 | 1/2013 | Chan |
| 2013/0049885 A1 | 2/2013 | Rozman |
| 2013/0058049 A1 | 3/2013 | Roth |
| 2013/0094157 A1 | 4/2013 | Giuliano |
| 2013/0106380 A1 | 5/2013 | Marsili |
| 2013/0187612 A1 | 7/2013 | Aiura |
| 2013/0229841 A1 | 9/2013 | Guliano |
| 2013/0241625 A1 | 9/2013 | Perreault |
| 2013/0293207 A1 * | 11/2013 | Wei .................... H02M 3/1584 323/272 |
| 2013/0343106 A1 | 12/2013 | Perreault |
| 2013/0343107 A1 | 12/2013 | Perreault |
| 2014/0015731 A1 | 1/2014 | Khlat |
| 2014/0118065 A1 | 5/2014 | Briffa |
| 2014/0118072 A1 | 5/2014 | Briffa |
| 2014/0120854 A1 | 5/2014 | Briffa |
| 2014/0159681 A1 | 6/2014 | Oraw |
| 2014/0167513 A1 | 6/2014 | Chang |
| 2014/0225581 A1 | 8/2014 | Giuliano |
| 2014/0226378 A1 | 8/2014 | Perreault |
| 2014/0306648 A1 | 10/2014 | Le |
| 2014/0306673 A1 | 10/2014 | Le |
| 2014/0313781 A1 | 10/2014 | Perreault |
| 2014/0335805 A1 | 11/2014 | Briffa |
| 2014/0339918 A1 | 11/2014 | Perreault |
| 2014/0355322 A1 | 12/2014 | Perreault |
| 2015/0022173 A1 | 1/2015 | Le |
| 2015/0023063 A1 | 1/2015 | Perreault |
| 2015/0084701 A1 | 3/2015 | Perreault |
| 2015/0097538 A1 | 4/2015 | Le |
| 2015/0102798 A1 | 4/2015 | Giuliano |
| 2015/0155895 A1 | 6/2015 | Perrault |
| 2015/0280553 A1 | 10/2015 | Giuliano |
| 2015/0295497 A1 | 10/2015 | Perreault |
| 2015/0357912 A1 | 12/2015 | Perreault |
| 2015/0364991 A1 | 12/2015 | Chung |
| 2016/0093948 A1 | 3/2016 | Lehtola |
| 2016/0094126 A1 | 3/2016 | Liu |
| 2016/0111356 A1 | 4/2016 | Cho |
| 2016/0197552 A1 | 7/2016 | Giuliano |
| 2016/0254754 A1 | 9/2016 | Perreault |
| 2016/0322894 A1 | 11/2016 | Giuliano |
| 2017/0237351 A1 | 8/2017 | Giuliano |
| 2017/0244318 A1 | 8/2017 | Giuliano |
| 2017/0279374 A1 | 9/2017 | Friebe |
| 2017/0300078 A1 | 10/2017 | Puggelli |
| 2017/0302093 A1 | 10/2017 | Peterson |
| 2018/0034363 A1 | 2/2018 | Giuliano |
| 2018/0145587 A1 | 5/2018 | Giuliano |
| 2018/0205315 A1 | 7/2018 | Giuliano |
| 2019/0027468 A1 | 1/2019 | Giuliano |
| 2019/0028018 A1 | 1/2019 | Datta |
| 2019/0115830 A1 | 4/2019 | Giuliano |
| 2019/0207513 A1 | 7/2019 | Ramadass |
| 2019/0393777 A1 | 12/2019 | Giuliano |
| 2020/0021187 A1 | 1/2020 | Chang |
| 2020/0036286 A1 | 1/2020 | Giuliano |
| 2020/0083805 A1 | 3/2020 | Mauri |
| 2020/0112247 A1 | 4/2020 | Giuliano |
| 2020/0127557 A1 | 4/2020 | Giuliano |
| 2020/0136494 A1 | 4/2020 | Kazama |
| 2020/0195136 A1 | 6/2020 | Huang |
| 2020/0204172 A1 | 6/2020 | Geng |
| 2020/0246626 A1 | 8/2020 | Labbe |
| 2020/0253520 A1 | 8/2020 | Wang |
| 2021/0013798 A1 | 1/2021 | Giuliano |

FOREIGN PATENT DOCUMENTS

| | | |
|---|---|---|
| CN | 101647182 | 2/2010 |
| CN | 101662208 | 3/2010 |
| CN | 101976953 | 2/2011 |
| CN | 102055328 | 5/2011 |
| CN | 102769986 | 11/2012 |
| CN | 103650313 | 3/2014 |
| CN | 103650314 | 3/2014 |
| CN | 103975433 | 8/2014 |
| CN | 104011985 | 8/2014 |
| CN | 105229909 | 1/2016 |
| CN | 107580748 | 1/2018 |
| CN | 108964442 | 12/2018 |
| CN | 109219919 | 1/2019 |
| CN | 109478845 | 3/2019 |
| CN | 112838760 | 5/2021 |
| DE | 10358299 | 7/2005 |
| DE | 112016001188 | 3/2018 |
| DE | 112017002374 | 1/2019 |
| EP | 0513920 | 11/1992 |
| EP | 1750366 | 2/2007 |
| EP | 2705597 | 3/2014 |
| EP | 3425784 | 1/2019 |
| GB | 2505371 | 2/2014 |
| JP | 2000134095 | 5/2000 |

(56) References Cited

FOREIGN PATENT DOCUMENTS

| | | |
|---|---|---|
| JP | 2002062858 | 2/2002 |
| JP | 2018508178 | 3/2018 |
| KR | 20110053681 | 5/2011 |
| KR | 20140015528 | 2/2014 |
| KR | 20150085072 | 7/2015 |
| KR | 101556838 | 10/2015 |
| KR | 20180004116 | 1/2018 |
| KR | 20180118234 | 10/2018 |
| TW | 201644164 | 12/2016 |
| WO | WO2007136919 | 11/2007 |
| WO | WO2012151466 | 11/2012 |
| WO | WO2013086445 | 6/2013 |
| WO | WO2014070998 | 5/2014 |
| WO | WO2014168911 | 10/2014 |
| WO | WO2016149105 | 9/2016 |
| WO | WO2017196826 | 11/2017 |

OTHER PUBLICATIONS

CN201810954743: Decision on Rejection dated May 27, 2021, 7 pages (30096-002CN2), Doc 8099.
CN201680027105.3: Response to Third Office Action filed Jun. 17, 2021, 14 pages (30096-018CN1), Doc 8100.
U.S. Appl. No. 16/456,060: Issue Fee Payment and Comments filed Jul. 28, 2021, 8 pages (30096-031002) Doc 8103.
CN201780042383: Patent Certificate dated Mar. 23, 2021, 4 pages (30096-029CN1) Doc 8040.
202110224392.X: Notice of Entry into Substantive Examination dated May 31, 2021, 3 pages (30096-029CN2), Doc 8102.
U.S. Appl. No. 16/456,060: Request for Continued Examination and Information Disclosure Statement filed Apr. 5, 2021, 96 pages (30096-031002) Doc 8046.
U.S. Appl. No. 16/456,060: Response to Notice to File Corrected Application Papers filed Apr. 12, 2021, 22 pages (30096-031002) Doc 8043.
U.S. Appl. No. 16/456,060: Notice of Allowance/Allowability dated Apr. 28, 2021, 39 pages (30096-031002) Doc 8045.
CN 201780030693: Second Office Action dated Mar. 15, 2021, 19 pages (30096-022CN1) Doc 8039.
202110224392.X: Request for Examination filed Apr. 30, 2021, 2 pages (30096-029CN2), Doc 8041.
Giuliano—"Architectures and Topologies for Power Delivery", Biannual Review of MIT Center for Integrated Circuits; Power Point Presentation, May 9, 2007, 17 slides, Doc 7426.
Giuliano—"Architectures and Topologies for Power Delivery", Biannual Review of MIT Center for Integrated Circuits; Power Point Presentation, May 9, 2007, 17 slides.
U.S. Appl. No. 16/931,768: Issue Notification dated Feb. 10, 2021, 13 pages (30096-002007), Doc 7414.
U.S. Appl. No. 17/187,664: U.S. Appl. No. 17/187,664, filed Feb. 26, 2021, 56 pages (30096-002008), Doc 7415.
U.S. Appl. No. 17/187,664: Filing Receipt and Notice to File Missing Parts dated Mar. 10, 2021, 7 pages (30096-002008), Doc 7416.
U.S. Appl. No. 16/534,196: Office Action dated Jan. 29, 2021, 10 pages (30096-018003) Doc 7419.
U.S. Appl. No. 16/862,351: Notice of Publication dated Jan. 14, 2021, 1 page (30096-022003) Doc 7423.
CN201810954743: Response to Second Office Action filed Feb. 7, 2021, 41 pages (30096-002CN2), Doc 7417.
EP18188795: Article 94(3) Communication dated Jan. 12, 2021, 5 pages (30096-002EP2) Doc 7418.
CN201680027105.3: Third Office Action dated Feb. 3, 2021, 26 pages (30096-018CN1), Doc 7420.
JP2017567041: Final Office Action dated Mar. 29, 2021, 8 pages (30096-018JP1), Doc 7421.
KR20177029575: Voluntary Amendment and Request for Examination filed Mar. 9, 2021, 38 pages (30096-018KR1) Doc 7422.
CN201780042383: Decision to Grant dated Dec. 14, 2020, 4 pages (30096-029CN1) Doc 7424.
202110224392.X: Patent Application No. 202110224392.X filed Mar. 1, 2021, 128 pages (30096-029CN2), Doc 7425.
Andreassen—"Digital Variable Frequency Control for Zero Voltage Switching and Interleaving of Synchronous Buck Converters" 12th Intl. Power Electronics and Motion Control Conference, IEEE Aug. 2006, pp. 184-188, 5 pages, Doc 7043.
Cao—"Multiphase Multilevel Modular DC-DC Converter for High-Current High-Gain TEG Application" IEEE Transactions on Industry Applications, vol. 47, No. 3, May/Jun. 1991, pp. 1400-1408, 9 pages, Doc 7042.
Cheng—"New Generation of Switched Capacitor Converters" PESC 98 Record, 29th Annual IEEE Power Electronics and Motion Control Conference, Wuhan, China, May 17-20, 2009, pp. 1529-1535, 7 pages, Doc 7049.
Luo—"Investigation of Switched-Capacitorized DC/DC Converters" 2009 IEEE 6th Intl. Power Electronics and Motion Control Conference, Wuhan, China, May 17-20, 2009, pp. 1270-1276, 7 pages, Doc 7050.
U.S. Appl. No. 13/771,904, filed Feb. 20, 2013, 62 pages (30096-002US1), Doc 7111.
U.S. Appl. No. 13/771,904: Filing Receipt and Notice to File Corrected Application Papers dated Mar. 20, 2013, 6 pages (30096-002US1), Doc 7112.
U.S. Appl. No. 13/771,904: Response to Notice to File Corrected Application Papers filed May 20, 2013, 30 pages (30096-002US1), Doc 7113.
U.S. Appl. No. 13/771,904: Updated Filing Receipt and Informational Notice dated May 28, 2013, 4 pages (30096-002US1), Doc 7114.
U.S. Appl. No. 13/771,904: Notice of Publication dated Sep. 5, 2013, 1 page (30096-002US1), Doc 7115.
U.S. Appl. No. 13/771,904: Nonfinal Office Action dated Sep. 13, 2013, 12 pages (30096-002US1), Doc 7116.
U.S. Appl. No. 13/771,904: Amendment filed Mar. 13, 2014, 11 pages (30096-002US1), Doc 7117.
U.S. Appl. No. 13/771,904: Final Office Action dated Apr. 8, 2014, 16 pages (30096-002US1), Doc 7118.
U.S. Appl. No. 13/771,904: Amendment filed May 23, 2014, 11 pages (30096-002US1), Doc 7119.
U.S. Appl. No. 13/771,904: Notice of Allowance dated Jun. 9, 2014, 12 pages (30096-002US1), Doc 7120.
U.S. Appl. No. 13/771,904: Issue Fee Payment and 312 Amendment filed Aug. 29, 2014, 14 pages (30096-002US1), Doc 7121.
U.S. Appl. No. 13/771,904: Examiner Response to 312 Amendment dated Sep. 11, 2014, 3 pages (30096-002US1), Doc 7122.
U.S. Appl. No. 13/771,904: Issue Notification dated Sep. 24, 2014, 1 page (30096-002US1), Doc 7123.
U.S. Appl. No. 14/513,747, filed Oct. 14, 2014, 76 pages (30096-002002) Doc 7124.
U.S. Appl. No. 14/513,747: Filing Receipt and Notice to File Corrected Application Papers dated Oct. 22, 2014, 5 pages (30096-002002) Doc 7125.
U.S. Appl. No. 14/513,747: Response to Notice to File Corrected Application Papers with Amendment dated Dec. 22, 2014, 47 pages (30096-002002) Doc 7126.
U.S. Appl. No. 14/513,747: Updated Filing Receipt dated Jan. 5, 2015, 3 pages (30096-002002) Doc 7127.
U.S. Appl. No. 14/513,747: Notice of Publication dated Apr. 16, 2015, 1 page (30096-002002) Doc 7128.
U.S. Appl. No. 14/513,747: Petition to Make Special Under Patent Prosecution Highway dated Apr. 22, 2015, 4 pages (30096-002002) Doc 7129.
U.S. Appl. No. 14/513,747: Decision Granting Petition to Make Special Under Patent Prosecution Highway dated Apr. 22, 2015, 5 pages (30096-002002) Doc 7130.
U.S. Appl. No. 14/513,747: Non-final Office Action dated Jun. 17, 2015, 19 pages (30096-002002) Doc 7131.
U.S. Appl. No. 14/513,747: Amendment filed Sep. 17, 2015, 13 pages (30096-002002) Doc 7132.
U.S. Appl. No. 14/513,747: Final Office Action dated Oct. 14, 2015, 17 pages (30096-002002) Doc 7133.

(56) References Cited

OTHER PUBLICATIONS

U.S. Appl. No. 14/513,747: Amendment filed Jan. 14, 2016, 12 pages (30096-002002) Doc 7134.
U.S. Appl. No. 14/513,747: Notice of Allowance dated Jan. 26, 2016, 12 pages (30096-002002) Doc 7135.
U.S. Appl. No. 14/513,747: Issue Fee Payment filed Apr. 26, 2016, 1 page (30096-002002) Doc 7136.
U.S. Appl. No. 14/513,747: Issue Notification dated May 10, 2016, 1 page (30096-002002) Doc 7137.
U.S. Appl. No. 15/138,692, filed Apr. 26, 2016, 60 pages (30096-002003) Doc 7138.
U.S. Appl. No. 15/138,692: Filing Receipt and Notice to File Missing Parts dated May 13, 2016, 6 pages (30096-002003) Doc 7139.
U.S. Appl. No. 15/138,692: Response to Notice to File Missing Parts and Amendment dated Jul. 13, 2016, 14 pages (30096-002003) Doc 7140.
U.S. Appl. No. 15/138,692: Updated Filing Receipt dated Jul. 13, 2016, 4 pages (30096-002003) Doc 7141.
U.S. Appl. No. 15/138,692: Notice of Publication dated Nov. 3, 2016, 1 page (30096-002003) Doc 7142.
U.S. Appl. No. 15/138,692: Notice of Allowance and Allowability dated Mar. 10, 2017, 24 pages (30096-002003) Doc 7143.
U.S. Appl. No. 15/138,692: Supplemental Notice of Allowability dated Apr. 11, 2017, 5 pages (30096-002003) Doc 7144.
U.S. Appl. No. 15/138,692: Issue Fee Payment and 312 Amendment filed Jun. 9, 2017, 10 pages (30096-002003) Doc 7145.
U.S. Appl. No. 15/138,692: Examiner Response to 312 Amendment and Corrected Filing Receipt dated Jun. 21, 2017, 6 pages (30096-002003) Doc 7146.
U.S. Appl. No. 15/138,692: Issue Notification dated Jun. 28, 2017, 1 page (30096-002003) Doc 7147.
U.S. Appl. No. 15/618,481, filed Jun. 9, 2017, 63 pages (30096-002004) Doc 7148.
U.S. Appl. No. 15/618,481: Filing Receipt and Notice to File Missing Parts dated Jun. 20, 2017, 6 pages (30096-002004) Doc 7149.
U.S. Appl. No. 15/618,481: Response to Notice to File Missing Parts and Preliminary Amendment filed Oct. 20, 2017, 21 pages (30096-002004) Doc 7150.
U.S. Appl. No. 15/618,481: Request to Update Name of Applicant filed Oct. 24, 2017, 11 pages (30096-002004) Doc 7151.
U.S. Appl. No. 15/618,481: Updated Filing Receipt dated Oct. 24, 2017, 5 pages (30096-002004) Doc 7152.
U.S. Appl. No. 15/618,481: Corrected Filing Receipt and Acceptance of Power of Attorney dated Oct. 26, 2017, 5 pages (30096-002004) Doc 7153.
U.S. Appl. No. 15/618,481: Notice of Publication dated Feb. 1, 2018, 1 page (30096-002004) Doc 7154.
U.S. Appl. No. 15/618,481: Request to Update Name of Applicant filed Feb. 23, 2018, 12 pages (30096-002004) Doc 7155.
U.S. Appl. No. 15/618,481: Corrected Filing Receipt dated May 14, 2018, 4 pages (30096-002004) Doc 7156.
U.S. Appl. No. 15/618,481: Notice of Allowance and Allowability dated Feb. 6, 2019, 27 pages (30096-002004) Doc 7157.
U.S. Appl. No. 15/618,481: Issue Fee Payment dated May 3, 2019, 6 pages (30096-002004) Doc 7158.
U.S. Appl. No. 15/618,481: Issue Notification dated May 29, 2019, 1 page (30096-002004) Doc 7159.
U.S. Appl. No. 16/444,428, filed Jun. 18, 2019, 59 pages (30096-002005) Doc 7160.
U.S. Appl. No. 16/444,428: Filing Receipt and Notice to File Missing Parts dated Jun. 26, 2019, 7 pages (30096-002005) Doc 7161.
U.S. Appl. No. 16/444,428: Response to Notice to File Missing Parts dated Dec. 26, 2019, 15 pages (30096-002005) Doc 7162.
U.S. Appl. No. 16/444,428: Updated Filing dated Dec. 30, 2019, 6 pages (30096-002005) Doc 7163.
U.S. Appl. No. 16/444,428: Notice of Publication dated Apr. 9, 2020, 1 page (30096-002005) Doc 7164.
U.S. Appl. No. 16/444,428: Preliminary Amendment dated May 8, 2020, 13 pages (30096-002005) Doc 7165.
U.S. Appl. No. 16/444,428: Supplemental Amendment dated Jul. 29, 2020, 13 pages (30096-002005) Doc 7166.
U.S. Appl. No. 16/444,428: Notice of Allowance and Allowability dated Aug. 24, 2020, 33 pages (30096-002005) Doc 7167.
U.S. Appl. No. 16/444,428: Request for Continued Examination filed Sep. 8, 2020, 14 pages (30096-002005) Doc 7168.
U.S. Appl. No. 16/444,428: Notice of Allowance and Allowability dated Sep. 16, 2020, 33 pages (30096-002005) Doc 7169.
U.S. Appl. No. 16/444,428: Notice of Allowance and Allowability dated Oct. 30, 2020, 36 pages (30096-002005) Doc 7375.
U.S. Appl. No. 16/919,033, filed Jul. 1, 2020, 73 pages (30096-002006), Doc 7170.
U.S. Appl. No. 16/919,033: Amended Application Data Sheet filed Jul. 2, 2020, 7 pages (30096-002006), Doc 7171.
U.S. Appl. No. 16/919,033: Filing Receipt and Notice of Missing Parts dated Jul. 15, 2020, 12 pages (30096-002006), Doc 7172.
U.S. Appl. No. 16/919,033: Petition for Express Abandonment filed Sep. 8, 2020, 4 pages (30096-002006), Doc 7390.
U.S. Appl. No. 16/919,033: Decision Granting Petition for Express Abandonment dated Oct. 16, 2020, 2 pages (30096-002006), Doc 7391.
U.S. Appl. No. 16/931,768, filed Jul. 17, 2020, 73 pages (30096-002007), Doc 7376.
U.S. Appl. No. 16/931,768: Filing Receipt dated Jul. 29, 2020, 6 pages (30096-002007), Doc 7377.
U.S. Appl. No. 16/931,768: Acceptance of Track One dated Jul. 30, 2020, 2 pages (30096-002007), Doc 7378.
U.S. Appl. No. 16/931,768: Notice of Allowance and Allowability dated Aug. 25, 2020, 26 pages (30096-002007), Doc 7379.
U.S. Appl. No. 16/931,768: Corrected Notice of Allowability dated Sep. 14, 2020, 7 pages (30096-002007), Doc 7380.
U.S. Appl. No. 16/931,768: Corrected Notice of Allowability dated Oct. 15, 2020, 11 pages (30096-002007), Doc 7381.
U.S. Appl. No. 16/931,768: Notice of Publication dated Nov. 5, 2020, 1 page (30096-002007), Doc 7382.
U.S. Appl. No. 16/931,768: Request for Continued Examination filed Nov. 5, 2020, 14 pages (30096-002007), Doc 7383.
U.S. Appl. No. 16/931,768: Notice of Allowance and Notice of Allowability dated Dec. 3, 2020, 26 pages (30096-002007), Doc 7392.
U.S. Appl. No. 16/931,768: Issue Fee Payment and 312 Response filed Dec. 30, 2020 , 13 pages (30096-002007), Doc 7393.
U.S. Appl. No. 15/068,985, filed Mar. 14, 2016, 90 pages (30096-018001) Doc 7197.
U.S. Appl. No. 15/068,985: Filing Receipt and Informational Notice dated Mar. 29, 2016, 5 pages (30096-018001) Doc 7198.
U.S. Appl. No. 15/068,985: Request for Corrected filed Apr. 29, 2016, 8 pages (30096-018001) Doc 7199.
U.S. Appl. No. 15/068,985: Preliminary Amendment filed Apr. 29, 2016, 3 pages (30096-018001) Doc 7200.
U.S. Appl. No. 15/068,985: Corrected Filing Receipt dated May 9, 2016, 3 pages (30096-018001) Doc 7201.
U.S. Appl. No. 15/068,985: Request for Corrected Filing Receipt dated May 31, 2016, 1 page (30096-018001) Doc 7202.
U.S. Appl. No. 15/068,985: Corrected Filing Receipt dated Jun. 8, 2016, 4 pages (30096-018001) Doc 7203.
U.S. Appl. No. 15/068,985: Notice of Publication dated Jul. 7, 2016, 1 page (30096-018001) Doc 7204.
U.S. Appl. No. 15/068,985: Non-final Office Action dated Mar. 7, 2017, 20 pages (30096-018001) Doc 7205.
U.S. Appl. No. 15/068,985: Response to Non-final Office Action filed Jul. 7, 2017, 20 pages (30096-018001) Doc 7206.
U.S. Appl. No. 15/068,985: Notice of Allowance dated Aug. 11, 2017, 17 pages (30096-018001) Doc 7207.
U.S. Appl. No. 15/068,985: Issue Fee Payment and 312 Amendment filed Nov. 9, 2017, 16 pages (30096-018001) Doc 7208.
U.S. Appl. No. 15/068,985: Request to Expedite Petition to Correct Priority filed Nov. 14, 2017, 5 pages (30096-018001) Doc 7209.
U.S. Appl. No. 15/068,985: Order Granting Petition to Correct Priority and Corrected Filing Receipt dated Nov. 28, 2017, 6 pages (30096-018001) Doc 7210.

(56) References Cited

OTHER PUBLICATIONS

U.S. Appl. No. 15/068,985: Issue Notification dated Jan. 10, 2018, 1 page (30096-018001) Doc 7211.
U.S. Appl. No. 15/813,546, filed Nov. 15, 2017, 77 pages (30096-018002), Doc 7212.
U.S. Appl. No. 15/813,546: Filing Receipt and Notice to File Missing Parts dated Dec. 13, 2017, 7 pages (30096-018002), Doc 7213.
U.S. Appl. No. 15/813,546: Response to Notice to File Missing Parts and Preliminary Amendment filed Feb. 12, 2018, 12 pages (30096-018002), Doc 7214.
U.S. Appl. No. 15/813,546: Updated Filing Receipt dated Feb. 15, 2018, 5 pages (30096-018002), Doc 7215.
U.S. Appl. No. 15/813,546: Amended Application Data Sheet filed Feb. 28, 2018, 12 pages (30096-018002), Doc 7216.
U.S. Appl. No. 15/813,546: Notice of Publication dated May 24, 2018, 1 page (30096-018002), Doc 7217.
U.S. Appl. No. 15/813,546: Non-final Office Action dated Jun. 1, 2018, 17 pages (30096-018002), Doc 7218.
U.S. Appl. No. 15/813,546: Amendment and terminal Disclaimer filed Aug. 30, 2018, 15 pages (30096-018002), Doc 7219.
U.S. Appl. No. 15/813,546: Request to Change Applicant Name filed Sep. 5, 2018, 13 pages (30096-018002), Doc 7220.
U.S. Appl. No. 15/813,546: Updated Filing Receipt dated Jan. 9, 2019, 4 pages (30096-018002), Doc 7221.
U.S. Appl. No. 15/813,546: Final Rejection dated Mar. 11, 2019, 10 pages (30096-018002), Doc 7222.
U.S. Appl. No. 15/813,546: Response to Final Rejection and Terminal Disclaimer dated Mar. 20, 2019, 10 pages (30096-018002), Doc 7223.
U.S. Appl. No. 15/813,546: Approval Terminal Disclaimer dated Mar. 22, 2019, 1 page (30096-018002), Doc 7224.
U.S. Appl. No. 15/813,546: Notice of Allowance and Allowability dated Apr. 3, 2019, 16 pages (30096-018002), Doc 7225.
U.S. Appl. No. 15/813,546: Supplemental Notice of Allowability dated Jun. 25, 2019, 3 pages (30096-018002), Doc 7226.
U.S. Appl. No. 15/813,546: Issue Fee Payment and 312 Amendment dated Jul. 3, 2019, 15 pages (30096-018002), Doc 7227.
U.S. Appl. No. 15/813,546: Response to 312 Amendment dated Aug. 6, 2019, 3 pages (30096-018002), Doc 7228.
U.S. Appl. No. 15/813,546: Issue Notification dated Aug. 14, 2019, 1 page (30096-018002), Doc 7229.
PCT/US2017/023191: PCT Application filed Mar. 20, 2017, 94 pages (30096-022WO1) Doc 7345.
PCT/US2017/023191: Intl Search Report and Written Opinion dated Jun. 30, 2017, 9 pages (30096-022WO1) Doc 7356.
U.S. Appl. No. 16/085,680, filed Sep. 17, 2018, 391 pages (30096-022US1) Doc 7243.
U.S. Appl. No. 16/085,680: Filing Receipt dated Jan. 9, 2019, 7 pages (30096-022US1) Doc 7244.
U.S. Appl. No. 16/085,680: Notice of Allowance and Allowability dated Mar. 8, 2019, 17 pages (30096-022US1) Doc 7245.
U.S. Appl. No. 16/085,680: Notice of Publication dated Apr. 18, 2019, 1 page (30096-022US1) Doc 7246.
U.S. Appl. No. 16/085,680: Replacement Figures filed Apr. 23, 2019, 8 pages (30096-022US1) Doc 7247.
U.S. Appl. No. 16/085,680: Examiner Interview Summary dated May 14, 2019, 5 pages (30096-022US1) Doc 7248.
U.S. Appl. No. 16/085,680: Examiner Interview Summary dated May 16, 2019, 5 pages (30096-022US1) Doc 7249.
U.S. Appl. No. 16/085,680: Supplemental Notice of Allowability dated May 24, 2019, 20 pages (30096-022US1) Doc 7250.
U.S. Appl. No. 16/085,680: Issue Fee Payment filed Jun. 10, 2019, 7 pages (30096-022US1) Doc 7251.
U.S. Appl. No. 16/085,680: Issue Notification dated Jul. 24, 2019, 1 page (30096-022US1) Doc 7252.
U.S. Appl. No. 16/538,068, filed Aug. 12, 2019, 105 pages (30096-022002) Doc 7253.
U.S. Appl. No. 16/538,068: Filing Receipt and Notice to File Missing Parts dated Aug. 23, 2019, 7 pages (30096-022002) Doc 7254.
U.S. Appl. No. 16/538,068: Response to Notice to File Missing Parts dated Oct. 23, 2019, 6 pages (30096-022002) Doc 7255.
U.S. Appl. No. 16/538,068: Updated Filing Receipt dated Oct. 25, 2019, 5 pages (30096-022002) Doc 7256.
U.S. Appl. No. 16/538,068: Notice of Allowance and Allowability dated Jan. 29, 2020, 33 pages (30096-022002) Doc 7257.
U.S. Appl. No. 16/538,068: Notice of Publication dated Jan. 30, 2020, 1 page (30096-022002) Doc 7258.
U.S. Appl. No. 16/538,068: Issue Fee Payment filed Apr. 29, 2020, 8 pages (30096-022002) Doc 7259.
U.S. Appl. No. 16/538,068: Issue Notification dated May 20, 2020, 1 page (30096-022002) Doc 7260.
U.S. Appl. No. 16/862,351, filed Apr. 29, 2020, 98 pages (30096-022003) Doc 7261.
U.S. Appl. No. 16/862,351: Filing Receipt and Notice to File Missing Parts dated May 6, 2020, 9 pages (30096-022003) Doc 7262.
U.S. Appl. No. 16/862,351: Response to Missing Parts and Preliminary Amendment filed Oct. 6, 2020, 18 pages (30096-022003) Doc 7386.
PCT/US2017/031726: PCT Application filed May 9, 2017, 67 pages (30096-029WO1) Doc 7346.
PCT/US2017/031726: Intl Search Report and Written Opinion dated Aug. 8, 2017, 67 pages (30096-029WO1) Doc 7361.
PCT/US2017/031726: Intl Preliminary Report on Patentability dated Nov. 22, 2018, 67 pages (30096-029WO1) Doc 7363.
DE112017002374: DE Patent Application filed Nov. 8, 2018, 167 pages (30096-029DE1) Doc 7285.
U.S. Appl. No. 15/590,562, filed May 9, 2017, 130 pages (30096-031001) Doc 7263.
U.S. Appl. No. 15/590,562: Filing Receipt and Informational Notice dated May 9, 2017, 7 pages (30096-031001) Doc 7264.
U.S. Appl. No. 15/590,562: Notice of Publication dated Aug. 24, 2017, 1 page (30096-031001) Doc 7265.
U.S. Appl. No. 15/590,562: Restriction Requirement dated Aug. 24, 2017, 7 pages (30096-031001) Doc 7266.
U.S. Appl. No. 15/590,562: Response to Restriction Requirement and Preliminary Amendment filed Mar. 12, 2018, 15 pages (30096-031001) Doc 7267.
U.S. Appl. No. 15/590,562: Non-final Office Action dated Sep. 20, 2018, 1 page (30096-031001) Doc 7268.
U.S. Appl. No. 15/590,562: Amendment filed Dec. 18, 2018, 26 pages (30096-031001) Doc 7269.
U.S. Appl. No. 15/590,562: Applicant Summary of Interview with Examiner dated Mar. 22, 2019, 8 pages (30096-031001) Doc 7270.
U.S. Appl. No. 15/590,562: Notice of Allowance and Allowability dated Apr. 5, 2019, 19 pages (30096-031001) Doc 7271.
U.S. Appl. No. 15/590,562: Request to Change Applicant Name filed May 24, 2019, 13 pages (30096-031001) Doc 7272.
U.S. Appl. No. 15/590,562: Updated Filing Receipt dated Jun. 3, 2019, 9 pages (30096-031001) Doc 7273.
U.S. Appl. No. 15/590,562: Issue Fee Payment filed Jul. 3, 2019, 6 pages (30096-031001) Doc 7274.
U.S. Appl. No. 15/590,562: Issue Notification dated Jul. 31, 2019, 1 page (30096-031001) Doc 7275.
U.S. Appl. No. 16/456,060, filed Jun. 28, 2019, 141 pages (30096-031002) Doc 7276.
U.S. Appl. No. 16/456,060: Filing Receipt and Notice to File Missing Parts dated Jul. 12, 2019, 8 pages (30096-031002) Doc 7277.
U.S. Appl. No. 16/456,060: Response to Notice to File Missing Parts and Preliminary Amendment filed Sep. 12, 2019, 32 pages (30096-031002) Doc 7278.
U.S. Appl. No. 16/456,060: Updated Filing Receipt dated Sep. 17, 2019, 6 pages (30096-031002) Doc 7279.
U.S. Appl. No. 16/456,060: Notice of Publication dated Dec. 26, 2019, 1 page (30096-031002) Doc 7280.
U.S. Appl. No. 16/456,060: Non-final Office Action dated Jul. 20, 2020, 35 pages (30096-031002) Doc 7281.

(56) References Cited

OTHER PUBLICATIONS

U.S. Appl. No. 16/456,060: Response to Non-final Office Action and Terminal Disclaimer dated Nov. 19, 2020, 14 pages (30096-031002) Doc 7396.
U.S. Appl. No. 16/456,060: Notice of Allowance and Allowability dated Jan. 4, 2021, 9 pages (30096-031002) Doc 7395.
U.S. Appl. No. 12/437,599, filed May 8, 2009, 61 pages Doc 7287.
U.S. Appl. No. 12/437,599: Filing Receipt dated May 8, 2009, 3 pages Doc 7288.
U.S. Appl. No. 12/437,599: Notice of Publication dated Nov. 12, 2009, 1 page Doc 7289.
U.S. Appl. No. 12/437,599: Non-final Office Action dated Oct. 19, 2011, 35 pages Doc 7290.
U.S. Appl. No. 12/437,599: Amendment filed Apr. 13, 2012, 21 pages Doc 7291.
U.S. Appl. No. 12/437,599: Notice of Allowance and Allowability dated May 22, 2012, 16 pages Doc 7292.
U.S. Appl. No. 12/437,599: Examiner Initialed Interview Summary dated May 22, 2012, 1 page Doc 7293.
U.S. Appl. No. 12/437,599: Issue Fee Payment filed May 25, 2012, 5 pages Doc 7294.
U.S. Appl. No. 12/437,599: Issue Notification dated Jun. 13, 2012, 1 page Doc 7295.
U.S. Appl. No. 13/487,781, filed Jun. 4, 2012, 51 pages Doc 7296.
U.S. Appl. No. 13/487,781: Filing Receipt and Notice to File Missing Parts dated Jun. 18, 2012, 5 pages Doc 7297.
U.S. Appl. No. 13/487,781: Response to Notice to File Missing Parts dated Aug. 20, 2012, 5 pages Doc 7298.
U.S. Appl. No. 13/487,781: Updated Filing Receipt dated Aug. 29, 2012, 5 pages Doc 7299.
U.S. Appl. No. 13/487,781: Preliminary Amendment filed Aug. 30, 2012, 14 pages Doc 7300.
U.S. Appl. No. 13/487,781: Updated Filing Receipt dated Sep. 6, 2012, 3 pages Doc 7300.
U.S. Appl. No. 13/487,781: Preliminary Amendment filed Sep. 21, 2012, 6 pages Doc 7302.
U.S. Appl. No. 13/487,781: Notice of Publication dated Dec. 13, 2012, 1 page Doc 7304.
U.S. Appl. No. 13/487,781: Notice of Allowance and Allowability dated Sep. 4, 2013, 22 pages Doc 7305.
U.S. Appl. No. 13/487,781: Issue Fee Payment and 312 Amendment filed Dec. 4, 2013, 23 pages Doc 7306.
U.S. Appl. No. 13/487,781: Response to 312 Amendment dated Dec. 27, 2013, 6 pages Doc 7307.
U.S. Appl. No. 13/487,781: Issue Notification dated Jan. 15, 2014, 1 page Doc 7308.
U.S. Appl. No. 13/599,037, filed Aug. 30, 2012, 59 pages Doc 7309.
U.S. Appl. No. 13/599,037: Filing Receipt dated Sep. 17, 2012, 4 pages Doc 7310.
U.S. Appl. No. 13/599,037: Preliminary Amendment filed Sep. 21, 2012, 5 pages Doc 7311.
U.S. Appl. No. 13/599,037: Notice of Publication dated Dec. 27, 2012, 1 page Doc 7312.
U.S. Appl. No. 13/599,037: e-Terminal Disclaimer filed and accepted Dec. 5, 2013, 7 pages Doc 7313.
U.S. Appl. No. 13/599,037: Notice of Allowance and Allowability dated Jan. 2, 2014, 26 pages Doc 7314.
U.S. Appl. No. 13/599,037: Issue Fee Payment dated Feb. 28, 2014, 8 pages Doc 7315.
U.S. Appl. No. 13/599,037: Issue Notification dated Mar. 26, 2014, 1 page Doc 7316.
U.S. Appl. No. 14/251,917, filed Apr. 14, 2014, 63 pages Doc 7317.
U.S. Appl. No. 14/251,917: Filing Receipt dated May 5, 2014, 3 pages Doc 7318.
U.S. Appl. No. 14/251,917: Notice of Publication dated Aug. 14, 2014, 1 page Doc 7319.
U.S. Appl. No. 14/251,917: Notice of Allowance and Allowability dated Mar. 2, 2015, 23 pages Doc 7320.
U.S. Appl. No. 14/251,917: 312 Amendment filed Apr. 22, 2015, 13 pages Doc 7321.
U.S. Appl. No. 14/251,917: Response to 312 Amendment filed Apr. 30, 2015, 3 pages Doc 7322.
U.S. Appl. No. 14/251,917: Issue Fee Payment filed May 1, 2015, 8 pages Doc 7323.
U.S. Appl. No. 14/251,917: Issue Notification dated May 1, 2015, 8 pages Doc 7324.
U.S. Appl. No. 14/708,903, filed May 11, 2015, 57 pages Doc 7325.
U.S. Appl. No. 14/708,903: Filing Receipt and Notice of Missing Parts filed May 19, 2015, 5 pages Doc 7326.
U.S. Appl. No. 14/708,903: Response to Notice of Missing Parts filed May 19, 2015, 3 pages Doc 7327.
U.S. Appl. No. 14/708,903: Notice of Publication dated Oct. 1, 2015, 1 page Doc 7328.
U.S. Appl. No. 14/708,903: Non-final Office Action filed Oct. 1, 2015, 36 pages Doc 7329.
U.S. Appl. No. 14/708,903: Amendment and e-Terminal Disclaimer filed Jan. 3, 2017, 23 pages Doc 7330.
U.S. Appl. No. 14/708,903: Notice of Allowance and Allowability dated Feb. 23, 2017, 31 pages Doc 7331.
U.S. Appl. No. 14/708,903: Issue Fee Payment filed Apr. 24, 2017, 7 pages Doc 7332.
U.S. Appl. No. 14/708,903: Issue Notification dated May 10, 2017, 1 page Doc 7333.
U.S. Appl. No. 14/708,903: Request for Certificate of Correction filed Apr. 14, 2018, 6 pages Doc 7334.
U.S. Appl. No. 14/708,903: Request for Certificate of Correction filed Apr. 14, 2018, 1 page Doc 7335.
U.S. Appl. No. 15/585,676, filed May 3, 2017, 63 pages Doc 7336.
U.S. Appl. No. 15/585,676: Filing Receipt dated May 12, 2017, 4 pages Doc 7337.
U.S. Appl. No. 15/585,676: Notice of Publication dated Aug. 17, 2017, 1 page Doc 7338.
U.S. Appl. No. 15/585,676: Non-final Office Action dated Oct. 6, 2017, 34 pages Doc 7339.
U.S. Appl. No. 15/585,676: Amendment filed Apr. 5, 2018, 13 pages Doc 7340.
U.S. Appl. No. 15/585,676: Supplemental Amendment filed Apr. 5, 2018, 9 pages Doc 7341.
U.S. Appl. No. 15/585,676: Final Rejection dated Jul. 2, 2018, 9 pages Doc 7342.
U.S. Appl. No. 15/585,676: Notice of Abandonment dated Jan. 25, 2019, 2 pages Doc 7343.
PCT/US12/36455: PCT Application filed May 4, 2012, 59 pages (30096-002W01) Doc 7178.
PCT/US12/36455: International Search Report and Written Opinion dated Nov. 28, 2012, 7 pages (30096-002W01) Doc 7179.
PCT/US12/36455: International Preliminary Report an Patentability dated Nov. 5, 2013, 5 pages (30096-002W01) Doc 7180.
CN201280033387: First Search Report dated Jun. 24, 2015, 2 pages (30096-002CN1) Doc 7052.
CN201280033387: First Office Action dated Jul. 2, 2015, 18 pages (30096-002CN1) Doc 7053.
CN201280033387: Response to First Office Action dated Jan. 18, 2016, 11 pages (30096-002CN1) Doc 7054.
CN201280033387.X: Supplementary Search Report dated Mar. 29, 2016, 1 page (30096-002CN1) Doc 7055.
CN201280033387: Second Office Action dated Apr. 7, 2016, 13 pages (30096-002CN1) Doc 7056.
CN201280033387: Response to Second Office Action filed Aug. 18, 2016, 25 pages (30096-002CN1) Doc 7057.
CN201280033387: Supplementary Search Report dated Jan. 16, 2017, 1 page (30096-002CN1) Doc 7058.
CN201280033387: Third Office Action dated Apr. 7, 2016, 22 pages (30096-002CN1) Doc 7059.
CN201280033387: Response to Third Office Action filed Jun. 1, 2017, 22 pages (30096-002CN1) Doc 7060.
CN201280033387: Fourth Office Action dated Sep. 8, 2017, 24 pages (30096-002CN1) Doc 7061.
CN201280033387: Response to Fourth Office Action filed Jan. 5, 2018, 11 pages (30096-002CN1) Doc 7062.
CN201280033387: Decision to Grant CN Patent dated Jun. 6, 2018, 11 pages (30096-002CN1) Doc 7063.

(56) References Cited

OTHER PUBLICATIONS

CN201280033387: Rectified Decision to Grant CN Patent dated Jun. 27, 2018, 4 pages (30096-002CN1) Doc 7064.
CN201280033387: Certificate of Patent dated Sep. 21, 2018, 2 pages (30096-002CN1) Doc 7065.
CN201810954743: CN Patent Application as filed Aug. 21, 2018, 59 pages (30096-002CN2), Doc 7066.
CN201810954743: Filing Receipt dated Aug. 21, 2018, 1 page (30096-002CN2), Doc 7067.
CN201810954743: Notice of Publication dated Dec. 7, 2018, 33 pages (30096-002CN2), Doc 7071.
CN201810954743: Search Report dated Dec. 19, 2019, 2 pages (30096-002CN2), Doc 7068.
CN201810954743: First Office Action dated Dec. 30, 2019, 23 pages (30096-002CN2), Doc 7069.
CN201810954743: Office Action dated Dec. 30, 2019, 24 pages (30096-002CN2), Doc 7072.
CN201810954743: Response to First Office Action dated Jul. 14, 2020, 34 pages (30096-002CN2), Doc 7070.
CN201810954743: Second Office Action dated Sep. 21, 2020, 21 pages (30096-002CN2), Doc 7353.
EP12780024: EP Application as filed Dec. 3, 2013, 19 pages (30096-002EP1), Doc 7073.
EP12780024: Notice of Publication dated Feb. 12, 2014, 1 page (30096-002EP1), Doc 7074.
EP12780024: Search Report and Opinion dated Feb. 18, 2015, 7 pages (30096-002EP1), Doc 7075.
EP12780024: Rule 70 Communication dated Mar. 6, 2015, 1 page (30096-002EP1), Doc 7076.
EP12780024: Amendment filed Dec. 16, 2015, 13 pages (30096-002EP1), Doc 7077.
EP12780024: Article 94 Communication dated Feb. 23, 2016, 7 pages (30096-002EP1), Doc 7078.
EP12780024: Amendment in Response to Article 94 Communication filed Aug. 10, 2016, 23 pages (30096-002EP1), Doc 7079.
EP12780024: Article 94 Communication dated Jan. 3, 2017, 5 pages (30096-002EP1), Doc 7080.
EP12780024: Amendment in Response to Article 94 Communication filed Jun. 8, 2017, 5 pages (30096-002EP1), Doc 7081.
EP12780024: Intention to Grant dated Feb. 7, 2018, 103 pages (30096-002EP1), Doc 7082.
EP12780024: Request for Correction/Amendment of Granted Claims filed Mar. 13, 2018, 103 pages (30096-002EP1), Doc 7083.
EP12780024: Request for Correction/Amendment of Granted Claims filed Mar. 13, 2018, 103 pages (30096-002EP1), Doc 7084.
EP12780024: Approval/Grant of Request for Correction/Amendment of Granted Claims dated Mar. 13, 2018, 3 pages (30096-002EP1), Doc 7085.
EP12780024: Revised Intention to Grant dated Jul. 4, 2018, 99 pages (30096-002EP1), Doc 7086.
EP12780024: Decision to Grant dated Jul. 19, 2018, 2 pages (30096-002EP1), Doc 7087.
EP12780024: Patent Certificate dated Aug. 15, 2018, 2 page (30096-002EP1), Doc 7088.
EP18188795: EP Patent Application as filed Aug. 13, 2018, 62 pages (30096-002EP2) Doc 7046.
EP18188795: European Search Report dated Sep. 26, 2018, 3 pages (30096-002EP2) Doc 7044.
EP18188795: Extended European Search Report and Opinion dated Oct. 9, 2018, 8 pages (30096-002EP2) Doc 7045.
EP18188795: Notice of Publication dated Dec. 12, 2018, 2 pages (30096-002EP2) Doc 7089.
EP18188795: Amendment and Request for Examination filed Jun. 17, 2019, 28 pages (30096-002EP2) Doc 7047.
EP18188795: Article 94(3) Communication dated Nov. 11, 2019, 7 pages (30096-002EP2) Doc 7041.
EP18188795: Amendment/ Response to 94(3) Objection filed Aug. 21, 2020, 7 pages (30096-002EP2) Doc 7048.
EP18188795: Decision on the Request for Further Processing under 135(3) EPC Sep. 1, 2020, 1 page (30096-002EP2) Doc 7394.
KR20137032399: KR Patent Application filed May 12, 2013, 136 pages (30096-002KR1) Doc 7090.
KR20137032399: Request for Amendment of Inventor Information filed Dec. 13, 2013, 2 pages (30096-002KR1) Doc 7091.
KR20137032399: Amendment of Biographic Data entered Dec. 23, 2013, 4 pages (30096-002KR1) Doc 7092.
KR20137032399: Office Action dated Nov. 18, 2014, 8 pages (30096-002KR1) Doc 7093.
KR20137032399: Amendment to Claims filed Jan. 15, 2015, 21 pages (30096-002KR1) Doc 7094.
KR20137032399: Response to Office Action dated Jan. 15, 2015, 15 pages (30096-002KR1) Doc 7095.
KR20137032399: Final Office Action dated May 22, 2015, 5 pages (30096-002KR1) Doc 7096.
KR20137032399: Amendment filed Jun. 17, 2015, 6 pages (30096-002KR1) Doc 7098.
KR20137032399: Response to Final Office Action filed Jun. 17, 2015, 5 pages (30096-002KR1) Doc 7099.
KR20137032399: Grant of Patent dated Jun. 24, 2015, 2 pages (30096-002KR1) Doc 7100.
KR20137032399: Patent Certificate dated Sep. 23, 2015, 2 pages (30096-002KR1) Doc 7101.
KR20157016195: KR Divisional Application filed Jun. 17, 2015, 126 pages (30096-002KR2) Doc 7097.
KR20157016195: Request for Amendment of Inventor Information filed Jul. 2, 2015, 2 pages (30096-002KR2) Doc 7104.
KR20157016195: Amendment of Bibliographic Data dated Jul. 3, 2015, 4 pages (30096-002KR2) Doc 7105.
KR20157016195: Amendment filed Feb. 29, 2015, 13 pages (30096-002KR2) Doc 7106.
KR20157016195: Amendment filed Apr. 13, 2017, 15 pages (30096-002KR2) Doc 7107.
KR20157016195: Request for Examination filed Apr. 20, 2017, 2 pages (30096-002KR2) Doc 7108.
KR20157016195: Office Action dated Jul. 5, 2017, 9 pages (30096-002KR2) Doc 7109.
KR20157016195: Final Office Action dated Dec. 20, 2017, 9 pages (30096-002KR2) Doc 7110.
PCT/US16/22040: PCT Application filed Mar. 11, 2016, 71 pages (30096-018WO1), Doc 7173.
PCT/US16/22040: International Search Report and Written Opinion dated Jun. 20, 2016, 10 pages (30096-018WO1), Doc 7175.
PCT/US16/22040: Article 19 Amendment filed Sep. 22, 2016, 10 pages (30096-018WO1), Doc 7174.
PCT/US16/22040: International Preliminary Report on Patentability dated Sep. 19, 2017, 7 pages (30096-018WO1), Doc 7177.
CN201680027105.3: CN Application as filed Nov. 9, 2017, 167 pages (30096-018CN1), Doc 7181.
CN201680027105.3: First Office Action dated May 7, 2019, 22 pages (30096-018CN1), Doc 7182.
CN201680027105.3: Response to First Office Action filed Nov. 22, 2019, 25 pages (30096-018CN1), Doc 7184.
CN201680027105.3: Second Office Action dated Mar. 18, 2020, 12 pages (30096-018CN1), Doc 7183.
CN201680027105.3: Response to Second Office Action filed Aug. 3, 2020, 31 pages (30096-018CN1), Doc 7185.
DE112016001188: DE Application filed Sep. 13, 2017, 172 pages (30096-018DE1) Doc 7186.
JP2017567041: JP Application filed Sep. 12, 2017, 68 pages (30096-018JP1), Doc 7189.
JP2017567041: Office Action dated May 25, 2020, 30 pages (30096-018JP1), Doc 7190.
JP2017567041: Response to Office Action filed Oct. 26, 2020, 87 pages (30096-018JP1), Doc 7384.
KR20177029575: KR Application filed Oct. 13, 2017, 169 pages (30096-018KR1) Doc 7191.
KR20177029575: Request for Amendment to Signatory filed Oct. 23, 2017, 2 pages (30096-018KR1) Doc 7193.
KR20177029575: Allowed Amendment to Signatory dated Dec. 11, 2017, 4 pages (30096-018KR1) Doc 7194.
TW105107546: TW Application filed Mar. 11, 2016, 65 pages (30096-018TW1), Doc 7195.

(56) References Cited

OTHER PUBLICATIONS

CN 201780030693: CN Patent Application filed Nov. 16, 2018, 129 pages (30096-022CN1) Doc 7238.
CN 201780030693: Office Action dated Apr. 28, 2020, 15 pages (30096-022CN1) Doc 7240.
CN 201780030693: Response to Office Action filed Nov. 12, 2020, 63 pages (30096-022CN1) Doc 7385.
KR 10-20123-7030031: KR Patent Application filed Oct. 17, 2018, 169 pages (30096-022KR1) Doc 7242.
CN201780042383: CN PatentApplication filed Jan. 7, 2019, 275 pages (30096-029CN1) Doc 7282.
CN201780042383: Office Action dated Apr. 28, 2020, 16 pages (30096-029CN1) Doc 7284.
CN201780042383: Response to Office Action filed Nov. 13, 2020, 19 pages (30096-029CN1) Doc 7387.
U.S. Appl. No. 15/138,692: List of References in priority U.S. Appl. No. 15/138,692 dated Mar. 10, 2017, 1 page.
U.S. Appl. No. 15/138,692: Examiner initialed SB08/1449 document listing from priority U.S. Appl. No. 15/138,692 considered Mar. 3, 2017, 6 pages.
U.S. Appl. No. 15/138,692: Examiner initialed SB08/1449 document listing from priority U.S. Appl. No. 15/138,692 considered Mar. 3, 2017, 1 page.

\* cited by examiner

DC-DC CONVERTER WITH MODULAR STAGES

CROSS-REFERENCE TO RELATED APPLICATIONS

The following applications are related to the present application by either 35 USC 120 or 25 USC 119.

U.S. application Ser. No. 15/813,546, filed Nov. 15, 2017
U.S. application Ser. No. 15/068,985, filed Mar. 14, 2016.
U.S. Provisional Application No. 62/132,701, filed on Mar. 13, 2015.
U.S. application Ser. No. 14/513,747, filed on Oct. 14, 2014 and which issued as U.S. Pat. No. 9,362,826 on Jun. 7, 2016.
U.S. application Ser. No. 13/771,904, filed on Feb. 20, 2013, and which issued as U.S. Pat. No. 8,860,396 on Oct. 14, 2014.
International Application PCT/US2012/036455, filed on May 4, 2012.
U.S. Provisional Application No. 61/482,838, filed May 5, 2011.
U.S. Provisional Application No. 61/548,360, filed Oct. 18, 2011.
U.S. Provisional Application No. 61/577,271, filed Dec. 19, 2011.

The relationships between the above applications are set forth below. The applications are identified by serial number for brevity. Full bibliographic information is contained in the above list. Where a first application that "is a continuation" of a second, the applications in question are related by 35 USC 120. Where a first application "is a non-provisional" of a second, the applications are related by 35 USC 119.

This application is a continuation of Ser. No. 15/813,546.
Ser. No. 15/813,546 is a continuation of Ser. No. 15/068,985.
Ser. No. 15/068,985 is a non-provisional of 62/132,701.
Ser. No. 15/068,985 is a continuation-in-part of Ser. No. 14/513,747.
Ser. No. 14/513,747 is a continuation of Ser. No. 13/771,904.
Ser. No. 13/771,904 is a continuation PCT/US2012/036455.
PCT/US2012/036455 is a non-provisional of 61/482,838.
PCT/US2012/036455 is a non-provisional of 61/548,360.
PCT/US2012/036455 is a non-provisional of 61/577,271.

The contents of the foregoing applications are incorporated herein by reference.

FIELD OF DISCLOSURE

This disclosure relates to power supplies, and in particular to power converters.

BACKGROUND

Many power converters include switches and one or more capacitors that are used, for example, to power portable electronic devices and consumer electronics. Switch-mode power converters regulate the output voltage or current by switching energy storage elements (i.e. inductors and capacitors) into different electrical configurations using a switch network. Switched capacitor converters are switch-mode power converters that primarily use capacitors to transfer energy. In such converters, the number of capacitors and switches increases as the transformation ratio increases. Switches in the switch network are usually active devices that are implemented with transistors. The switch network may be integrated on a single or on multiple monolithic semiconductor substrates, or formed using discrete devices.

Typical DC-DC converters perform voltage transformation and output regulation. This is usually done in a single-stage converter such as a buck converter. However it is possible to split these two functions into two specialized stages, namely a transformation stage, such as a switching network, and a separate regulation stage, such as a regulating circuit. The transformation stage transforms one voltage into another, while the regulation stage ensures that the voltage and/or current output of the transformation stage maintains desired characteristics.

SUMMARY

In one aspect, the invention features an apparatus for electric power conversion. Such an apparatus includes a converter having an input terminal and an output terminal. The converter includes a regulating circuit having an inductance, and switching elements connected to the inductance. These switching elements are controllable to switch between switching configurations. The regulating circuit maintains an average DC current through the inductance. The converter also includes a switching network having an input port and an output port. This switching network includes charge-storage elements and switching elements connected to the charge-storage elements. These switching elements are controllable to switch between switch configurations. In one switch configuration, the switching elements form a first arrangement of charge-storage elements in which a charge-storage element is charged through one of the input port and the output port of the switching network. In another configuration, the switching elements form a second arrangement of charge-storage elements in which a charge-storage element is discharged through one of the input port and output port of the switching network. The switching network and regulating circuit also satisfy at least one of the following configurations: (1) the regulating circuit is connected between the output terminal of the converter and the switching network, the switching network being an adiabatically charged switching network; (2) the regulating circuit is connected between the output terminal of the converter and the switching network, wherein either the switching network is a multi-phase switching network, the switching network and the regulating circuit are bidirectional, or the regulating circuit is multi-phase; (3) the regulating circuit is connected between the input terminal of the converter and an input port of the switching network, the switching network being an adiabatically charged switching network; (4) the regulating circuit is connected between the input terminal of the converter and an input port of the switching network, and either the switching network is a multi-phase switching network, the switching network and the regulating circuit are bidirectional, or the regulating circuit is multi-phase; (5) the switching network is connected between the regulating circuit and an additional regulating circuit; or (6) the regulating circuit is connected between the switching network and an additional switching network.

Embodiments of the invention include those in which the switching network includes a reconfigurable switching network and those in which the switching network includes a multi-phase switching network.

Other embodiments include those in which the regulating circuit includes a bidirectional regulating circuit those in which the regulating circuit includes a multi-phase regulating circuit, those in which the regulating circuit is bidirectional and includes a switch-mode power converter, those in which the regulating circuit is bidirectional regulating circuit and includes a resonant power converter, those in which the regulating circuit is connected to an output of the switching network, and those in which the regulating circuit is connected between the output terminal of the converter and the switching network, the switching network being an adiabatically charged switching network.

In other embodiments, the regulating circuit is connected between the output terminal of the converter and a switching network, and either the switching network is a multi-phase switching network, the switching network and the regulating circuit are bidirectional, or the regulating circuit is multi-phase.

In other embodiments, the regulating circuit is connected between the input terminal of the converter and an input port of the switching network, the switching network being an adiabatically charged switching network.

In yet other embodiments, the regulating circuit is connected between the input terminal of the converter and an input port of the switching network, and either the switching network is a multi-phase switching network, the switching network and the regulating circuit are bidirectional, or the regulating circuit is multi-phase.

Among the embodiments of the invention are those in which the switching network is connected between the regulating circuit and an additional regulating circuit, and those in which the regulating circuit is connected between the switching network and an additional switching network.

In additional embodiments, the switching network is configured as an AC switching network. Among these embodiments are those that also include a power-factor correction circuit connected to the AC switching network. Among these embodiments are those in which this power-factor correction circuit is connected between the AC switching network and the regulating circuit.

In another aspect, the invention features an apparatus including a converter having an input terminal and an output terminal. The converter includes a switching network having an input port and output port. This switching network includes charge-storage elements, and switching elements connected to the charge-storage elements. The switching elements are controllable to arrange the charge-storage elements into a selected configuration. In at least one configuration, the switching elements form a first group of charge-storage elements for discharging the charge-storage elements through the output port of the switching network. In another, the switching elements form a second group of charge-storage elements for charging the charge-storage elements through the input port of the switching network. The converter also includes a bi-directional regulating circuit connected between at least one of an input terminal of the converter and an input port of the switching network and an output terminal of the converter and an output port of the switching network.

In some embodiments, the switching network includes a multi-phase switching network.

Also included among the embodiments are those in which the bidirectional regulating circuit includes a buck/boost circuit and those in which the bidirectional regulating circuit includes a split-pi circuit.

In another aspect, the invention features a converter having an input terminal and an output terminal. The converter includes a switching network having an input port and output port, charge-storage elements, and switching elements connected to the charge-storage elements for arranging the charge-storage elements into one of a plurality of configurations. In one configuration, the switching elements form a first group of charge storage-elements for discharging the charge-storage elements through the output port of the switching network. In another configuration, the switching elements form a second group of charge-storage elements for charging the charge-storage elements through the input port of the switching network. The converter further includes a regulating circuit configured to provide a stepped-up voltage and connected between the output terminal of the converter and an output port of the switching network.

In yet another aspect, the invention features an apparatus having an input terminal and output terminal, and a switching network having an input port and output port, charge-storage elements, and switching elements connected to the charge-storage elements. The switching elements are controllable for causing the switching elements to be arranged in a plurality of configurations. In one configuration, the switching elements form a first group of charge-storage elements for discharging the charge-storage elements through the output port of the switching network. In another configuration the switching elements form a second group of charge-storage elements for charging the charge-storage elements through the input port of the switching network. The apparatus further includes a source regulating circuit connected between an input terminal of the converter and an input port of the switching network.

Some embodiments also include a load regulating circuit connected between an output terminal of the converter and an output port of the switching network.

In another aspect, the invention features a manufacture including multiple switching networks and regulating circuits having inputs and outputs that permit modular interconnections thereof for assembly of a DC-DC converter.

In some embodiments, at least one switching network includes a switched capacitor network. Among these are those in which the switched capacitor network includes an adiabatically charged switched capacitor network. These embodiments also include those in which the adiabatically charged switched capacitor network includes a cascade multiplier. In some of these embodiments, the cascade multiplier is driven by complementary clocked current sources.

In other embodiments, at least one regulating circuit includes a linear regulator.

Embodiments also include those in which the DC-DC converter includes series-connected switched capacitor networks, and those in which the DC-DC converter includes multiple regulating circuits that share a common switching network.

In another aspect, the invention features an apparatus for electric power conversion. Such an apparatus includes a converter having an input terminal and an output terminal. The converter includes a regulating circuit, and a switching network. The regulating circuit maintains an average DC current through an inductance thereof. The switching network, which has an input port and an output port, has charge-storage elements. Switching elements of the switching network connect to these charge-storage elements. The switching elements are controllable to switch between switch configurations. In one switch configuration, the switching elements form a first arrangement of charge-storage elements in which a charge-storage element is charged through a first port of the switching network and in another configuration, the switching elements form a second arrangement of charge-storage elements in which a charge-storage element is discharged through a second port of the switching network. The first and second ports are chosen from the input and output ports.

There are six converter configurations within the scope of the invention. In a first configuration, the regulating circuit is connected between the output terminal of the converter and the switching network is an adiabatically charged switching network. In a second configuration, the regulating circuit is connected between the output terminal of the converter and the switching network, and the converter satisfies one or more second-configuration properties to be defined below. In a third configuration, the regulating circuit is connected between the input terminal of the converter and an input port of the switching network, and the switching network is an adiabatically charged switching network. In a fourth configuration, the regulating circuit is connected between the input terminal of the converter and an input port of the switching network, and the converter satisfies one or more fourth-configuration properties to be described below. In a fifth configuration, the switching network is connected between the regulating circuit and an additional regulating circuit. Finally, in a sixth configuration, the regulating circuit is connected between the switching network and an additional switching network. The properties, one or more of which are satisfied in the second and fourth configurations, are as follows: the first property is that the switching network is a multi-phase switching network, the second property is that the switching network and the regulating circuit are bidirectional, and the third property is that the regulating circuit is multi-phase.

In some embodiments, the switching network comprises a reconfigurable switching network. In others, it comprises a multi-phase switching network.

Embodiments also include those in which the regulating circuit comprises a bidirectional regulating circuit. Among these are embodiments in which the regulating circuit comprises a switch-mode power converter, and those in which it comprises a resonant power converter.

Also among the embodiments are those in which the regulating circuit comprises a multi-phase regulating circuit, those in which the regulating circuit is configured to operate as a magnetic filter, and those in which the regulating circuit is connected to an output of the switching network.

In some embodiments, the converter is in the first configuration. In others, the converter is in the second configuration. In yet others, the converter is in the third configuration. Also included within the scope of the invention are embodiments in which the converter is in the fourth configuration, and embodiments in which the converter is in the sixth configuration.

In yet other embodiments, the converter is in the fifth configuration. Among these are the embodiments in which the additional regulating circuit of the fifth configuration is configured to operate as a magnetic filter. These can be implemented by using a buck converter as a regulator and making the duty cycle very long, so that the series inductor is virtually always connected. In the limiting case, the switch can be eliminated altogether.

Further embodiments include those in which the switching network is configured as an AC switching network.

Some embodiments feature a power-factor correction circuit connected to the AC switching network. Among these are embodiments in which the power-factor correction circuit is connected between the AC switching network and the regulating circuit.

In one aspect, the invention features an apparatus for processing electric power. Such an apparatus includes a power-converter having a path for power flow between a first power-converter terminal and a second power-converter terminal. During operation of the power-converter, the first power-converter terminal is maintained at a first voltage and the second power-converter terminal is maintained at a second voltage that is lower than the first voltage. The power-converter includes first and second regulating-circuits, and a switching network, all of which are disposed on the path. The switching network includes switches, a first charge-storage-element, and first and second switching-network-terminals. The first regulating-circuit includes a first magnetic-storage-element and a first-regulating-circuit terminal. The second regulating-circuit includes a second-regulating-circuit terminal. The power path includes the first-regulating-circuit terminal, the second-regulating-circuit terminal, the first switching-network-terminal, and the second switching-network-terminal. The first-regulating-circuit terminal is connected to the first switching-network-terminal and the second-regulating-circuit terminal is connected to the second switching-network-terminal. The switching network is configured to transition between a first switch-configuration and a second switch-configuration. When the switching network is in the first switch-configuration, charge accumulates in the first charge-storage-element at a first rate. Conversely, when the switching network is in the second switch configuration charge is depleted from the first charge-storage-element at a second rate. These two rates are constrained by the first magnetic-storage-element.

In some embodiments, the switching network further includes a second charge-storage-element. When the switching network is in the first switch-configuration, charge is depleted from the second charge-storage-element at a rate constrained by the first magnetic-storage-element. Conversely, when the switching network is in the second configuration, charge accumulates in the second charge-storage-element at a rate constrained by the first magnetic-storage-element. These rates can be equal or different.

In other embodiments, the second regulating-circuit includes a second magnetic-storage-element, and a switch connected to the magnetic-storage element, the switch being controllable to switch between at least two switching configurations.

Also included are embodiments in which the second regulating-circuit further includes a feedback loop for controlling operation of the switch in response to a measured output of the power converter.

In yet other embodiments, the first magnetic-storage-element includes a filter. In some of these embodiments, the filter has a resonant frequency.

Other embodiments include a third regulating-circuit, that is also connected to the switching network. Both the second and third regulating circuits have inductors. These inductors are coupled to each other. Another embodiment includes an inductor core that is shared by inductors in the second and third regulating circuits.

Also among the embodiments are those in which the first and second rates of charge transfer are equal.

In another aspect, the invention features a method for causing a power converter to process electric power. Such a method includes, on a power path for power flow between a first power-converter terminal and a second power-converter terminal, connecting a first-regulating-circuit terminal of a first regulating-circuit to a first switching-network-terminal of a first switching-network, and connecting a second-regulating-circuit terminal of the first regulating-circuit to a second switching-network-terminal of the first switching-network, using the second regulating-circuit, maintaining the first power-converter terminal at a first voltage, thereby maintaining the second power-converter terminal at a second voltage that is lower than the first voltage, using switches in the first switching-network, placing the first switching-network in a configuration for allowing charge to accumulate in the first charge-storage-element of the first switching-network, using energy stored in a magnetic field by a first magnetic-storage-element in the first regulating-circuit, constraining a rate of charge accumulation in a first charge-storage-element of the first switching-network, using the switches in the first switching-network, placing the first switching-network in a configuration for allowing charge to be depleted from the first charge-storage-element of the first switching-network, and, using energy stored by the first magnetic-storage-element in the first regulating-circuit, constraining a rate of charge depletion from the first charge-storage-element of the first switching-network.

Some practices include, while constraining a rate of charge depletion from the first charge-storage-element, constraining a rate of charge accumulation in a second charge-storage-element, and, while constraining a rate of charge accumulation into the first charge-storage-element, constraining a rate of charge depletion from the second charge-storage-element.

Yet other practices include controlling a switch connected to a magnetic-storage element of the second regulating-circuit in response to measured output of the power converter.

In some practices, the first magnetic-storage-element includes a filter. Among these, are practices of the invention in which the filter has a resonant frequency. An example of such a filter is an LC filter or an RLC filter.

Some practices involve a third regulating-circuit in addition to the two that are already present. The third regulating-circuit is connected to the switching network, and includes an inductor that is coupled to an inductor of the first regulating-circuit. In another embodiments, a third regulating-circuit connected to the switching network has an inductor that couples to an inductor in the first regulating-circuit with a common core.

Many kinds of switching network can be selected, including a reconfigurable switching-network, a multi-phase switching-network, a multi-phase series-parallel switching-network, a multi-phase multiple-stage switching network, a cascade multiplier, and a multiple stage switching network.

In addition, a variety of different regulating circuits can be used for at least one of the first and second regulating circuits. These include a bidirectional regulating-circuit, a multi-phase regulating-circuit, a switch-mode power converter, a resonant power converter, a buck converter, a boost converter, a buck/boost converter, a linear regulator, a Cuk converter, a fly-back converter, a forward converter, a half-bridge converter, a full-bridge converter, a magnetic-storage element, and a magnetic filter.

The fly-back converter can more specifically be a quasi-resonant fly-back converter, or an active-clamp fly-back converter, or an interleaved fly-back converter, or a two-switch fly-back converter. Likewise, the forward converter can be more specifically a multi-resonant forward converter, or an active-clamp forward converter, or an interleaved forward converter, or a two-switch forward converter. Lastly, the half-bridge converter can more specifically be an asymmetric half-bridge converter, or a multi-resonant half-bridge converter, or a LLC resonant half-bridge.

Some practices include configuring the switching network to be an AC switching network. These practices include those that also include controlling a power-factor of an output of the AC switching network, and those that also include connecting a power-factor correction circuit between the AC switching network and the first regulating-circuit.

Other practices also include varying switch configurations of the switching network at a frequency that is different from a frequency at which switching configuration of at least one of the first and second regulating-circuits is varied.

In another aspect, the invention features a non-transitory computer-readable medium that stores a data structure that is to be operated upon by a program executable on a computer system, wherein, when operated upon by such a program, the data structure causes at least a portion of a process for fabricating an integrated circuit that includes circuitry described by the data structure, wherein the circuitry described by the data structure includes a switching network that has been configured to be used with a power-converter having a path for power flow between a first power-converter terminal and a second power-converter terminal, wherein, during operation of the power-converter, the first power-converter terminal is maintained at a first voltage and the second power-converter terminal is maintained at a second voltage that is lower than the first voltage, wherein the power-converter comprises first and second regulating-circuits, and the switching network, all of which are disposed on the path, wherein the switching network comprises switches, and first and second switching-network-terminals, wherein the first regulating-circuit comprises a first magnetic-storage-element and a first-regulating-circuit terminal, wherein the second regulating-circuit comprises a second-regulating-circuit terminal, wherein the power path comprises the first-regulating-circuit terminal, the second-regulating-circuit terminal, the first switching-network-terminal, and the second switching-network-terminal, wherein the first-regulating-circuit terminal is to be connected to the first switching-network-terminal and the second-regulating-circuit terminal is to be connected to the second switching-network-terminal, wherein the switching network is configured to transition between a first switch-configuration and a second switch-configuration, wherein, when the switching network is in the first switch-configuration, charge accumulates in the first charge-storage-element at a first rate, wherein, when the switching network is in the second switch configuration charge is depleted from the first charge-storage-element at a second rate, and wherein the first rate and the second rate are constrained by the first magnetic-storage-element.

In one aspect, the invention features an apparatus for processing electric power. Such an apparatus includes a power-converter having a power path for power flow between first and second power-converter terminals maintained at corresponding first and second voltages during operation thereof. The second voltage is less than the first. A first regulating-circuit and a switching network are both on the power path. The switching network includes a first charge-storage-element, and first and second switching-network-terminals. The first regulating-circuit includes a first magnetic-storage-element and a first-regulating-circuit terminal. The power path includes the first-regulating-circuit terminal, the first switching-network-terminal, and the second switching-network-terminal with the first-regulating-circuit terminal being connected to the first switching-network-terminal. The switching network transitions between first and second switch-configurations. In the first charge accumulates in the first charge-storage-element at a first rate, and in the second switch configuration charge is depleted from the first charge-storage-element at a second rate. The first magnetic-storage-element constrains both of these rates. In some cases, the constraint is such that the rates are equal, whereas in others, the rates are different.

Some embodiments also include a second regulating-circuit disposed on the path. In these embodiments, the second regulating-circuit includes a second-regulating-circuit terminal that is also on the power path. This second-regulating-circuit terminal connects to the second switching-network-terminal.

In some embodiments, the switching network further includes a second charge-storage-element. Placing the switching network in the first switch-configuration depletes charge from the second charge-storage-element at a first rate. Placing the switching network in the second configuration accumulates charge in the second charge-storage-element at a second rate. The first magnetic-storage element constrains both of these rates.

Among the embodiments that have a second regulating-circuit are those in which the second regulating circuit includes a second magnetic-storage-element and a switch connected to the second magnetic-storage-element, the switch being controllable to switch between at least two switching configurations. Also among these embodiments are those in which the second regulating-circuit further includes a feedback loop for controlling operation of the switch in response to a measured output of the power converter.

In other embodiments, the first magnetic-storage-element includes a filter. Among these are embodiments in which the filter has a resonant frequency.

Among the embodiments that have two regulating circuits are those that have a third regulating circuit. In some of these embodiments, the third regulating-circuit connects to the switching network and has an inductor coupled to an inductor, and the second regulating-circuit includes an inductor that is coupled to the inductor of the third regulating-circuit. In others, the third regulating-circuit connects to the switching network and both the second and third regulating circuits include inductors that share the same inductor core. In embodiments that have coupled inductors, the inductors can be coupled such that the product of voltage and current at both inductors has the same sign or opposite signs.

The invention can be implemented with many kinds of switching networks. For example, in some embodiments, the switching network includes a reconfigurable switching network. As used herein, a reconfigurable switching network is one that has a set of switch configurations $\{\alpha_1, \alpha_2, \ldots \alpha_n\}$ where n>2 and the switching network is able to transition between $\alpha_b$ and $\alpha_n$ for all m, n.

In others, it includes a multi-phase switching-network. In yet others, it includes a multi-phase multiple stage switching network, or a multiple stage switching network. Still other embodiments have switching networks that include a cascade multiplier.

The invention can also be implemented with many kinds of regulating circuit. These include bidirectional regulating-circuits, multi-phase regulating-circuits, switch-mode power converters, resonant power converters, a buck converter, a boost converter, a buck/boost converter, a linear regulator, a Cuk converter, a fly-back converter, a forward converter, a half-bridge converter, a full-bridge converter, a magnetic-storage element, and a magnetic filter.

In some embodiments, the switching network receives charge at an input thereof and outputs the charge at an output thereof. In these embodiments, transport of charge from the input to the output is carried out in more than one switching cycle.

Among the embodiments that feature a fly-back converter are those that include a quasi-resonant fly-back converter, an active-clamp fly-back converter, an interleaved fly-back converter, or a two-switch fly-back converter.

Among the embodiments that feature a forward converter are those that include a multi-resonant forward converter, an active-clamp forward converter, an interleaved forward converter, or a two-switch forward converter.

Among the embodiments that include a half-bridge converter are those that include an asymmetric half-bridge converter, a multi-resonant half-bridge converter, or a LLC resonant half-bridge.

The invention is not restricted to DC applications. For example, in some embodiments, the switching network is an AC switching network. These include embodiments with a power-factor correction circuit connected to the AC switching network. Among these are embodiments in which the power-factor correction circuit is between the AC switching network and the first regulating-circuit.

In some embodiments, the power-converter varies switch configurations of the switching network at a frequency that is different from a frequency at which switching configuration of at least one of the first and second regulating-circuits is varied.

In other embodiments, the switching network includes an asymmetric cascade multiplier having a plurality of DC nodes, each of which is available to deliver power at a voltage that is a multiple of the first voltage.

Yet other embodiments include a power-management integrated circuit into which the first regulating circuit is incorporated. In these embodiments, the power path includes a power-path section that extends out of the power-management integrated circuit and into the switching network.

Other embodiments include switches that have different physical areas.

Also among the embodiments are those in which the switch-widths of the switches are selected such that a time constant of charge transfer between charge-storage elements of the switching network is greater than or equal to a switching frequency at which the switching network changes state.

Yet other embodiments improve efficiency by having higher resistance switches. In these embodiments, the switching network is configured such that, at the switching-frequency of the switching network, increasing resistance of the switches reduces loss associated with current flowing within the switching network.

The various components of the apparatus need not share the same ground. In fact, one ground can float relative to the other.

As an example, in some embodiments, the first-regulating-circuit receives a first voltage difference and the second power-converter terminal outputs a second voltage difference. The first voltage difference is a difference between a first voltage and a second voltage that is less than the first voltage; the second voltage difference is a difference between a third voltage and a fourth voltage that is less than the third voltage. In these embodiments, a difference between the fourth voltage and the second voltage is non-zero. In other embodiments, the first-regulating-circuit receives a DC voltage difference, and the power converter receives an AC voltage difference. The DC voltage is a difference between a first voltage and a second voltage that is less than the first voltage; the AC voltage difference is a difference between a time-varying voltage and a constant voltage. A difference between the constant voltage and the second voltage is non-zero.

In another aspect, the invention features a method for causing a power converter to process electric power. Such a method includes, on a power path for power flow between a first power-converter terminal and a second power-converter terminal, connecting a first-regulating-circuit terminal of a first regulating-circuit to a first switching-network-terminal of a first switching-network, placing the first switching-network in a configuration for allowing charge to accumulate in the first charge-storage-element of the first switching-network, using energy stored in a magnetic field by a first magnetic-storage-element in the first regulating-circuit, constraining a rate of charge accumulation in a first charge-storage-element of the first switching-network, using the switches in the first switching-network, placing the first switching-network in a configuration for allowing charge to be depleted from the first charge-storage-element of the first switching-network, and, using energy stored by the first magnetic-storage-element in the first regulating-circuit, constraining a rate of charge depletion from the first charge-storage-element of the first switching-network.

Some practices further include connecting a second-regulating-circuit terminal of a second regulating-circuit to a second switching-network-terminal of the first switching-network, and using the second regulating-circuit, maintaining the first power-converter terminal at a first voltage, thereby maintaining the second power-converter terminal at a second voltage that is lower than the first voltage, using switches in the first switching-network.

Other practices include, while constraining a rate of charge depletion from the first charge-storage-element, constraining a rate of charge accumulation in a second charge-storage-element, and, while constraining a rate of charge accumulation into the first charge-storage-element, constraining a rate of charge depletion from the second charge-storage-element.

Yet other practices include controlling a switch connected to a magnetic-storage element of the second regulating-circuit in response to measured output of the power converter.

In some practices, the first magnetic-storage-element includes a filter. Among these are practices in which this filter has a resonant frequency.

Among the practices that use a second regulating circuit are those that include including a third regulating-circuit that is connected to the switching network. The third regulating-circuit includes an inductor, and the first regulating-circuit includes an inductor that is coupled to the inductor of the third regulating-circuit. The two inductors can be positively or negatively coupled.

Also among practices that use a second regulating circuit are those in which the second regulating circuit has an inductor core, and an inductor in a third regulating-circuit, which is connected to the switching network, shares this inductor core.

Some practices include constraining the rate of change so that the first rate and the second rate are equal. Others include constraining the rate of change so that the first rate and the second rate are unequal.

Practices of the invention contemplate a variety of switching networks. For example, practices of the invention include selecting the switching network to be reconfigurable switching-network, selecting it to be a multi-phase switching-network, selecting it to be a multi-phase series-parallel switching-network, selecting it to be a multi-phase multiple-stage switching network, selecting it to be a cascade multiplier, or selecting it to be a multiple stage switching network.

A variety of regulating circuits can be used in different practices. For example, practices of the invention include selecting a regulating circuit to be bidirectional, to be multi-phase, to be a switch-mode power converter, to be a resonant power converter, to be a magnetic-storage element, or to be a magnetic filter.

Other practices include selecting the switching network to be an AC switching network. Among these are practices that include controlling a power-factor of an output of the AC switching network. These include practices that include connecting a power-factor correction circuit between the AC switching network and the first regulating-circuit.

Yet other practices include varying switch configurations of the switching network at a frequency that is different from a frequency at which switching configuration of at least one of the first and second regulating-circuits is varied.

In addition, a variety of different regulating circuits can be used for at least one of the first and second regulating circuits. These include a bidirectional regulating-circuit, a multi-phase regulating-circuit, a switch-mode power converter, a resonant power converter, a buck converter, a boost converter, a buck/boost converter, a linear regulator, a Cuk converter, a fly-back converter, a forward converter, a half-bridge converter, a full-bridge converter, a magnetic-storage element, and a magnetic filter.

Practices that rely on a fly-back converter include those that rely on a quasi-resonant fly-back converter, an active-clamp fly-back converter, an interleaved fly-back converter, or a two-switch fly-back converter. Practices that rely on a forward converter include those that rely on a multi-resonant forward converter, an active-clamp forward converter, an interleaved forward converter, or a two-switch forward converter. Practices that rely on a half-bridge converter include those that rely on an asymmetric half-bridge converter, a multi-resonant half-bridge converter, or a LLC resonant half-bridge.

In another aspect, the invention features a non-transitory computer-readable medium that stores a data structure that is to be operated upon by a program executable on a computer system. When operated upon by such a program, the data structure causes at least a portion of a process for fabricating an integrated circuit. This integrated circuit includes circuitry described by the data structure. Such circuitry includes a switching network that has been configured to be used with a power-converter having a path for power flow between a first power-converter terminal and a second power-converter terminal. During the power-converter's operation of the power-converter, the first power-converter terminal is maintained at a first voltage and the second power-converter terminal is maintained at a second voltage that is lower than the first voltage. The power-converter includes a first regulating-circuit and the above-mentioned switching network, both of which are disposed on the path. The switching network includes switches, and first and second switching-network-terminals. Meanwhile, the first regulating-circuit includes a first magnetic-storage-element and a first-regulating-circuit terminal. The power path includes the first-regulating-circuit terminal, the first switching-network-terminal, and the second switching-network-terminal. The first-regulating-circuit terminal is to be connected to the first switching-network-terminal, and the switching network is configured to transition between first and second switch-configurations. When the switching network is in the first switch-configuration, charge accumulates in the first charge-storage-element at a first rate. When the switching network is in the second switch configuration, charge is depleted from the first charge-storage-element at a second rate. The first magnetic-storage element constrains these rates.

The invention also includes circuitry that is described by the foregoing data structure. Such circuitry includes a switching network having first and second switching terminals, and configured for disposition, along with first and second regulating circuits, at least one of which includes a magnetic storage element, on a power-flow path between first and second power converter terminals of a power converter, the first and second power converter terminals of which are maintained at corresponding first and second voltages, the second voltage being lower than the first voltage. The switching network is configured to transition between switch configurations during each of which an amount of charge in a charge-storage element in the power converter changes at a rate that is constrained by the magnetic storage element. The power path includes a first-regulating-circuit terminal associated with the first regulating circuit and connected to the first switching network terminal.

These and other features of the invention will be apparent from the following detailed description and the accompanying figures, in which:

These and other features of the invention will be apparent from the following detailed description and the accompanying figures, in which:

DETAILED DESCRIPTION

Figure 1A:
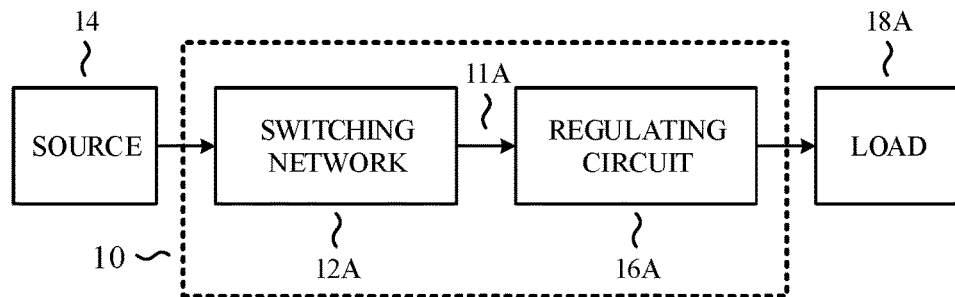
FIG. 1A shows a known DC-DC converter with a separate regulating circuit and switching network.

FIG. 1A shows a converter 10 having a switching network 12A connected to a voltage source 14 at an input end thereof. An input of a regulating circuit 16A is then connected to an output of the switching network 12A. A load 18A is then connected to an output of the regulating circuit 16A. Power flows between the voltage source 14 and the load 18A in the direction indicated by the arrows.

Figure 1B:
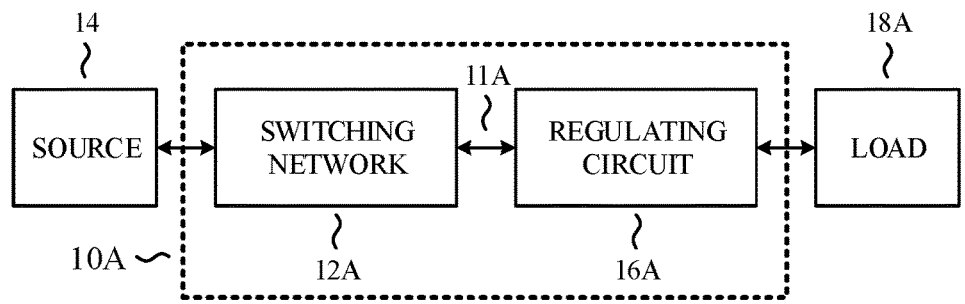
FIG. 1B shows a bidirectional version of FIG. 1A.

Embodiments described herein rely at least in part on the recognition that in a multi-stage DC-DC converter, the various constituent components can be made essentially modular and can be mixed and matched in a variety of different ways. These constituent components include switching networks and regulating circuits, the latter being made to function either as regulators or magnetic filters by simply varying the duty cycle. This modularity simplifies the assembly of such converters. As such, the configuration shown in FIG. 1A represents only one of multiple ways to configure one or more switching networks 12A with one or more regulating circuits 16A. FIG. 1B shows a bidirectional version of FIG. 1A, where power can flow along a power-flow path either from a voltage source 14 to a load 18A or from the load 18A to the voltage source 14, as indicated by the arrows.

There are two fundamental elements described in connection with the following embodiments: switching networks 12A, 12B and regulating circuits 16A, 16B. Assuming series connected elements of the same type are combined, there are a total of four basic building blocks. These are shown in FIGS. 1A-4. The embodiments disclosed herein include at least one of the four basic building blocks shown in FIGS. 1A-4. More complex converter can be realized by combining the fundamental building blocks. In general, a controller, not shown for clarity, will control and coordinate operation of the overall system.

Additional embodiments further contemplate the application of object-oriented programming concepts to the design of DC-DC converters by enabling switching networks 12A, 12B and regulating circuits 16A, 16B to be "instantiated" in a variety of different ways, so long as their inputs and outputs continue to match in a way that facilitates modular assembly of DC-DC converters having various properties.

In many embodiments, the switching network 12A is instantiated as a switched charge-storage network of charge-storage elements, such as capacitors. Among the more useful topologies of this kind of network are: Ladder, Dickson, Series-Parallel, Fibonacci, and Doubler, all of which can be adiabatically charged and configured into multi-phase networks. A switched charge-storage network is also known as a switched capacitor network when the charge-storage elements are capacitors. A particularly useful switched capacitor network is an adiabatically charged version of a full-wave cascade multiplier. However, diabatically charged versions can also be used.

During operation, charge periodically accumulates and is depleted from the charge-storage elements in a switched charge-storage network. As used herein, changing the charge on a capacitor adiabatically means causing an amount of charge stored in that capacitor to change by passing the charge through a non-capacitive element. A positive adiabatic change in charge on the capacitor is considered adiabatic charging while a negative adiabatic change in charge on the capacitor is considered adiabatic discharging. Examples of non-capacitive elements include inductors, magnetic-storage elements, such as magnetic filters, resistors, and combinations thereof.

In some cases, a capacitor can be charged adiabatically for part of the time and diabatically for the rest of the time. Such capacitors are considered to be adiabatically charged. Similarly, in some cases, a capacitor can be discharged adiabatically for part of the time and diabatically for the rest of the time. Such capacitors are considered to be adiabatically discharged.

Diabatic charging includes all charging that is not adiabatic and diabatic discharging includes all discharging that is not adiabatic.

As used herein, an adiabatically charged switching network is a switching network 12A having at least one capacitor that is both adiabatically charged and adiabatically discharged. A diabatically charged switching network is a switching network 12A that is not an adiabatically charged switching network.

The regulating circuit 16A can be instantiated by circuitry that plays a role in somehow constraining the electrical characteristics of the system in some desirable way. For example, such a circuit might constrain the characteristic to be at some value or range of values, or constrain it to change at some rate, or constraint it to change in some direction. A common example would be a regulator that constrains an output voltage or current to be at a particular value, or to be within some range of values. A buck converter, when combined with an appropriate feedback loop, would be an attractive candidate for such a role due to its high efficiency and speed. Such a converter is also advantageous because of its ability to seamlessly transition from constraining an output voltage to be some desired value to constraining a rate of charge transfer within a switching network 12A to be within some desired range, effectively functioning as a magnetic filter, by adjustment of its duty cycle.

Other suitable regulating circuits 16A include boost converters, buck/boost converters, fly-back converters, forward converters, half-bridge converters, full-bridge converters, Cuk converters, resonant converters, and linear regulators. The fly-back converter can be a quasi-resonant fly-back converter, an active-clamp fly-back converter, an interleaved fly-back converter, or a two-switch fly-back converter. Likewise, the forward converter can be a multi-resonant forward converter, an active-clamp forward converter, an interleaved forward converter, or a two-switch forward converter. The half-bridge converter can be an asymmetric half-bridge converter, a multi-resonant half-bridge converter, or a LLC resonant half-bridge.

Figure 2:
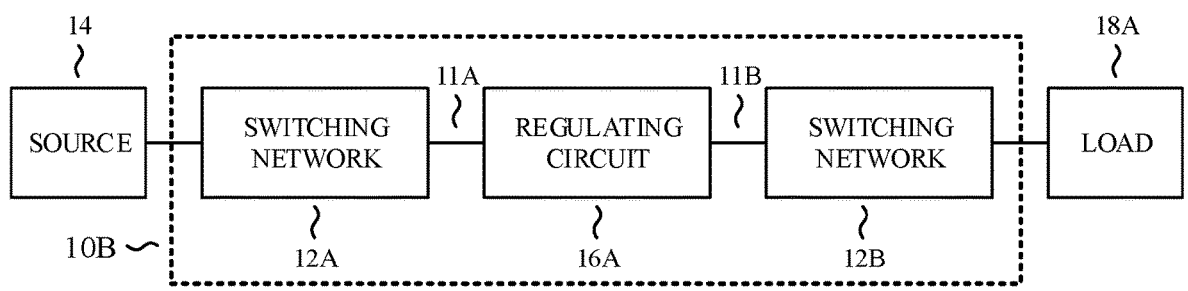
FIGS. 2-4 show DC-DC converters with alternate configurations of regulating circuits and switching networks.

In one embodiment, shown in FIG. 2, a voltage source 14 provides an input to a first switching network 12A, which is instantiated as a switched capacitor network. The output of the first switching network 12A is a lower voltage than the input voltage that is provided to a regulating circuit 16A (e.g. a buck, a boost, or a buck/boost converter). This regulating circuit 16A provides a regulated input voltage to a second switching network 12B, such as another switched capacitor network. A high-voltage output of this second switching network 12B is then applied to a load 18A.

An embodiment such as that shown in FIG. 2 can be configured to regulate the load 18A or to regulate the voltage source 14 depending on the direction of energy flow along the power-flow path.

Figure 3:
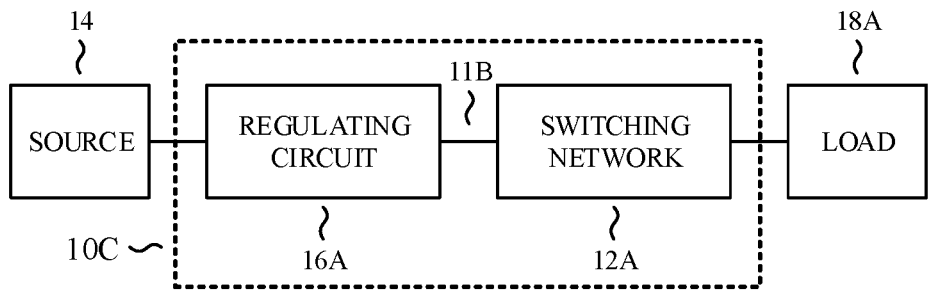

In another embodiment, shown in FIG. 3, a low-voltage source 14 connects to an input of a regulating circuit 16A, the output of which is provided to an input of a switching network 12A to be boosted to a higher DC value. The output of the switching network is then provided to a load 18A.

An embodiment such as that shown in FIG. 3 can be used to regulate the voltage source 14 or the load 18A depending on the direction of energy flow along the power-flow path.

Figure 4:
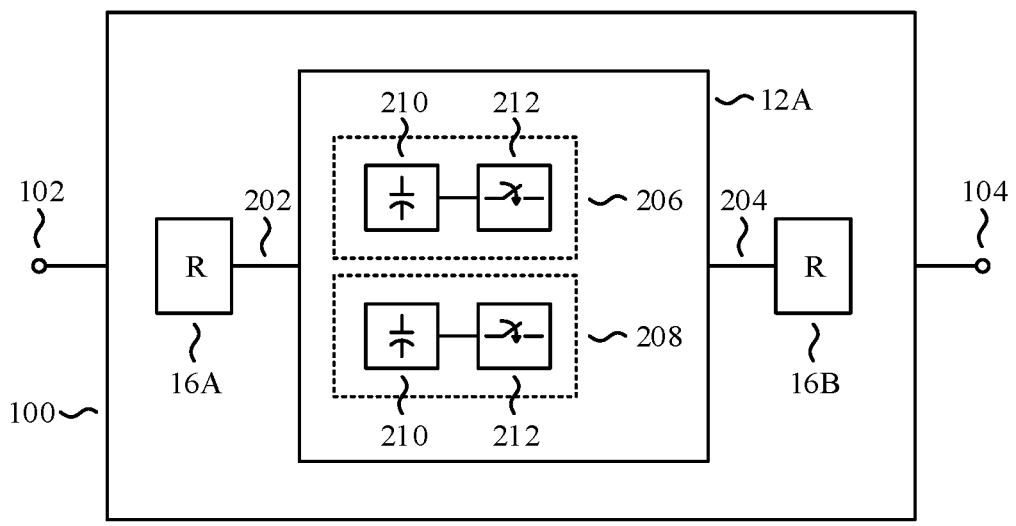

Referring now to FIG. 4, another embodiment of a converter 100 includes a first regulating circuit 16A connected to an input 102 thereof and a second regulating circuit 16B connected to an output 104 thereof. Between the first and second regulating circuits 16A, 16B is a switching network 12A having an input 202 and an output 204. The switching network 12A includes charge-storage elements 210 interconnected by switches 212. These charge-storage elements 210 are divided into first and second groups 206, 208. As discussed above, either one of the regulating circuits 16A, 16B can be a buck converter, which can be either configured to control a voltage or to function as a magnetic filter, a boost converter, a buck/boost converter, a fly-back converter, a Cuk converter, a resonant converter, or a linear regulator. The regulating circuits 16A, 16B can be operated at a duty cycle required to achieve a desired result. For example, in the case of a buck converter, the duty cycle can be adjusted so that the buck converter's main switch maintains an indefinitely extended connection to its magnetic-storage element while its accompanying synchronous rectifier remain open indefinitely. Alternatively, one of the two regulating circuits 16A, 16B can be replaced by a magnetic filter, thus avoiding the need for additional switches. Such a magnetic filter includes a magnetic-storage element, such as an inductor, that resists rapid changes in current and thus promotes adiabatic charging of capacitors in the switching network 12A.

Figure 5:
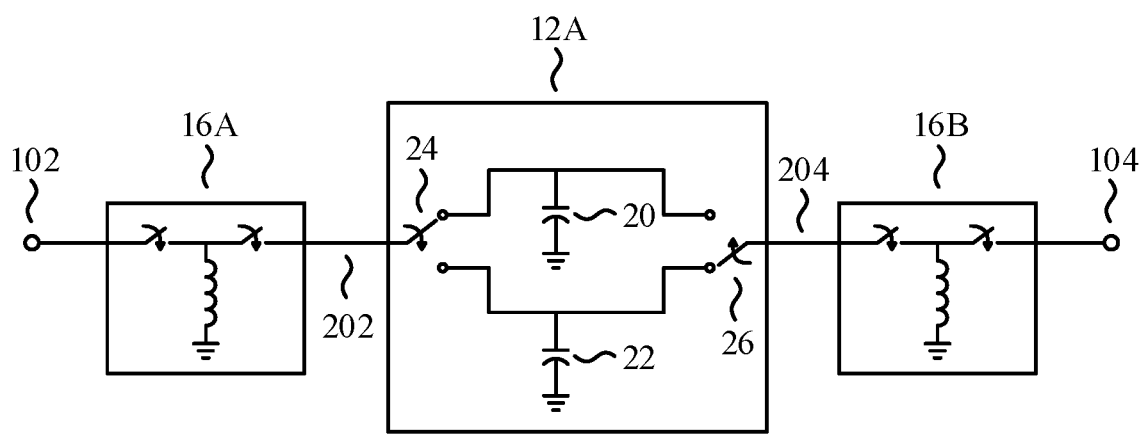
FIG. 5 shows a particular implementation of the power converter illustrated in FIG. 4.

In some embodiments, the switching network 12A can be a bidirectional switched capacitor network such as that shown in FIG. 5. The switched capacitor network in FIG. 5 features a first capacitor 20 and a second capacitor 22 in parallel. A first switch 24 selectively connects one of the first and second capacitors 20, 22 to a first regulating circuit 16A, and a second switch 26 selectively connects one of the first and second capacitors 20, 22 to a second regulating circuit 16B. Like the regulators shown in FIG. 4, the first and second regulating circuits 16A, 16B can be operated at variable duty cycles. Alternatively, one of the regulating circuits 16A, 16B can be replaced by a magnetic filter having an inductor that resists rapid changes in current and thus promotes adiabatic charging of capacitors within the switching network 12A. Both the first and second switches 24, 26 can be operated at high frequency, thus facilitating the adiabatic charging and discharging of the first and second capacitors 20, 22.

The particular embodiment shown in FIG. 5 has a two-phase switching network 12A. However, other types of switching networks 12A can be used instead.

Figure 6A:
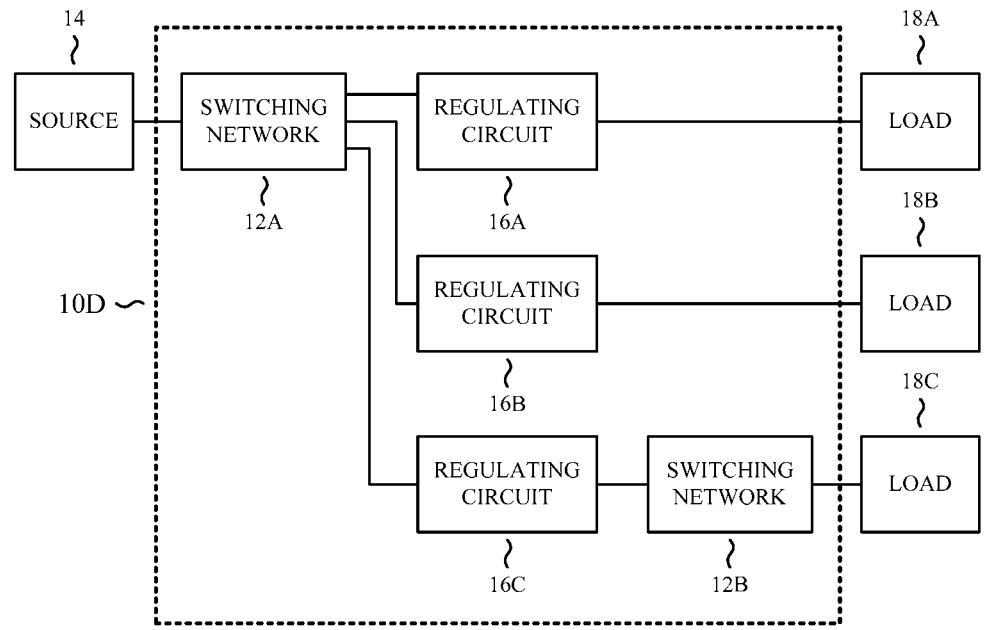
FIGS. 6A and 6B show embodiments with multiple regulating circuits.

In yet another embodiment, shown in FIG. 6A, first, second, and third regulating circuits 16A, 16B, 16C, which could be incorporated into one or more separate power management ICs, are provided at an output of a first switching network 12A for driving first, second, and third loads 18A, 18B, 18C. For the third load 18C, a second switching network 12B is provided between the third load 18C and the third regulating circuit 16C thus creating a pathway similar to that shown in FIG. 2. Thus, FIG. 6A provides an example of how the modular construction of regulating circuits and switching networks facilitates the ability to mix and match components to provide flexibility in DC-DC converter construction.

Figure 6B:
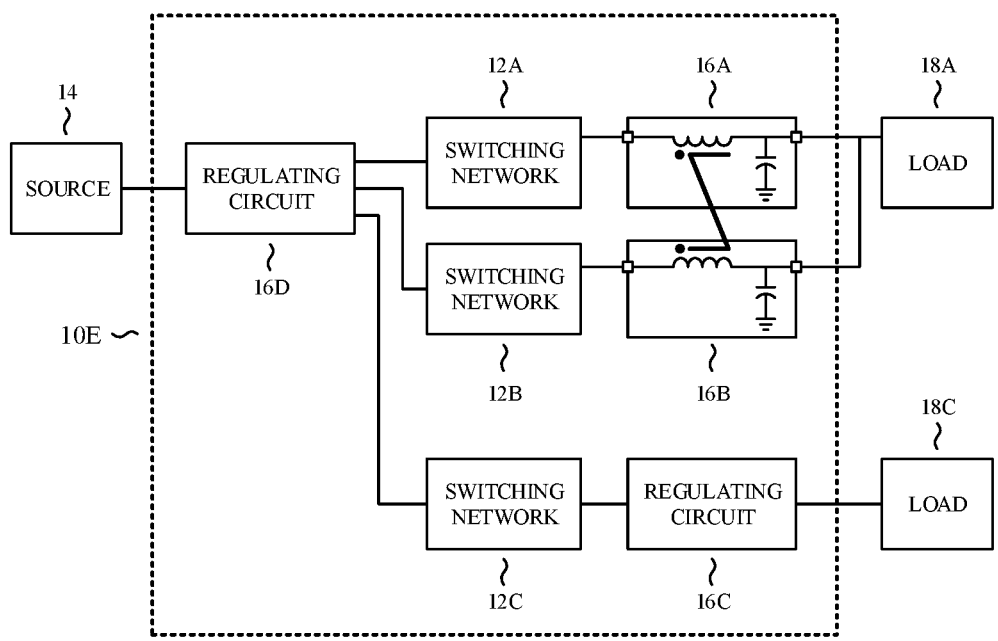

Additional flexibility can be had by coupling components that are in different modules. For example, in FIG. 6B, the configuration shown in FIG. 6A has been reversed: first, second, and third regulating circuits 16A, 16B, 16C in FIG. 6A are replaced with first, second, and third switching networks 12A, 12B, 12C in FIG. 6B; and first and second switching networks 12A, 12B in FIG. 6A are replaced with fourth and third regulating circuits 16D, 16C in FIG. 6B. However, the first and second loads 18A, 18B in FIG. 6A have been consolidated into a first load 18A and into first and second regulating circuits 16A, 16B, in the form of magnetic filters, that have been added to constrain charge transfer within the first and second switching networks 12A, 12B. The first and second regulating circuits 16A, 16B are implemented by buck converters with appropriately selected duty cycles. In FIG. 6B, the first and second regulating circuits 16A, 16B have an inductor that shares the same core, thus coupling them together. This provides a way to save space in the circuit's overall footprint.

A switched capacitor (SC) DC-DC power converter includes a network of switches and capacitors. By cycling the network through different topological states using these switches, one can transfer energy from an input to an output of the SC network. Some converters, known as "charge pumps," can be used to produce high voltages in FLASH and other reprogrammable memories.

Figure 7:
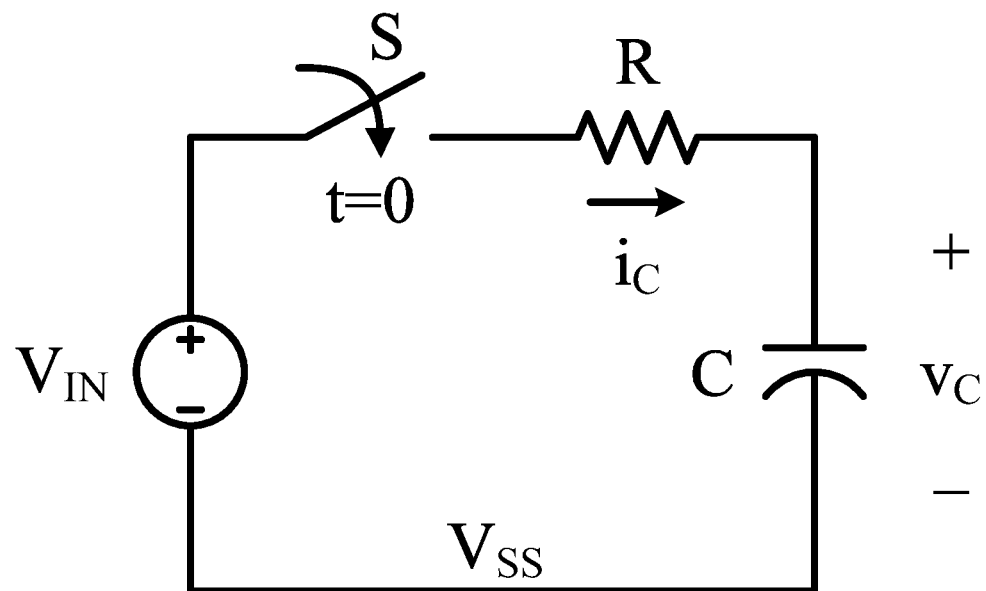
FIG. 7 shows an RC circuit.

FIG. 7 shows a capacitor C initially charged to some value $V_C(0)$. At t=0 the switch S is closed. At that instant, a brief surge of current flows as the capacitor C charges to its final value of $V_{in}$. The rate of charging can be described by a time constant $\tau$=RC, which indicates the time it takes the voltage to either rise or fall to within 1/e of its final value. The exact capacitor voltage $v_c(t)$ and current $i_c(t)$ are given by the following equations:

$$v_c(t) = v_c(0) + [V_{in} - v_c(0)](1 - e^{-t/RC}), \quad (1.1)$$

and $$i_c(t) = C\frac{dv_c}{dt} = \frac{V_{in} - v_c(0)}{R}e^{-t/RC}. \quad (1.2)$$

The energy loss incurred while charging the capacitor can be found by calculating the energy dissipated in resistor R, which is $$E_{loss}(t) = \int_{t=0}^{\infty} i_R(t) \times v_R(t) dt = \int_{t=0}^{\infty} [i_c(t)]^2 R \, dt. \quad (1.3)$$

The equation can be further simplified by substituting the expression for $i_c(t)$ from equation (1.2) into equation (1.3). Evaluating the integral then yields $$E_{loss}(t) = \frac{1}{2}[V_{in} - v_c(0)]^2 C[1 - e^{-2t/RC}].$$

If the transients are allowed to settle (i.e. t→∞), the total energy loss incurred in charging the capacitor is independent of its resistance R. In that case, the amount of energy loss is equal to $$E_{loss}(\infty) = \frac{1}{2}C\Delta v_c^2.$$

Figure 8:
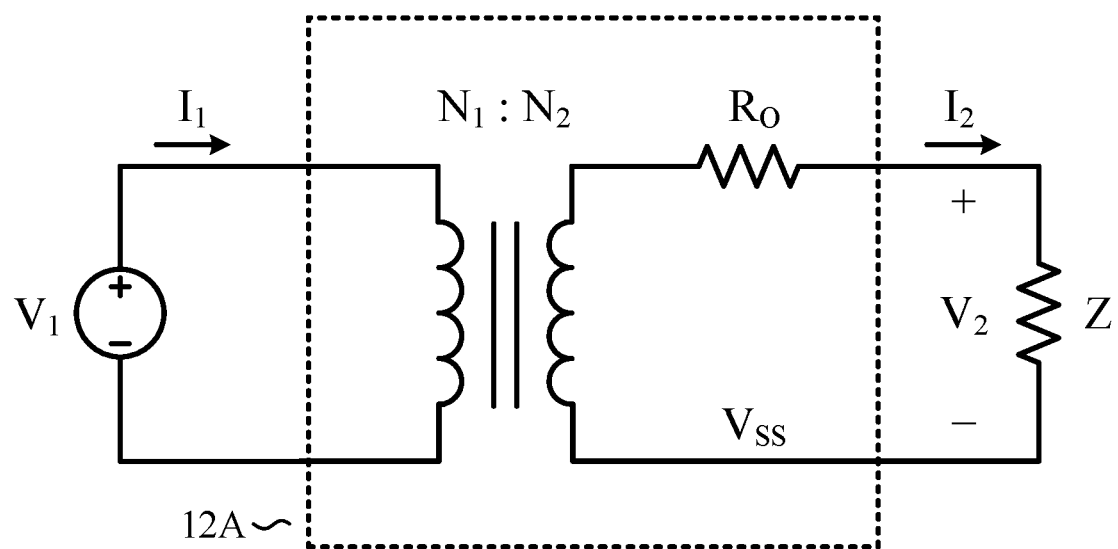
FIG. 8 shows a model of a switched capacitor DC-DC converter.

A switched capacitor converter can be modeled as an ideal transformer, as shown in FIG. 8, with a finite output resistance $R_o$ that accounts for the power loss incurred in charging or discharging of the energy transfer capacitors, as shown in FIG. 8. This loss is typically dissipated in the ON resistance of the MOSFETs and equivalent series resistance of the capacitors.

The output voltage of the switched capacitor converter is given by $$V_o = V_{in}\frac{N_2}{N_1} - I_o R_o.$$

There are two limiting cases where the operation of switched capacitor converters can be simplified and $R_o$ easily found. These are referred to as the "slow-switching limit" and the "fast-switching limit."

In the fast-switching limit ($\tau \gg T_{sw}$), the charging and discharging currents are approximately constant, resulting in a triangular AC ripple on the capacitors. Hence, $R_o$ is sensitive to the series resistance of the MOSFETs and capacitors, but is not a function of the operating frequency. In this case, $R_o$ of the converter operating in the fast-switching limit is a function of parasitic resistance.

In the slow-switching limit, the switching period $T_{sw}$ is much longer than the RC time constant r of the energy transfer capacitors. Under this condition, there is systemic energy loss irrespective of the resistance of the capacitors and switches. This systemic energy loss arises in part because the root mean square (RMS) of the charging and discharging current is a function of the RC time constant. If the effective resistance $R_{eff}$ of the charging path is reduced (i.e. reduced RC), the RMS current increases and it so happens that the total charging energy loss ($E_{loss} = I_{RMS}^2 R_{eff} = \frac{1}{2}C \times \Delta V_{C2}$) is independent of $R_{eff}$. One solution to minimize this energy loss is to increase the size of the pump capacitors in the switched capacitor network.

It is desirable for a switched capacitor network to have a common ground, large transformation ratio, low switch stress, low DC capacitor voltage, and low output resistance. Among the more useful topologies are: Ladder, Dickson, Series-Parallel, Fibonacci, and Doubler.

Figure 9A:
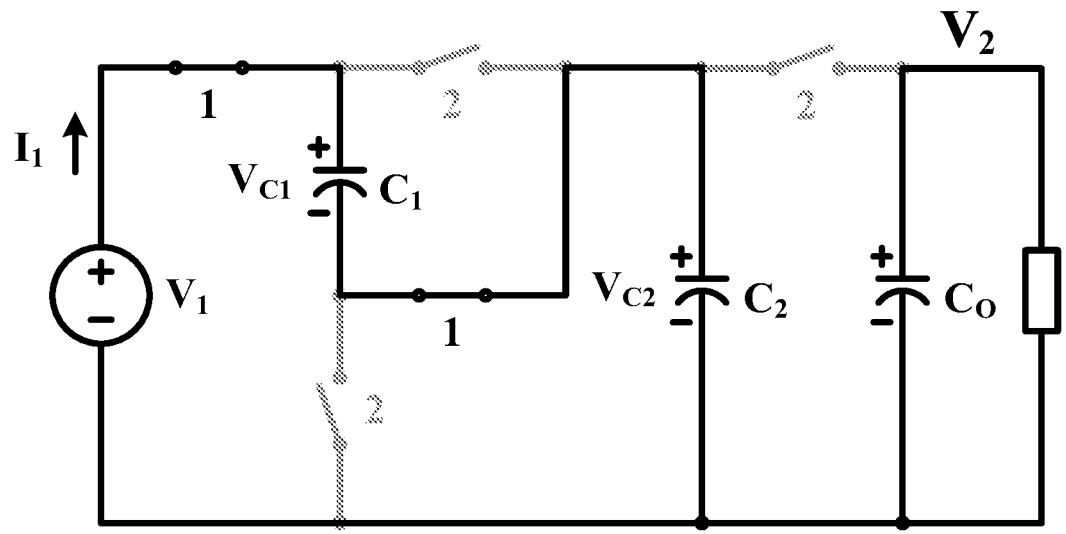
FIGS. 9A and 9B show a series-parallel SC converter operating in charge phase and discharge phase, respectively.
Figure 9B:
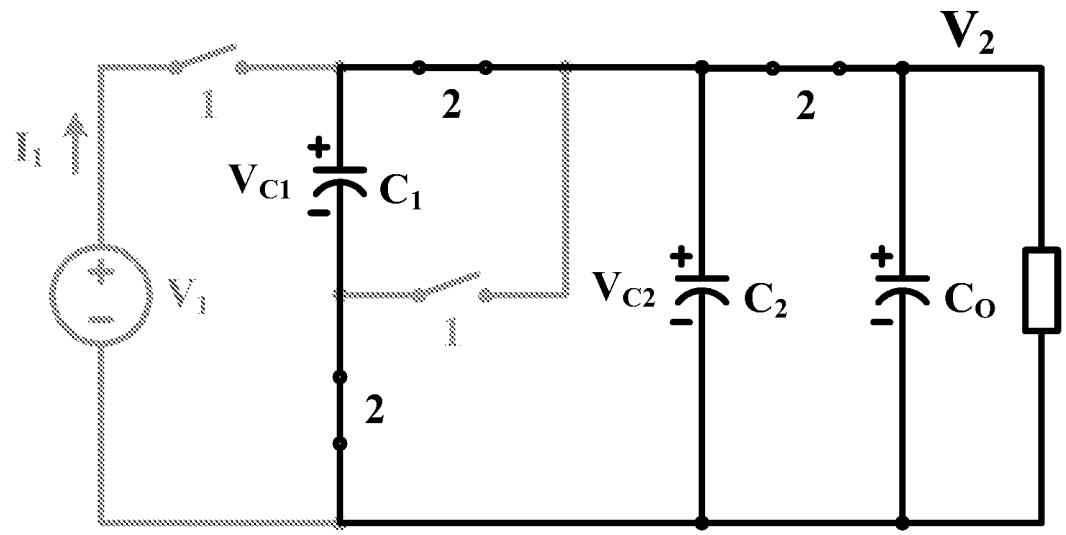

One useful converter is a series-parallel switched capacitor converter. FIGS. 9A and 9B show a 2:1 series-parallel switched capacitor converter operating in charge phase and in discharge phase, respectively. During the charge phase, the capacitors are in series. In the discharge phase, the capacitors are in parallel. In its charge phase, capacitor voltages $v_{C1}$ and $v_{C2}$ add up to $V_1$ while in its discharge phase, $v_{C1}$ and $v_{C2}$ equal $V_2$, which means that $V_2 = V_1/2$.

Figure 10:
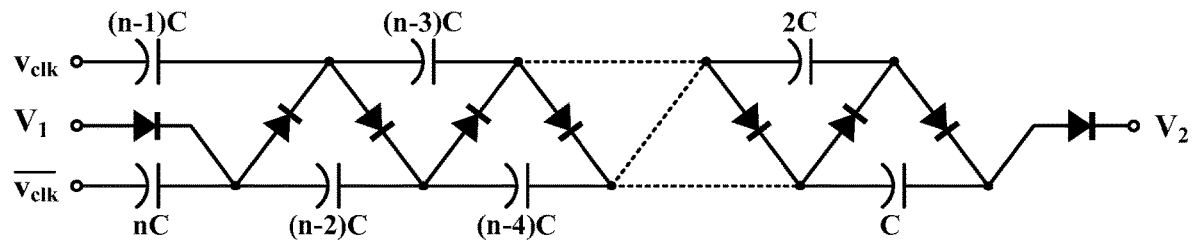
FIG. 10 shows a series pumped symmetric cascade multiplier with diodes.
Figure 11:
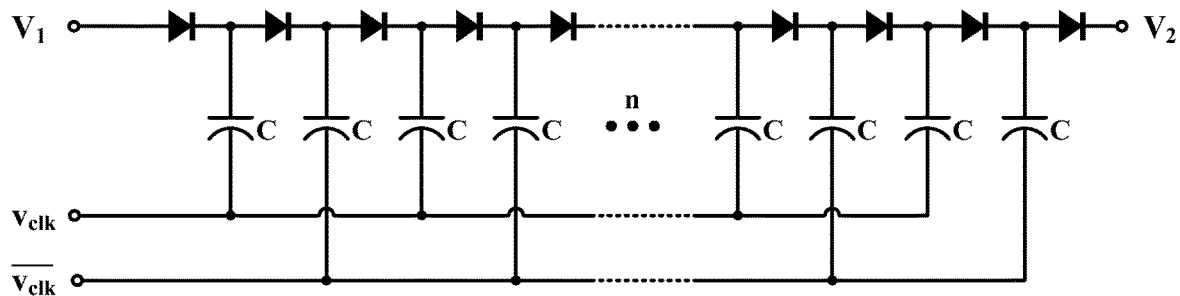
FIG. 11 shows a parallel pumped symmetric cascade multiplier with diodes.
Figure 12:
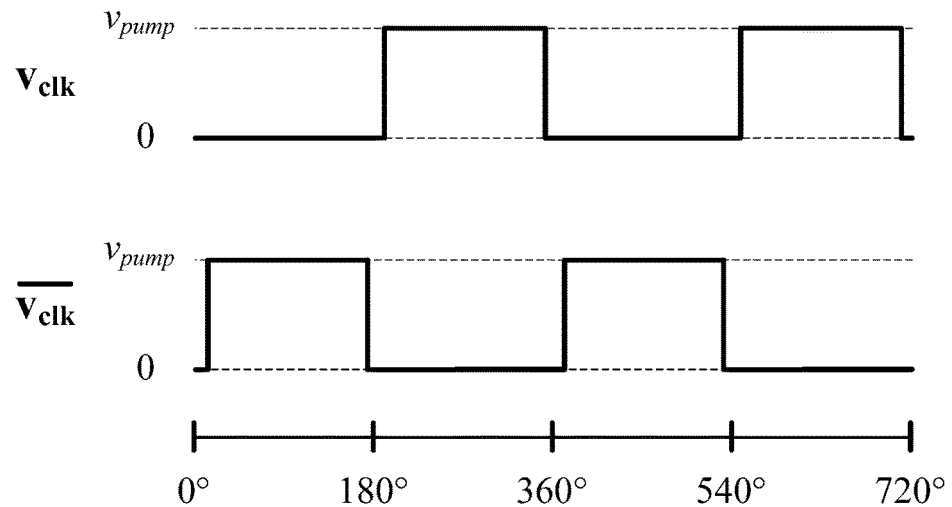
FIG. 12 shows charge pump signals.

Other useful topologies are cascade multiplier topologies, as shown in FIGS. 10 and 11. In both charge pumps, a source is located at $V_1$ and a load is located at $V_2$. In these types of charge pumps, packets of charge are pumped along a diode chain as the coupling capacitors are successively charged and discharged. As shown in FIG. 12, clock signals $v_{clk}$ and $\overline{v_{clk}}$ with amplitude $v_{pump}$ are 180 degrees out of phase. The coupling capacitors can either be pumped in series or in parallel.

It takes n clock cycles for the initial charge to reach the output. The charge on the final pump capacitor is n times larger than the charge on the initial pump capacitor and thus $V_2$ for the converters is $V_1+(n-1)\times v_{pump}$ in both pumping configurations.

Although the foregoing topologies are suitable for stepping up voltage, they can also be used to step down voltage by switching the location of the source and the load. In such cases, the diodes can be replaced with controlled switches such as MOSFETs and BJTs.

Figure 13:
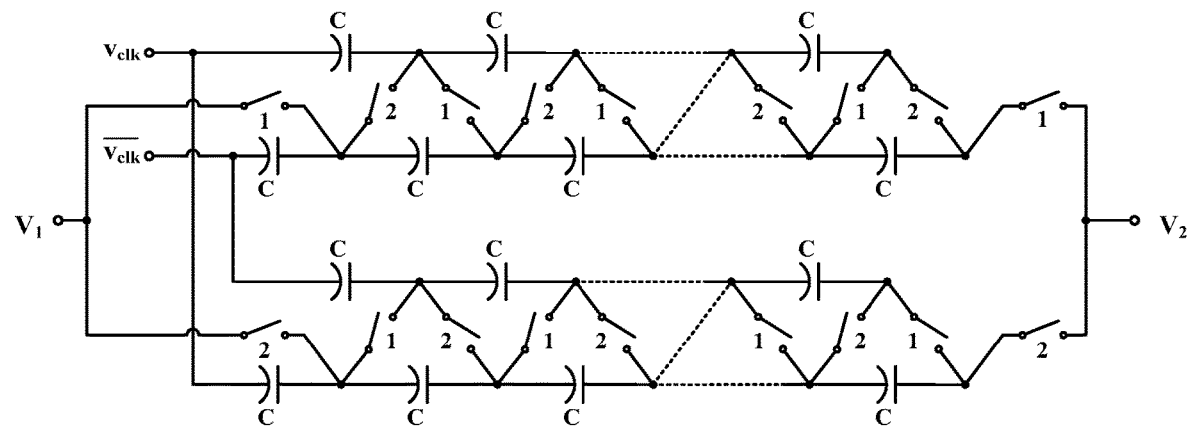
FIG. 13 shows a two-phase symmetric series pumped cascade multiplier with switches.
Figure 14:
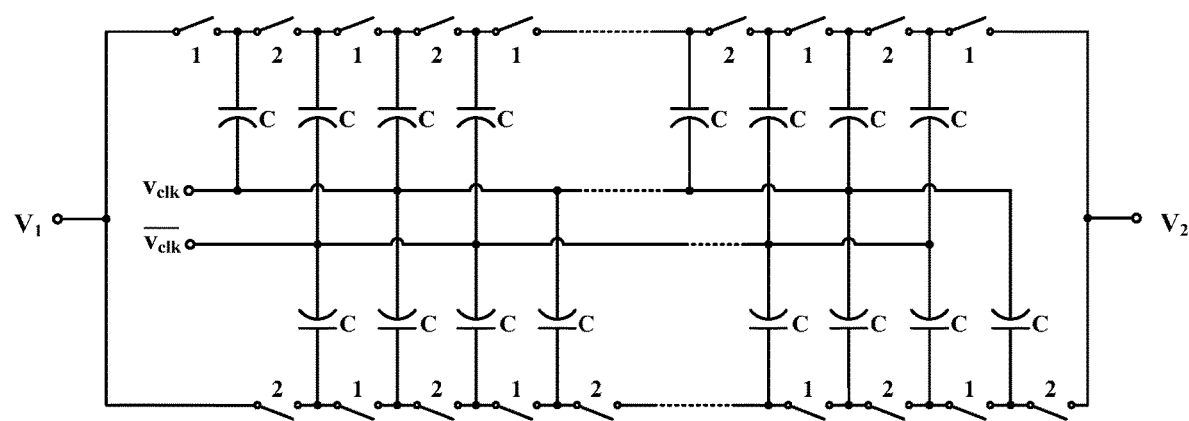
FIG. 14 shows a two-phase symmetric parallel pumped cascade multiplier with switches.
Figure 15:
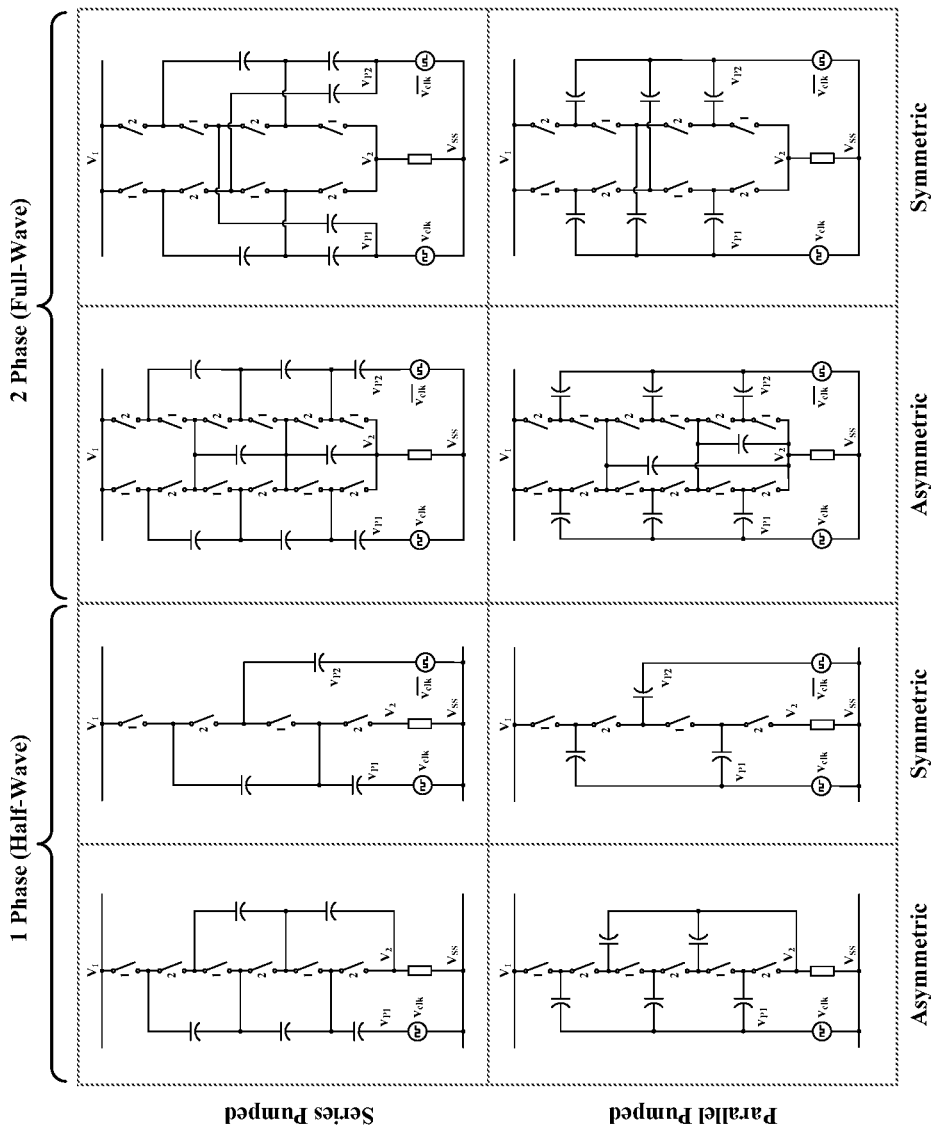
FIG. 15 shows four different cascade multipliers along with corresponding half-wave versions.

The foregoing cascade multipliers are half-wave multipliers in which charge is transferred during one phase of the of the clock signal. This causes a discontinuous input current. Both of these cascade multipliers can be converted into full-wave multipliers by connecting two half-wave multipliers in parallel and running the half-wave multipliers 180 degrees out of phase. FIG. 13 shows a full-wave symmetric series pumped cascade multiplier version while FIG. 14 shows a full-wave symmetric parallel pumped cascade multiplier version. Unlike the diodes in the half-multiplier, the switches in FIG. 13 and FIG. 14 are bidirectional. As a result, in both of these cascade multipliers, power can flow either from the source to the load or from the load to the source. Asymmetric multipliers can also be converted into full-wave multipliers FIG. 15 shows four different step-down versions of full-wave multipliers along with their corresponding half-wave versions. Furthermore, it is possible to combine N phases in parallel and run them 180 degrees/N out of phase to reduce output voltage ripple and increase output power handling capability. The asymmetric multipliers have a special property: they contain DC nodes that are at voltage levels that are multiples of $V_2$. These DC nodes can serve as tap points for delivering or drawing power. They also provide convenient locations at which to reference $V_1$. This permits one to separate the grounds.

The basic building blocks in the modular architecture shown FIGS. 1A-4 can either be connected as independent entities or coupled entities. In the situation where switching networks and regulating circuits are tightly coupled, it is possible to prevent and/or reduce the systemic energy loss mechanism of the switching networks through adiabatic charging. This generally includes using the regulating circuit to control the charging and discharging of the capacitors in the switching network. Furthermore, the output voltage of the regulating circuit and thus the total converter can be regulated in response to external stimuli. One approach to regulating the output voltage is by controlling the average DC current in a magnetic-storage element, such as that found in a magnetic filter.

A desirable feature of the regulating circuit is to constrain the root mean square (RMS) current through the capacitors in the switching network to be below some limit. A regulating circuit achieves such a constraint by using either resistive or magnetic-storage elements. Unfortunately, resistive elements would consume power so their use is less desirable. Therefore, embodiments described herein rely on a magnetic-storage element with optional switches in the regulating circuit. The regulating circuit limits the RMS current by forcing the capacitor current through the magnetic-storage element in the regulating circuit that has an average DC current. In those regulating circuits that include switches, the switches are operated so as to maintain an average DC current through the magnetic-storage element. This can be achieved by varying the duty cycle of a switch in series with the magnetic-storage element. In one embodiment, the duty cycle approaches zero so that at least one switch is effectively always on. In the limiting case, at least one switch can be eliminated altogether.

The regulating circuit may limit both the RMS charging current and the RMS discharging current of at least one capacitor in the switching network. One single regulating circuit may limit the current in or out of the switching network by sinking and/or sourcing current. Therefore, there are four fundamental configurations, which are shown in FIGS. 1A-4. Assuming power flows from the source to load then, in FIG. 1A, the regulating circuit 16A may sink both the charging and discharging current of the switching network 12A. In FIG. 3, the regulating circuit 16A may source both the charging and discharging current of the switching network 12A. In FIG. 4, the regulating circuit 16A may source the charging current of the switching network 12A and the regulating circuit 16B may sink the discharging current of the same switching network 12A and vice-versa. In FIG. 2, the regulating circuit 16A may source both the charging and discharging current of the switching network 12B while also sinking both the charging and discharging current of the switching network 12A. Furthermore, if both the switching networks 12A, 12B and the regulating circuits 16A, 16B allow power to flow in both directions then bidirectional power flow is possible (source to load and load to source).

One embodiment relies on at least partially adiabatically charging full-wave cascade multipliers. A particularly preferred switching network, because of its superior fast-switching limit impedance, the ease with which it can be scaled up in voltage, and its low switch stress, is the cascade multiplier.

In cascade multipliers, the coupling capacitors are typically pumped with a clocked voltage source $v_{clk}$ & $\overline{v_{clk}}$. However, if the coupling capacitors are pumped with a clocked current source $i_{clk}$ & $\overline{i_{clk}}$ instead, then the RMS charging and discharging current in the coupling capacitor may be limited. In this case, the capacitors are at least partially charged adiabatically thus lowering, if not eliminating, the $\frac{1}{2}C\times\Delta Vc^2$ loss that is associated with a switched capacitor converter when operated in the slow-switching limit. This has the effect of lowering the output impedance to the fast-switching limit impedance. As shown by the black dotted line in FIG. 16, which depicts adiabatic operation, under full adiabatic charging, the output impedance would no longer be a function of switching frequency.

With all else being equal, an adiabatically charged switched capacitor converter can operate at a much lower switching frequency than a conventionally charged switched capacitor converter, but at higher efficiency. Conversely, an adiabatically charged switched capacitor converter can operate at the same frequency and with the same efficiency as a conventionally charged switched capacitor converter, but with much smaller coupling capacitors, for example, between four and ten times smaller.

Figure 17:
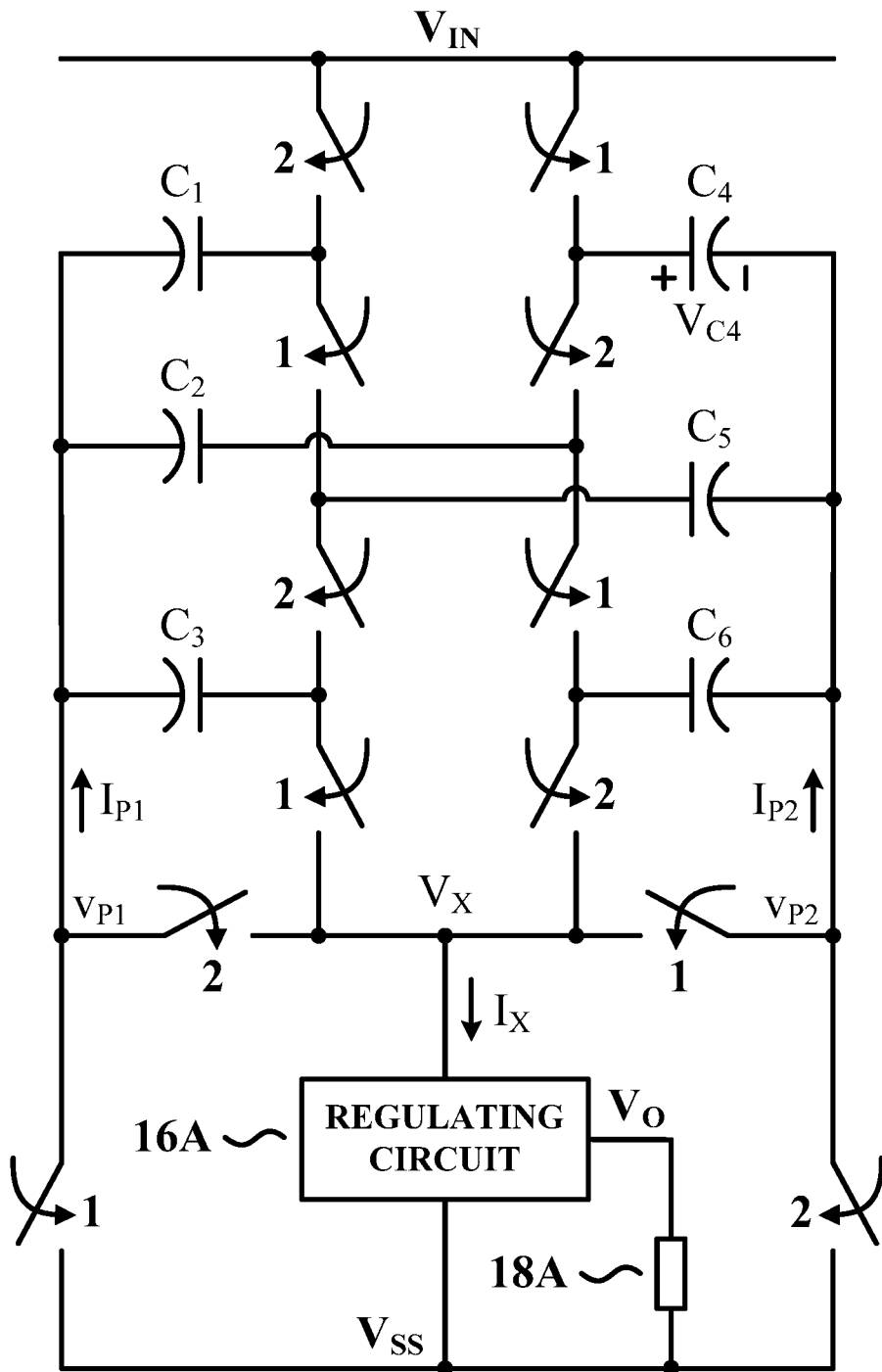
FIG. 17 shows a particular implementation of the DC-DC converter illustrated in FIG. 1B with a full-wave adiabatically charged switching network.

FIG. 17 shows a step-down converter consistent with the architecture shown in FIG. 1B. In this embodiment, the switching network 12A is adiabatically charged using the regulating circuit 16A. The clocked current sources $i_{clk}$ & $\overline{i_{clk}}$ are emulated by four switches and the regulating circuit 16A. The output capacitor $C_O$ has also been removed so as to allow $V_X$ to swing. In this example, the regulating circuit 16A is a boost converter that behaves as constant source with a small AC ripple. Any power converter that has a non-capacitive input impedance at the frequency of operation would have allowed adiabatic operation. Although switch-mode power converters are attractive candidates due to their high efficiency, linear regulators are also practical.

Figure 18:
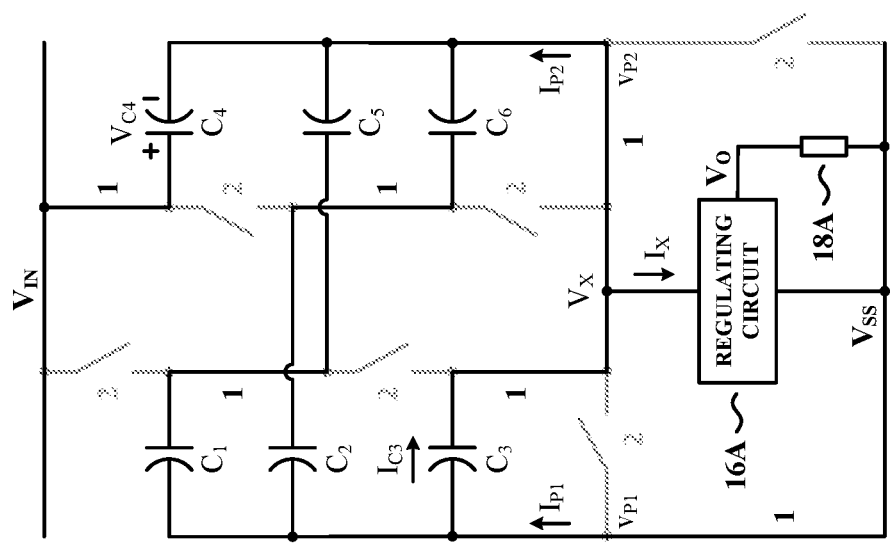
FIG. 18 shows the DC-DC converter illustrated in FIG. 17 during phase A.
Figure 19:
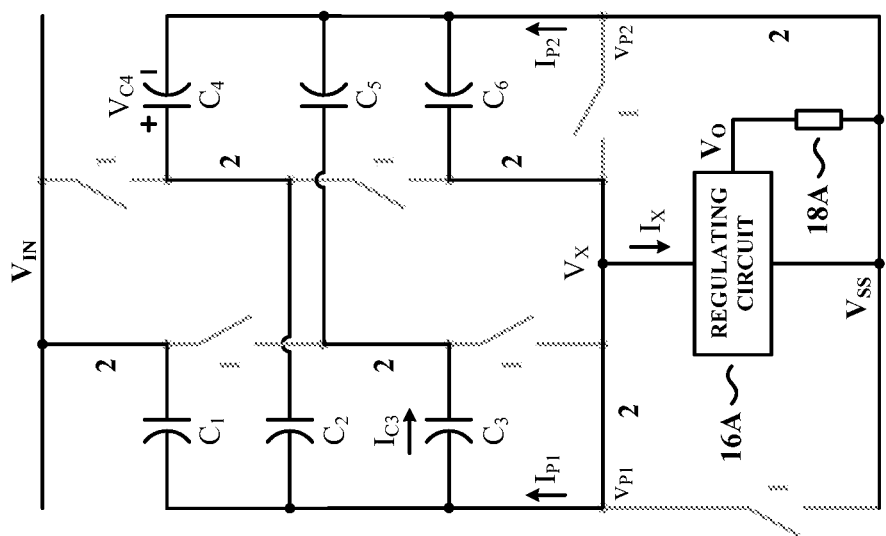
FIG. 19 shows the DC-DC converter illustrated in FIG. 17 during phase B.

In operation, the act of closing switches labeled "1" charges the capacitors $C_4$, $C_5$, and $C_6$ while discharging the capacitors $C_1$, $C_2$, and $C_3$. Similarly, the act of closing switches labeled "2" has the complementary effect. The first topological state (phase A) is shown in FIG. 18, where all switches labeled "1" are closed and all switches labeled "2" are opened. Similarly, the second topological state (phase B) is shown in FIG. 19, where all switches labeled "2" are closed and all switches labeled "1" are opened.

In this embodiment, the regulating circuit 16A limits the RMS charging and discharging current of each capacitor. For example, the capacitor $C_3$ is discharged through the magnetic filtering element in the regulating circuit 16A during phase A, while the capacitor $C_3$ is charged through the magnetic filtering element in the regulating circuit 16A during phase B, clearly demonstrating the adiabatic concept. Furthermore, all of the active components are implemented with switches so the converter can process power in both directions.

Figure 20:
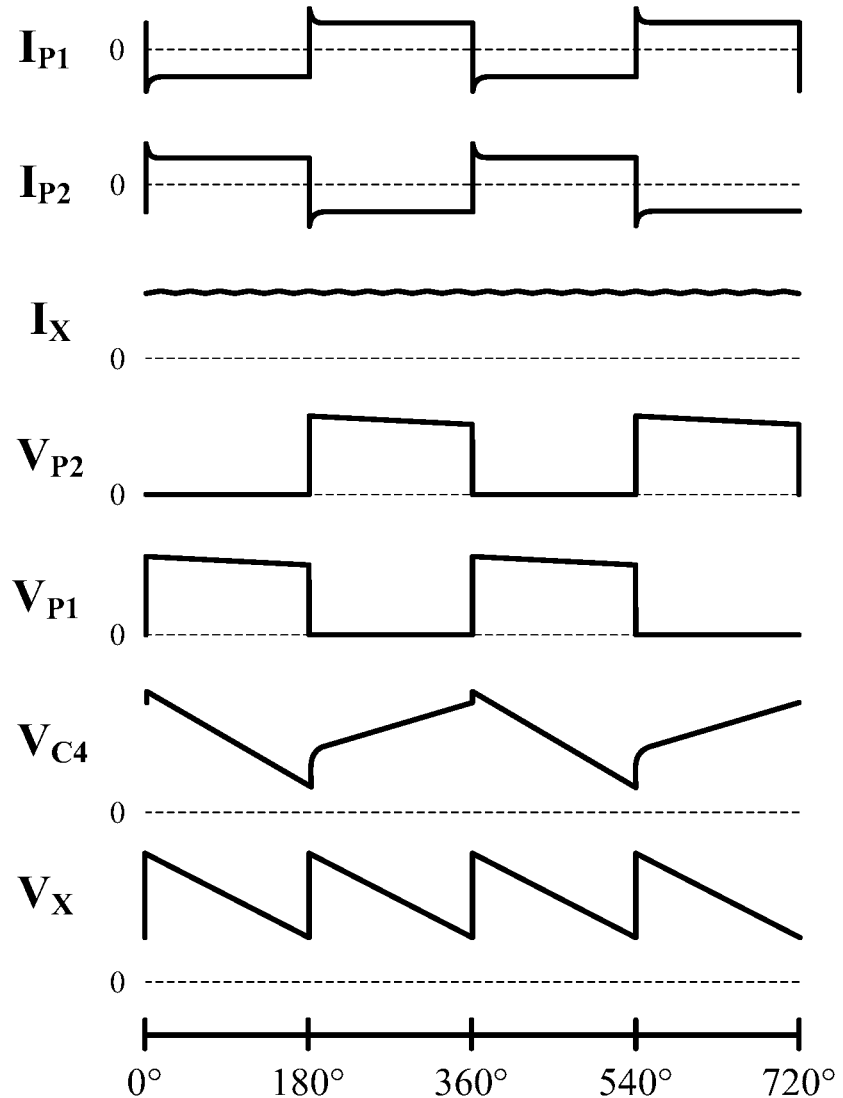
FIG. 20 shows various waveforms associated with a 4:1 adiabatically charged converter.

A few representative node voltages and currents are shown in FIG. 20. There is a slight amount of distortion on the rising and falling edges of the two illustrated currents ($I_{P1}$ and $I_{P2}$), but for the most part, the currents resemble two clocks 180 degrees out of phase. In general, adiabatic charging occurs in cascade multipliers only if at least one end of a switch stack is not loaded with a large capacitance, as is the case in this embodiment, where the $V_X$ node is only loaded down by the regulating circuit 16A.

In operation, different amounts of current will flow through different switches. It is therefore useful to size the switches in a manner appropriate to the currents that will be flowing through them. For example, in FIG. 17, the switches that are connected to the nodes maintained at $V_{P1}$ and $V_{P2}$ carry more current then the other switches. If one were to make all switches the same area, then the remaining switches would be far bigger than necessary. By making the other switches smaller than those connected to the nodes at $V_{P1}$ and $V_{P2}$, one avoids having unnecessarily large switches. Since each switch consumes a portion of the circuit, one can then make the entire circuit physically smaller.

An additional advantage is that capacitive loss increases as the switch area increases. Thus, customizing the switch's area to the current that it carries during operation yields a dual benefit. It not only reduces the overall size of the circuit's footprint, it also has the effect of reducing capacitive loss.

Figure 16:
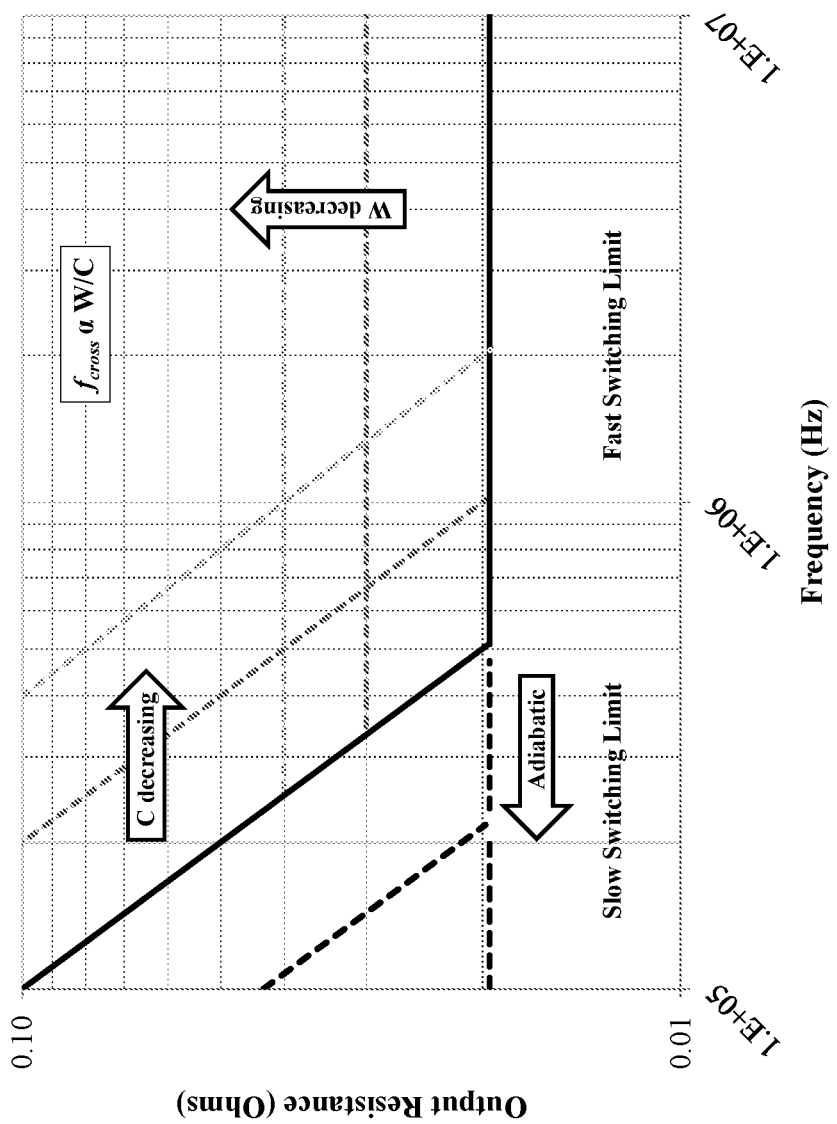
FIG. 16 shows output impedance of a switched capacitor converter as a function of frequency.

The switches shown in FIG. 17 will transition between states at some switching frequency. To reduce loss, it is desirable that the switching network 12A constrain the RMS current through the switches at that switching frequency. One way to constrain the RMS current is to correctly choose the resistances of the switches. In particular, the resistances should be high enough so that the RC time constant of the charge transfer between the capacitors is similar to, or longer than, the switching frequency. As can be seen in FIG. 16, by controlling the width "W" of the switches and hence their resistance and their size, the switching network 12A can be forced into the fast-switching limit region.

Unfortunately, by using the resistance of the switches to constrain the RMS current, resistive power losses increase and the overall efficiency decreases. The regulating circuit 16A, however, allows us to reduce the resistance of the switches while still operating adiabatically. Therefore, the switches can be optimally sized for the highest efficiency without worrying about constraining the RMS current since it is handled by the regulating circuit 16A (or optionally a magnetic filter). The optimal size for each switch is chosen by balancing the resistive and capacitive losses in each switch at a given switching frequency and at a given current.

The modular architecture with the basic building blocks shown in FIGS. 1A-4 may be expanded to cover a wider range of applications, such as high-voltage DC, AC-DC, buck-boost, and multiple output voltages. Each of these applications includes separating the transformation, regulation, and possibly magnetic filtering functions. Extension of the architecture can also incorporate adiabatically charged switched capacitor converters.

Figure 21:
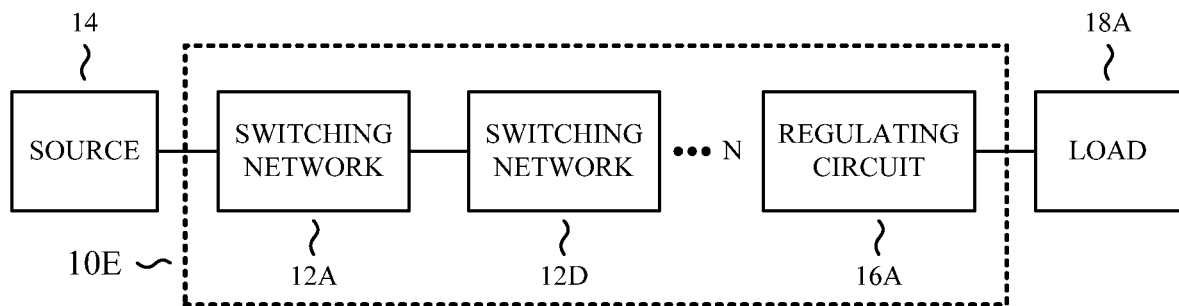
FIG. 21 shows adiabatic charging of series connected stages.

In many switched capacitor converters, the number of capacitors and switches increases linearly with the transformation ratio. Thus, a large number of capacitors and switches are required if the transformation ratio is large. Alternatively, a large transformation ratio can be achieved by connecting numerous low gain stages in series as depicted in FIG. 21. The transformation ratio of the total switch capacitor stack ($V_{in}/V_x$) is as follows:

$$\frac{V_{in}}{V_x} = N_1 \times N_2 \ldots N_n. \quad (2.1)$$

The main disadvantage of the series stacked configuration is that the voltage stresses on the front stages are much higher than those of the rear stages. This will normally require stages with different voltage ratings and sizes. However, the transformation ratio can be easily changed by bypassing one or more stages.

Adiabatic charging of a preceding series-connected switching network only occurs if the following switching network controls the charging and discharging current of the preceding stage. Thus, it is preferable to use full-wave switched capacitor converters in the front stages or to use switched capacitor stages such as the single-phase series-parallel switched capacitor converters with magnetic filters.

Figure 22:
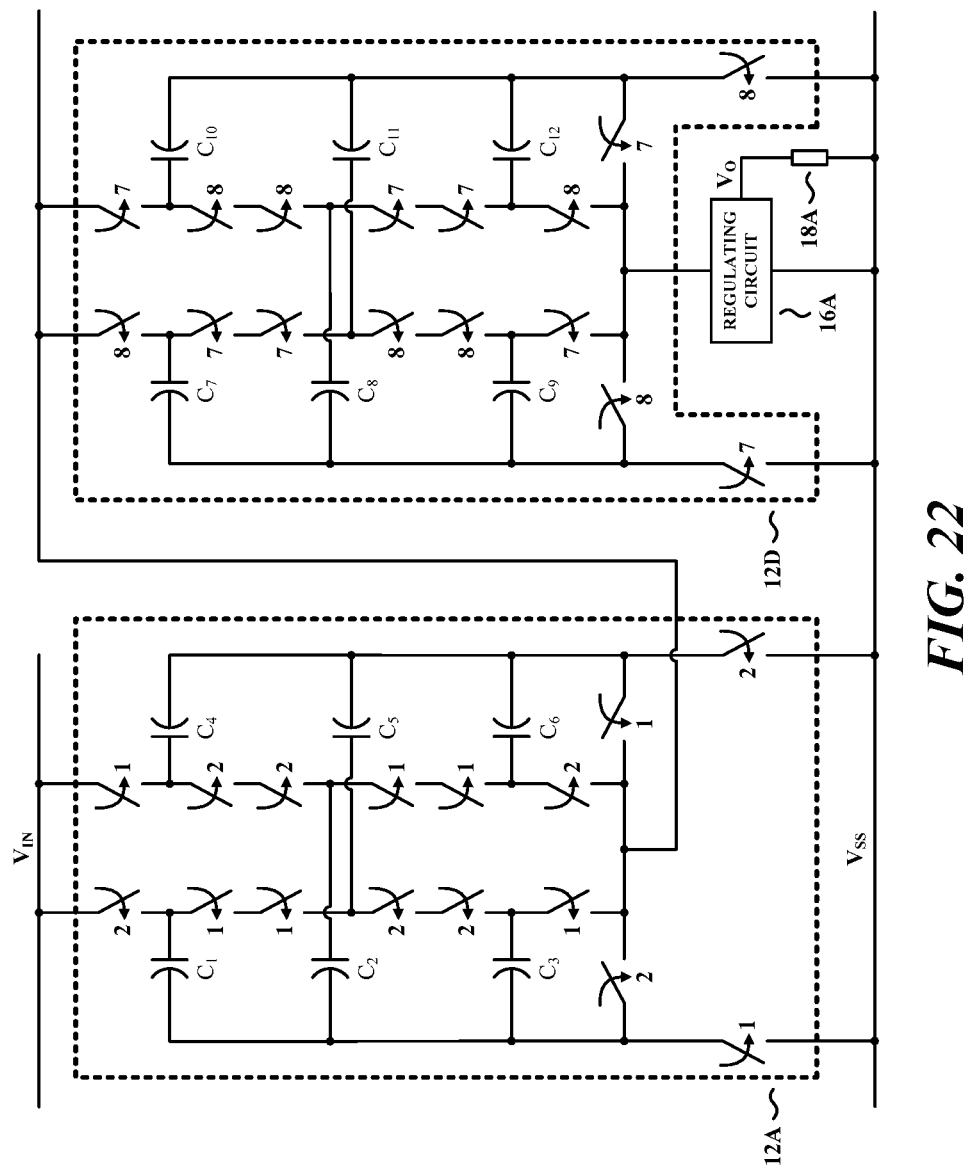
FIG. 22 shows a particular implementation of the power converter illustrated in FIG. 21.

FIG. 22 shows a converter with a first switching network 12A connected in series with a second switching network 12D consistent with the architecture shown in FIG. 21. Both the first and second switching networks 12A, 12D are two-phase cascade multipliers. In operation, switches labeled "1" and "2" are always in complementary states and switches labeled "7" and "8" are always in complementary states. Thus, in a first switched-state, all switches labeled "1" are open and all switches labeled "2" are closed. In a second switched-state, all switches labeled "1" are closed and all switches labeled "2" are opened. In this embodiment, closing switches 1 charges capacitors $C_1$, $C_2$, $C_3$, while discharging capacitors $C_4$, $C_5$, $C_6$ and closing switches 2 has the complementary effect. Also, closing switches 7 charges capacitors $C_7$, $C_8$, $C_9$, while discharging capacitors $C_{10}$, $C_{11}$, $C_{12}$ and closing switches 8 has the complementary effect.

The power converter provides a total step-down of 32:1, assuming the first regulating circuit 16A is a buck converter with a nominal step-down ratio of 2:1. Furthermore, if the input voltage is 32 V and the output voltage is 1 V, then the switches in the first switching network 12A will need to block 8 volts while the switches in the second switching network 12D will need to block 2 volts.

The modular architecture with the basic building blocks shown in FIGS. 1A-4 may be configured to handle an AC input voltage as well. One of the main attributes of switched capacitor converters is their ability to operate efficiency over a large input range by reconfiguring the switched capacitor network. If the AC wall voltage (i.e. 60 Hz & 120 $V_{RMS}$) can be thought of as a slow moving DC voltage, then a front-end switched capacitor stage 13A, also known as an AC switching network, should be able to unfold the time-varying input voltage into a relatively stable DC voltage.

Figure 23:
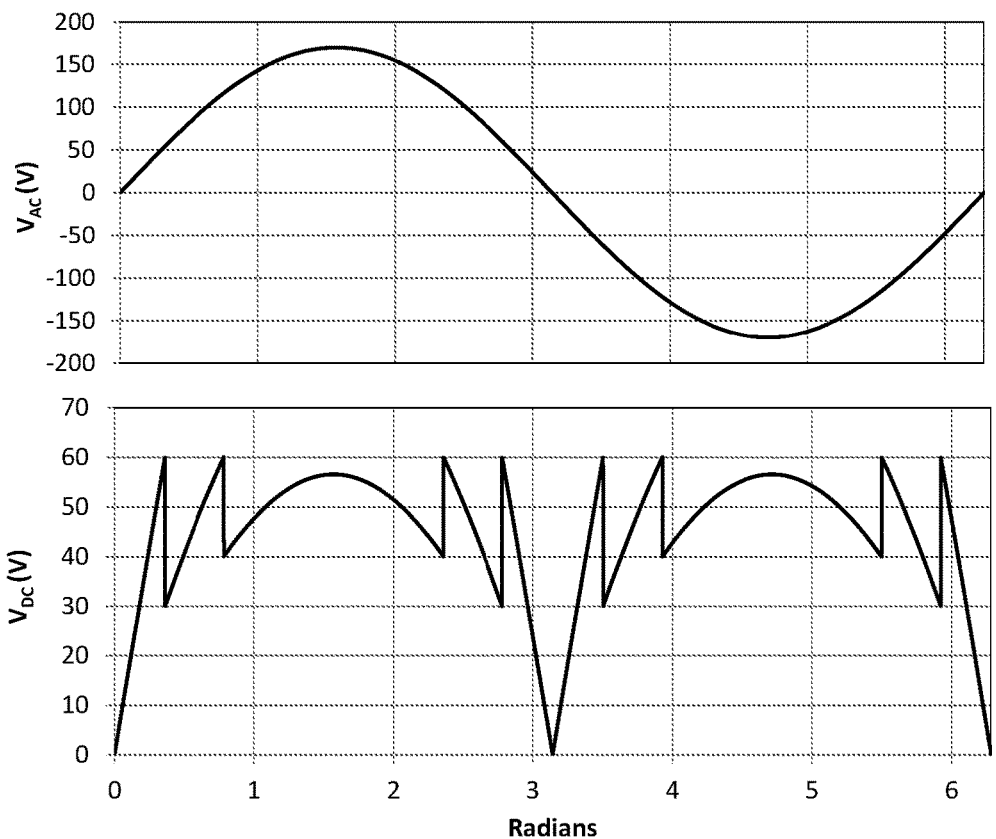
FIG. 23 shows an AC voltage rectified using a reconfigurable switched capacitor stage.

A diagram of a 120 $V_{RMS}$ AC waveform over a single 60 Hz cycle overlaid with the unfolded DC voltage is shown in FIG. 23. The AC switching network 13A has different configurations (1/3, 1/2, 1/1) at its disposal along with an inverting stage. It was also designed to keep the DC voltage under 60 V. Once the AC voltage is unfolded, it is the job of a regulating circuit 16A, shown in FIG. 24, to produce a final output voltage. It may also be necessary to place another switching network between the AC switching network 13A and the regulating circuit 16A to further condition the voltage. If this is the case, then the caveats for series-connected stages hold true since the AC switching network 13A is a special purpose switching network. Some form of magnetic or electric isolation is also common in AC-DC converters for safety reasons. Hence, in FIG. 24, voltages: $V_{AC}$, $V_{DC}$, and $V_O$ are purposely defined as being agnostic to a common ground.

Figure 24:
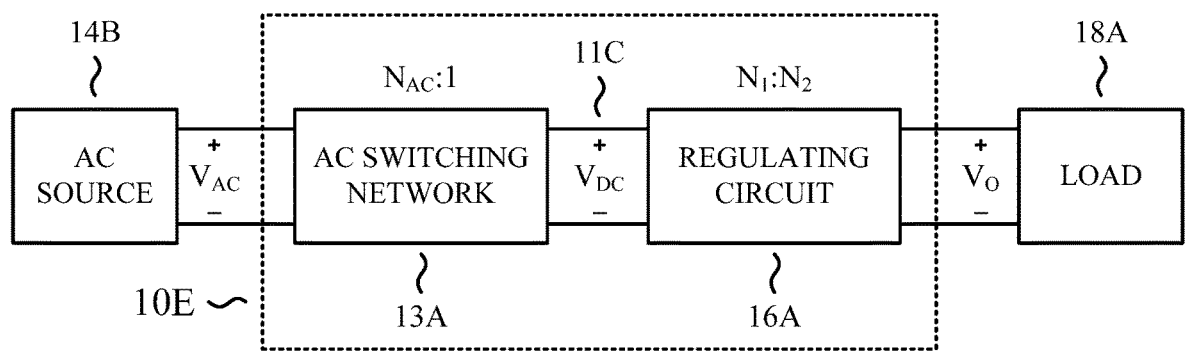
FIG. 24 shows an AC-DC power converter architecture.
Figure 25:
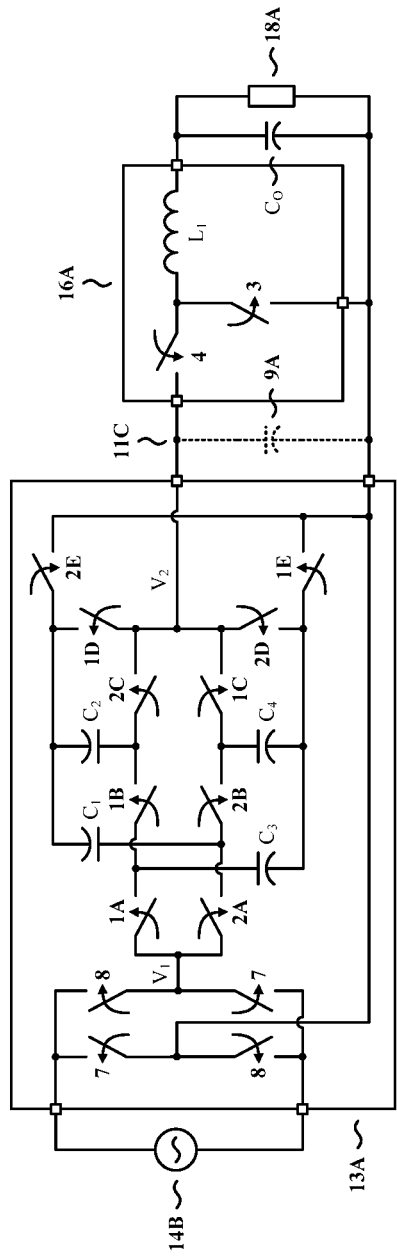
FIG. 25 shows a particular implementation of the AC-DC converter illustrated in FIG. 24.
Figure 26:
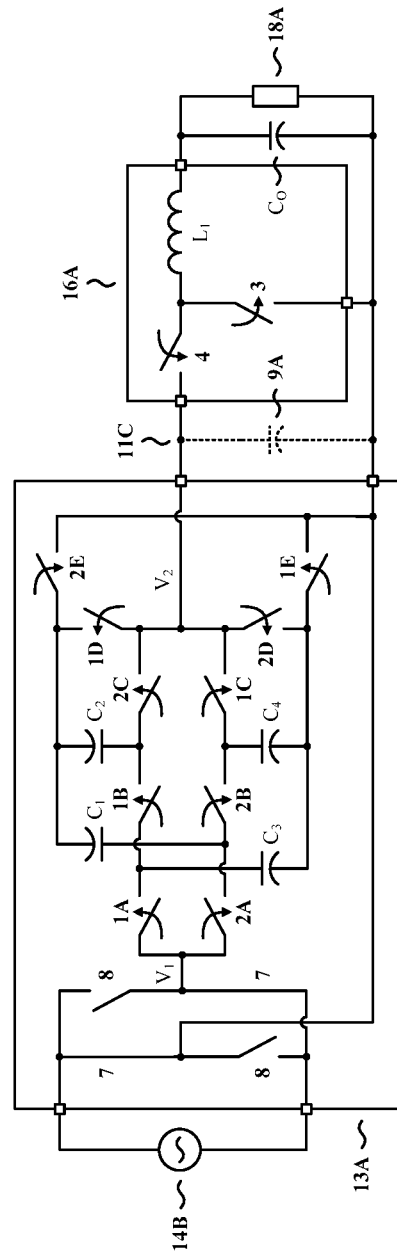
FIG. 26 shows the AC-DC converter illustrated in FIG. 25 during the positive portion of the AC cycle.
Figure 27:
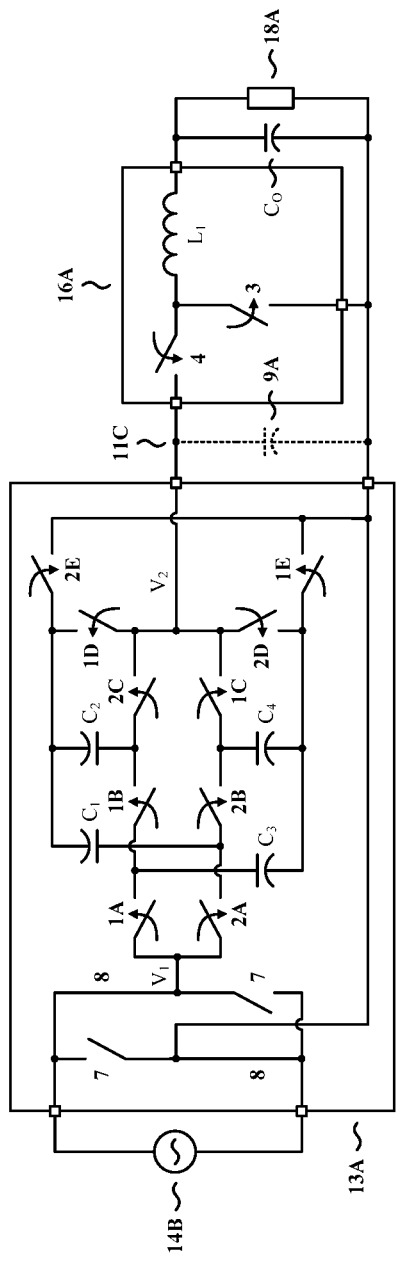
FIG. 27 shows the AC-DC converter illustrated in FIG. 25 during the negative portion of the AC cycle.

FIG. 25 shows an AC-DC converter corresponding to the architecture shown in FIG. 24. In this embodiment, the AC switching network 13A is a synchronous AC bridge rectifier followed by a reconfigurable two-phase step-down cascade multiplier with three distinct conversion ratios (1/3, 1/2, 1/1) while the regulating circuit 16A is a synchronous buck converter. In operation, switches labeled "7" and "8" are always in complementary states. During the positive portion of the AC cycle (0 to π radians) all switches labeled "7" are closed while all switches labeled "8" are opened as shown in FIG. 26. Similarly, during the negative portion of the AC cycle (π to 2π radians) all switches labeled "8" are closed while all switches labeled "7" are opened as shown in FIG. 27.

In addition to the inverting function provided by switches 7 and 8, switches 1A-1E and switches 2A-2E may be selectively opened and closed as shown in Table 1 to provide three distinct conversion ratios of: 1/3, 1/2, and 1.

Figure 28:
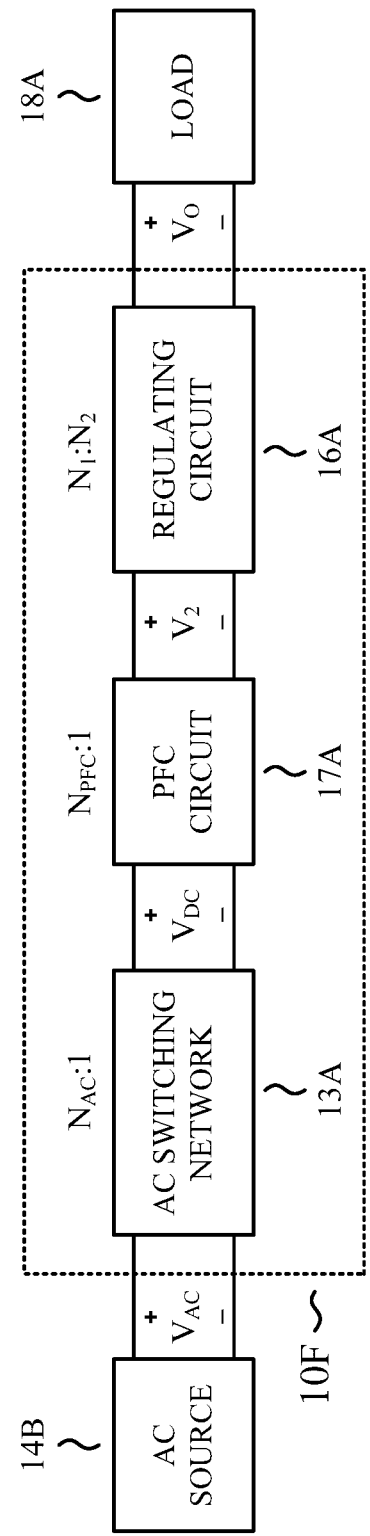
FIG. 28 shows an AC-DC power converter architecture with power-factor correction.

Most power supplies attached to the wall meet some power factor specification. Power factor is a dimensionless number between 0 and 1 that defines a ratio of the real power flowing to apparent power. A common way to control the harmonic current and thus boost the power factor is by using an active power factor corrector, as shown in FIG. 28. A power-factor correction circuit 17A causes the input current to be in phase with the line voltage, thus causing reactive power consumption to be zero.

FIGS. 29-36 show specific implementations of power converters that conform to the architectural diagrams shown in FIGS. 1A-4. In each implementation, a regulating circuit or multiple regulating circuits, which may include magnetic filters, may limit both the RMS charging current and the RMS discharging current of at least one capacitor in each switching network so all of these switching networks are adiabatically charged switching networks. However, if decoupling capacitors 9A or 9B are present, then the ability of the regulating circuit to limit the RMS charging and discharging current may be diminished. Capacitors 9A and 9B are optional and to keep the output voltage fairly constant, a capacitor $C_O$ is used. All of the stages share a common ground. However, this need not be the case. For example, if a regulating circuit 16A is implemented as a fly-back converter, then the ground can be separated easily. Even a switching network 12A can have separate grounds through capacitive isolation. Furthermore, for simplicity, the switching network in each implementation has a single conversion ratio. However, reconfigurable switching networks that provide power conversion at multiple distinct conversion ratios may be used instead.

In operation, switches labeled "1" and "2" are always in complementary states. Thus, in a first switched-state, all switches labeled "1" are open and all switches labeled "2" are closed. In a second switched-state, all switches labeled "1" are closed and all switches labeled "2" are opened. Similarly, switches labeled "3" and "4" are in complementary states, switches labeled "5" and "6" are in complementary states, and switches labeled "7" and "8" are in complementary states. Typically, the regulating circuits operate at higher switching frequencies than the switching networks. However, there is no requirement on the switching frequencies between and amongst the switching networks and regulating circuits.

TABLE 1

| $V_2/V_1$ | 1A | 1B | 1C | 1D | 1E | 2A | 2B | 2C | 2D | 2E |
|---|---|---|---|---|---|---|---|---|---|---|
| 1/3 | CLK | CLK | CLK | CLK | CLK | CLKB | CLKB | CLKB | CLKB | CLKB |
| 1/2 | CLKB | CLK | CLK | CLK | CLK | CLK | CLKB | CLKB | CLKB | CLKB |
| 1/1 | ON | ON | ON | OFF | OFF | ON | ON | ON | OFF | OFF |

The AC switching network 13A is provided with a digital clock signal CLK. A second signal CLKB is also generated, which may simply be the complement of CLK (i.e., is high when CLK is low and low when CLK is high), or which may be generated as a non-overlapping complement. With a switching pattern set in accordance with the first row of Table 1, the AC switching network 13A provides a step-down ratio of one-third (1/3). With a switching pattern set in accordance with the second row of Table 1, the AC switching network 13A provides a step-down ratio of one-half (1/2). With a switching pattern set in accordance with the first row of Table 1, the AC switching network 13A provides a step-down ratio of one.

Figure 29:
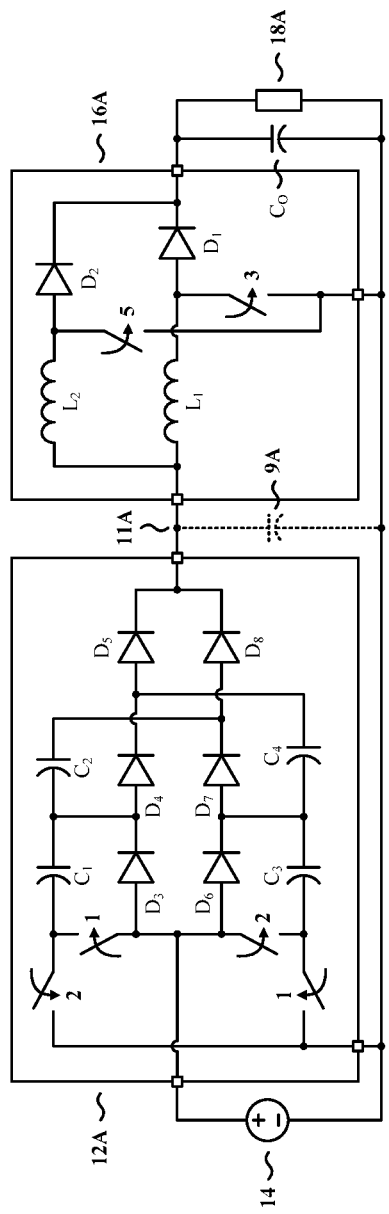
FIGS. 29 and 30 show particular implementations of the DC-DC converter illustrated in FIGS. 1A-1B.

FIG. 29 shows a step-up converter corresponding to the architecture shown in FIG. 1A. In this embodiment, the switching network 12A is a two-phase step-up cascade multiplier with a conversion ratio of 1:3 while the regulating circuit 16A is a two-phase boost converter. In operation, closing switches 1 and opening switches 2 charges capacitors $C_3$ and $C_4$ while discharging capacitors $C_1$ and $C_2$. Conversely, opening switches 1 and closing switches 2 charges the capacitors $C_1$ and $C_2$ while discharging the capacitors $C_3$ and $C_4$.

Figure 30:
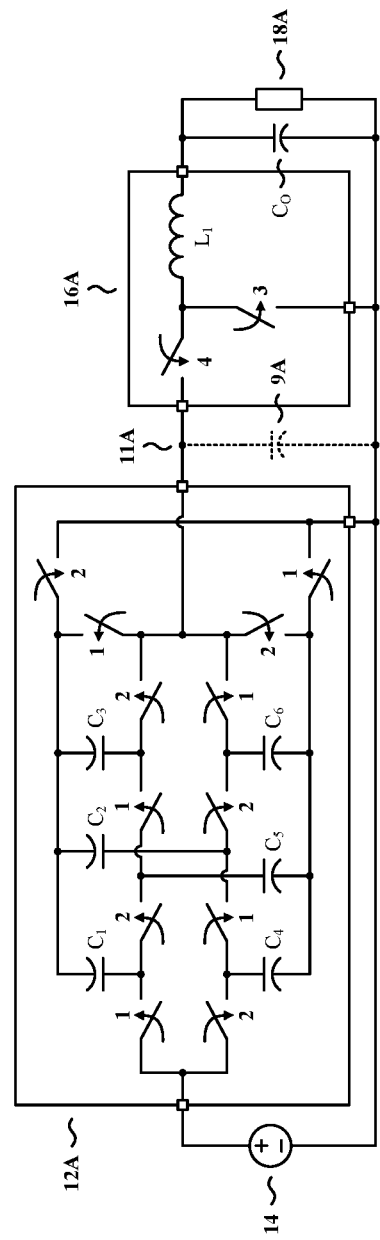

FIG. 30 shows a bidirectional step-down converter corresponding to the architecture shown in FIG. 1B. In this embodiment, the switching network 12A is a two-phase step-down cascade multiplier with a conversion ratio of 4:1 while the regulating circuit 16A is a synchronous buck converter. In operation, closing switches 1 and opening switches 2 charges capacitors $C_1$, $C_2$, and $C_3$ while discharging capacitors $C_4$, $C_5$, and $C_6$. Conversely, opening switches 1 and closing switches 2 charges the capacitors $C_4$, $C_5$, and $C_6$ while discharging the capacitors $C_1$, $C_2$, and $C_3$. All of the active components are implemented with switches so the converter can process power in both directions.

Figure 31:
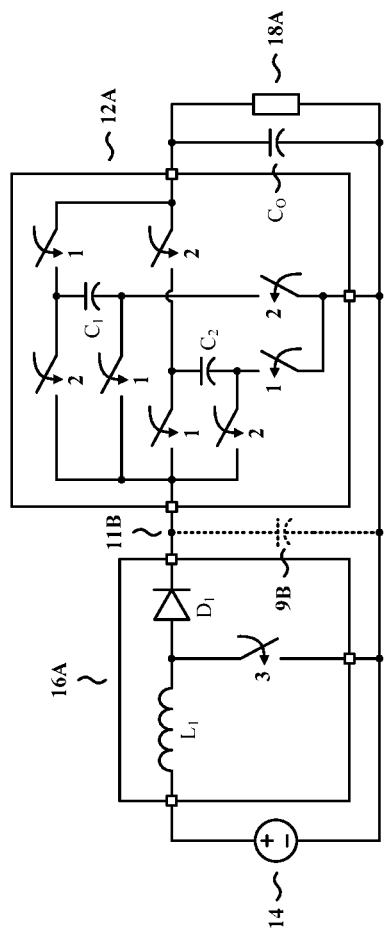
FIGS. 31 and 32 show particular implementations of the DC-DC converter illustrated in FIG. 3.

FIG. 31 shows a step-up converter consistent with the architecture shown in FIG. 3. In this embodiment, the regulating circuit 16A is a boost converter while the switching network 12A is a two-phase step-up series-parallel SC converter with a conversion ratio of 1:2. In operation, closing switches 1 charges a capacitor $C_2$ while discharging a capacitor $C_1$. Closing switches 2 has the complementary effect.

Figure 32:
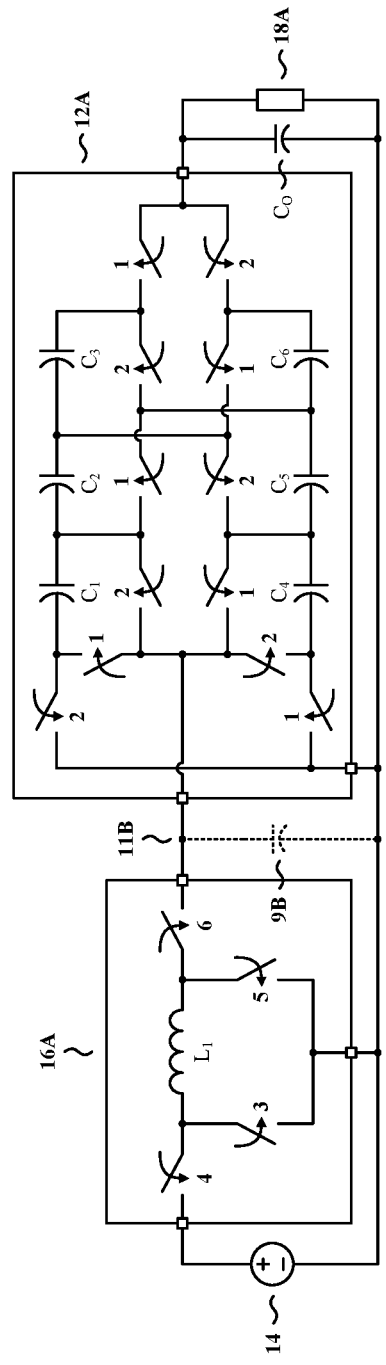

FIG. 32 shows a bidirectional up-down converter consistent with the architecture shown in FIG. 3. In this embodiment, the regulating circuit 16A is a synchronous four switch buck-boost converter while the switching network 12A is a two-phase step-up cascade multiplier with a conversion ratio of 1:4. In operation, closing switches 1 charges capacitors $C_4$, $C_5$, and $C_6$ while discharging capacitors $C_1$, $C_2$, and $C_3$. Closing switches 2 has the complementary effect. All of the active components are implemented with switches so the converter can process power in both directions.

Figure 33:
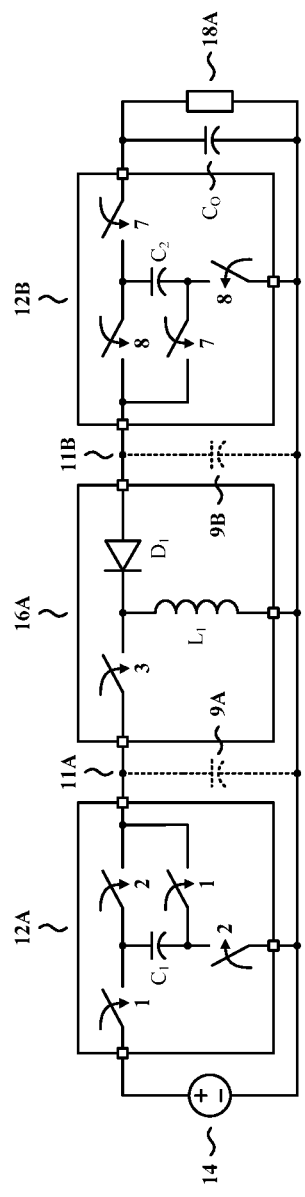
FIGS. 33 and 34 show particular implementations of the DC-DC converter illustrated in FIG. 2.

FIG. 33 shows an inverting up-down converter consistent with the architecture shown in FIG. 2. In this embodiment, the first switching network 12A is a step-down series-parallel SC converter with a conversion ratio of 2:1; the first regulating circuit 16A is a buck/boost converter; and the second switching network 12B is a step-up series-parallel SC converter with a conversion ratio of 1:2. In operation, closing switches 1 charges a capacitor $C_1$ while closing switches 2 discharges the capacitor $C_1$. Similarly, closing switches 7 discharges a capacitor $C_2$ while closing switches 8 charges the capacitor $C_2$.

Figure 34:
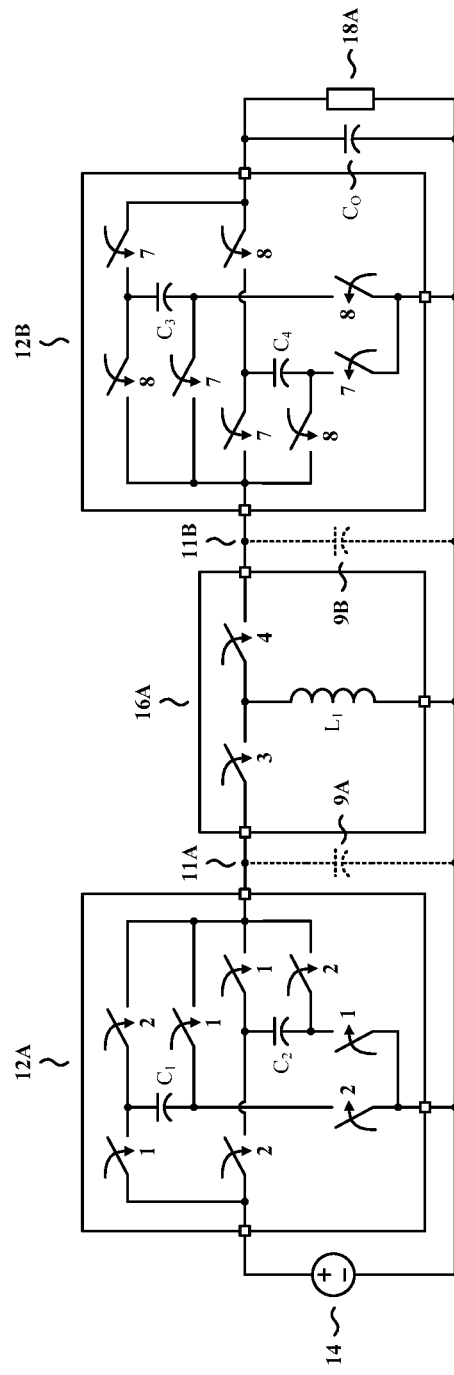

FIG. 34 shows a bidirectional inverting up-down converter consistent with the architecture shown in FIG. 2. In this embodiment, the first switching network 12A is a two-phase step-down series-parallel SC converter with a conversion ratio of 2:1; the first regulating circuit 16A is a synchronous buck/boost converter; and the second switching network 12B is a two-phase step-up series-parallel SC converter with a conversion ratio of 1:2. In operation, closing switches 1 charges a capacitor $C_1$ while discharging a capacitor $C_2$. Closing switches 2 has the complementary effect. Similarly, closing switches 7 charges a capacitor $C_4$ while discharging a capacitor $C_3$. Closing switches 8 has the complementary effect. All of the active components are implemented with switches so the converter can process power in both directions.

Figure 35:
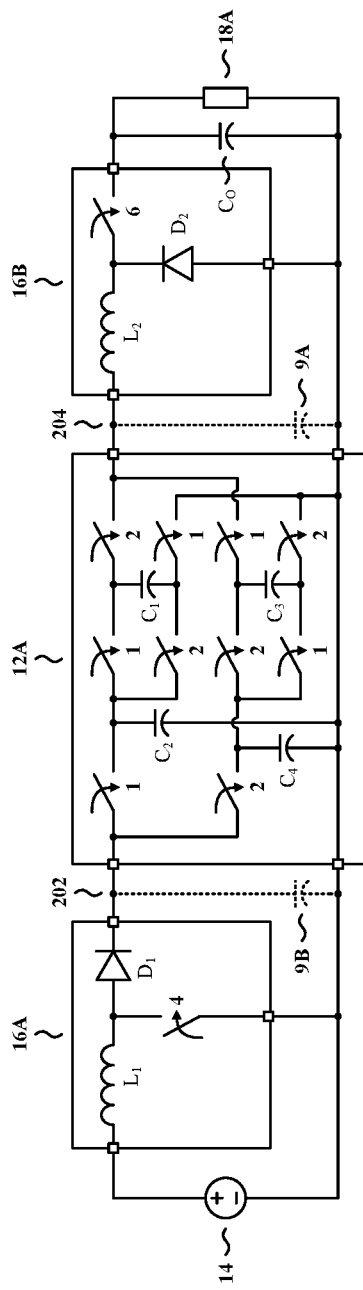
FIGS. 35 and 36 show particular implementations of the DC-DC converter illustrated in FIG. 4.

FIG. 35 shows an up-down converter consistent with the block diagram shown in FIG. 4. In this embodiment, the first regulating circuit 16A is a boost converter; the first switching network 12A is a two-phase step-up series-parallel SC converter with a conversion ratio of 1:2; and the second regulating circuit 16B is a boost converter. In operation, closing switches 1 charges capacitors $C_1$ and $C_2$ while simultaneously discharging capacitors $C_3$ and $C_4$. Closing switches 2 has the complementary effect.

Figure 36:
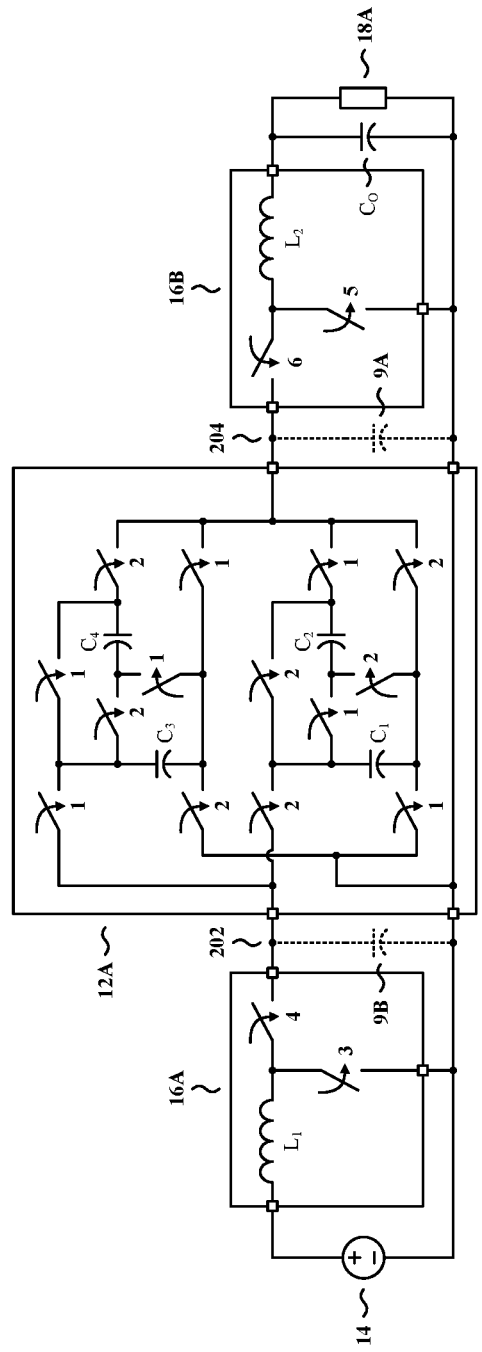

FIG. 36 shows a bidirectional up-down converter consistent with the block diagram shown in FIG. 4. In this embodiment, the first regulating circuit 16A is a synchronous boost converter; the first switching network 12A is a two-phase fractional step-down series-parallel SC converter with a conversion ratio of 3:2; and the second regulating circuit 16B is a synchronous buck converter. In operation, closing switches 1 charges capacitors $C_3$ and $C_4$ while simultaneously discharging capacitors $C_1$ and $C_2$. Closing switches 2 has the complementary effect. All of the active components are implemented with switches so the converter can process power in both directions. Adjusting the duty cycle of the second regulating circuit 16B so that switch 6 remains closed for extended periods allows an inductor $L_2$ to promote adiabatic charge transfer between capacitors in the first switching network 12A. In such an embodiment, the switches 5, 6 can be dispensed with, thus reducing the overall chip area required to implement the second regulating circuit 16B.

Figure 37:
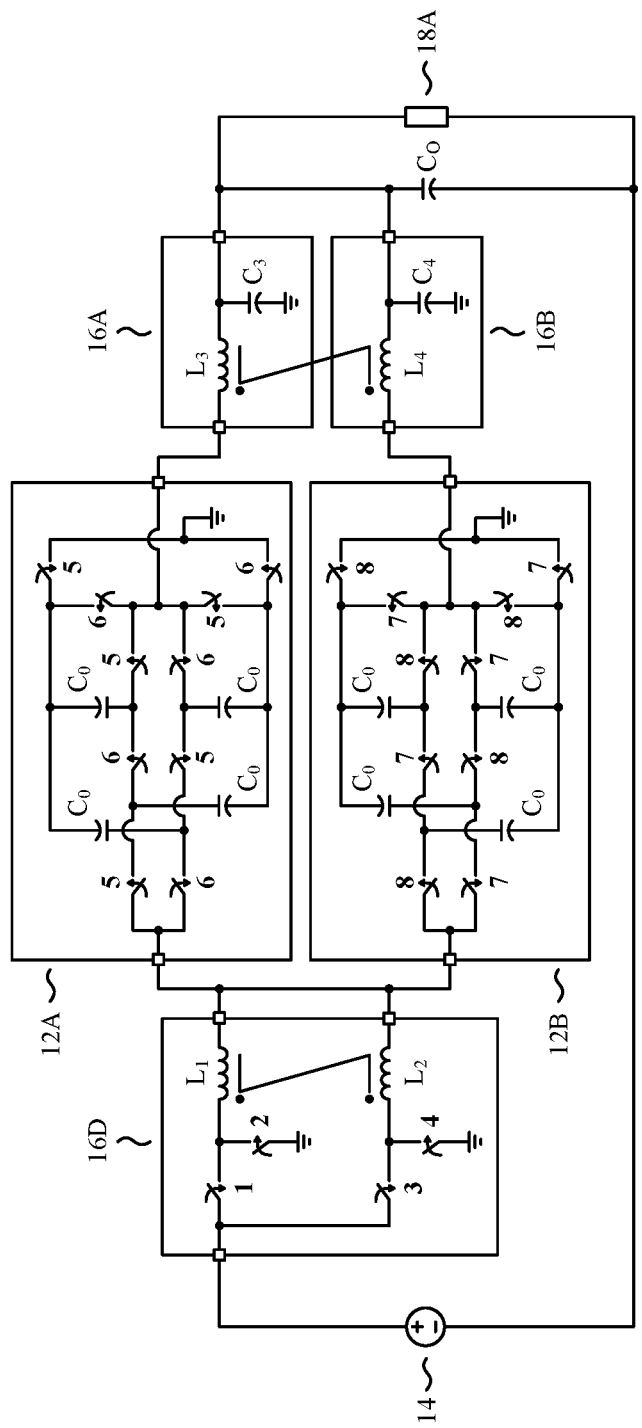
FIG. 37 shows an implementation of a DC-DC converter similar to that shown in FIG. 6B.

FIG. 37 shows a step-down converter that conforms substantially to the architecture introduced by FIG. 6B. In this embodiment, a fourth regulating circuit 16D has coupled inductors $L_1$, $L_2$. The fourth regulating circuit 16D regulates first and second switching networks 12A, 12B in parallel that operate 90° out of phase. The task of constraining charge transfer among the four capacitors $C_0$ of the first and second switching network 12A, 12B is shared by first and second regulating circuits 16A, 16B that also share coupled inductors $L_3$, $L_4$. If the coupling factor of the coupled inductors $L_3$, $L_4$ is set properly, the ripple current through these inductors can be reduced. Thus, FIG. 37 illustrates the possibility of coupled inductors $L_1$, $L_2$ within one component, namely the fourth regulating circuit 16D, and the possibility, already alluded to in FIG. 6B, of coupled inductors $L_3$, $L_4$ across separate components, namely the first and second regulating circuits 16A, 16B.

It should be understood that the topology of the regulating circuit can be any type of power converter with the ability to regulate the output voltage, including, but without limitation, synchronous buck, three-level synchronous buck, SEPIC, magnetic filters, and soft switched or resonant converters. Similarly, the switching networks can be realized with a variety of switched capacitor topologies, depending on desired voltage transformation and permitted switch voltage.

In some implementations, a computer accessible storage medium includes a database representative of one or more components of the converter. For example, the database may include data representative of a switching network that has been optimized to promote low-loss operation of a charge pump.

Generally speaking, a computer accessible storage medium may include any non-transitory storage media accessible by a computer during use to provide instructions and/or data to the computer. For example, a computer accessible storage medium may include storage media such as magnetic or optical disks and semiconductor memories.

Generally, a database representative of the system may be a database or other data structure that can be read by a program and used, directly or indirectly, to fabricate the hardware comprising the system. For example, the database may be a behavioral-level description or register-transfer level (RTL) description of the hardware functionality in a high level design language (HDL) such as Verilog or VHDL. The description may be read by a synthesis tool that may synthesize the description to produce a netlist comprising a list of gates from a synthesis library. The netlist comprises a set of gates that also represent the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. In other examples, Alternatively, the database may itself be the netlist (with or without the synthesis library) or the data set.

Having described one or more preferred embodiments, it will be apparent to those of ordinary skill in the art that other embodiments incorporating these circuits, techniques and concepts may be used. Accordingly, it is submitted that the scope of the patent should not be limited to the described embodiments, but rather, should be limited only by the spirit and scope of the appended claims.

The invention claimed is:

1. A power converter, comprising:
a switching network comprising a plurality of switches being switched to transition between a first configuration, during which charge accumulates in at least one capacitor at a first rate, and a second configuration, during which charge is depleted from the at least one capacitor at a second rate; and
a first regulating circuit and a second regulating circuit coupled to the switching network, wherein the first regulating circuit and the second regulating circuit comprise coupled inductors, wherein a coupling factor of the coupled inductors shared by the first regulating circuit and the second regulating circuit is set to reduce a ripple current through the coupled inductors.

2. The power converter of claim 1, wherein the switching network comprises a first switching network and a second switching network, the power converter further comprising:
a third regulating circuit to regulate the first switching network and the second switching network, wherein the first switching network and the second switching network are in parallel and operate out of phase.

3. The power converter of claim 2, wherein the third regulating circuit comprises a first inductor and a second inductor that are coupled to each other.

4. The power converter of claim 2, wherein the third regulating circuit comprises a first inductor and a second inductor that share the same inductor core.

5. The power converter of claim 2, wherein an output terminal of the third regulating circuit is coupled to an input terminal of the switching network.

6. The power converter of claim 2, wherein an input terminal of the first regulating circuit is coupled to the first switching network via a first output terminal of the switching network, and an input terminal of the second regulating circuit is coupled to the second switching network via a second output terminal of the switching network.

7. The power converter of claim 1, wherein the first rate and the second rate are constrained by the coupled inductors.

8. An apparatus for processing electric power, comprising:
a switching network comprising a plurality of switches being switched to transition between a first configuration, during which charge accumulates in at least one capacitor, and a second configuration, during which charge is depleted from the at least one capacitor;
a first regulating circuit coupled to the switching network, the first regulating circuit comprising a first inductor; and
a second regulating circuit coupled to the switching network, the second regulating circuit comprising a second inductor, wherein an inductor core is shared by the first inductor and the second inductor.

9. The apparatus of claim 8, wherein a coupling factor of the first inductor and the second inductor is set to reduce a ripple current through the first inductor and the second inductor.

10. The apparatus of claim 8, further comprising:
a third regulating circuit to regulate, at least in part, a first switching network and a second switching network in parallel that operate out of phase, wherein the first regulating circuit is coupled to the first switching network and the second regulating circuit is coupled to the second switching network.

11. The apparatus of claim 10, wherein the third regulating circuit comprises a third inductor and a fourth inductor coupled to each other.

12. The apparatus of claim 10, wherein the third regulating circuit comprises a third inductor and a fourth inductor that share a common inductor core.

13. The apparatus of claim 10, wherein an input terminal of the first regulating circuit is coupled to the first switching network via a first output terminal of the switching network, and an input terminal of the second regulating circuit is coupled to the second switching network via a second output terminal of the switching network.

14. The apparatus of claim 8, wherein the switching network has a first switching frequency, and the first regulating circuit and the second regulating circuit have a second switching frequency different from the first switching frequency.

15. An apparatus, comprising:
a switching network comprising a plurality of switches being switched to transition between a first configuration, during which charge accumulates in at least one capacitor, and a second configuration, during which charge is depleted from the at least one capacitor; and
a regulating circuit coupled to the switching network, wherein the regulating circuit comprises a first inductor and a second inductor being coupled inductors magnetically coupled to each other via mutual inductance, and the regulating circuit is a multi-phase regulating circuit.

16. The apparatus of claim 15, wherein an output terminal of the switching network is coupled to an input terminal of the multi-phase regulating circuit.

17. The apparatus of claim 15, wherein a coupling factor of the coupled first and second inductors is set to reduce a ripple current through the first and second inductors.

18. The apparatus of claim 15, wherein the charge accumulates in the at least one capacitor at a first rate in the first configuration, and the charge is depleted from the at least one capacitor at a second rate in the second configuration, and the first and second rates are constrained by the coupled first and second inductors.

19. The apparatus of claim 15, wherein the switching network has a first switching frequency, and the regulating circuit has a second switching frequency different from the first switching frequency.

20. The apparatus of claim 15, wherein the switching network and the regulating circuit form a step-down converter.

* * * * *